US012529797B2

(12) United States Patent
Solomentsev et al.

(10) Patent No.: US 12,529,797 B2
(45) Date of Patent: Jan. 20, 2026

(54) LiDAR DETECTION METHODS AND SYSTEMS

(71) Applicant: YANDEX SELF DRIVING GROUP LLC, Moscow (RU)

(72) Inventors: Dmitry Valentinovich Solomentsev, Moscow (RU); Andrey Viktorovich Golikov, Moscow (RU); Nikolay Evgenevich Orlov, Udmurtskaya Resp (RU); Vladimir Albertovich Kuznetsov, Moscow (RU)

(73) Assignee: Y.E. Hub Armenia LLC, Yerevan (AM)

( * ) Notice: Subject to any disclaimer, the term of this patent is extended or adjusted under 35 U.S.C. 154(b) by 1276 days.

(21) Appl. No.: 17/329,255

(22) Filed: May 25, 2021

(65) Prior Publication Data

US 2021/0373172 A1    Dec. 2, 2021

(30) Foreign Application Priority Data

Jun. 1, 2020   (RU) .................................. 2020117983

(51) Int. Cl.
   *G01S 17/931* (2020.01)
   *G01S 7/48* (2006.01)
   (Continued)

(52) U.S. Cl.
   CPC .......... *G01S 17/931* (2020.01); *G01S 7/4806* (2013.01); *G01S 7/484* (2013.01); *G01S 17/26* (2020.01)

(58) Field of Classification Search
   CPC ...... G01S 17/931; G01S 7/4806; G01S 7/484; G01S 17/26; G01S 7/493; G01S 17/34; G01S 17/42
   See application file for complete search history.

(56) References Cited

U.S. PATENT DOCUMENTS

| 4,528,669 | A |   | 7/1985 | Bostick et al. |
| 4,846,571 | A | * | 7/1989 | Jelalian ................. G01S 7/4917 356/28.5 |

(Continued)

FOREIGN PATENT DOCUMENTS

| BY | 13509 C1 | 8/2010 |
| RU | 2668350 C9 | 3/2019 |
| WO | 19070751 A1 | 4/2019 |

OTHER PUBLICATIONS

Chirped Lidar using Simplified Homodyne Detection (Year: 2009).*

(Continued)

*Primary Examiner* — Yuqing Xiao
*Assistant Examiner* — Andrea Maria Baca
(74) *Attorney, Agent, or Firm* — BCF LLP

(57) ABSTRACT

A LiDAR system and a method for operation thereof are provided. The LiDAR system comprises: a frequency-modulated continuous wave (FMCW) light source configured to produce an FMCW signal; and an amplitude modulator configured to modulate an amplitude of at least a portion of the FMCW signal, thereby producing an Amplitude-Frequency-Modulated-Continuous-Wave (AFMCW) signal; a splitter configured to split one of the FMCW signal and the AFMCW signal into a first portion and a second portion, the first portion being an output signal for reflecting off the object, thereby producing a reflected signal, and the second portion being a reference signal for amplifying the reflected signal; and a detector configured to amplify the reflected signal based on the reference signal as a function of a distance from the LiDAR system to an object, thereby generating an amplified reflected signal for determining the distance to the object.

21 Claims, 17 Drawing Sheets

(51) Int. Cl.
  *G01S 7/484* (2006.01)
  *G01S 17/26* (2020.01)

(56) References Cited

U.S. PATENT DOCUMENTS

| | | | |
|---|---|---|---|
| 10,802,120 B1* | 10/2020 | LaChapelle | ........... G01S 7/4917 |
| 2019/0101628 A1 | 4/2019 | Roger et al. | |
| 2019/0265351 A1* | 8/2019 | Madison | ................. G01S 17/32 |
| 2019/0302268 A1 | 10/2019 | Scott et al. | |
| 2019/0310351 A1 | 10/2019 | Hughes et al. | |
| 2020/0150247 A1 | 5/2020 | Ledbetter et al. | |

OTHER PUBLICATIONS

Frequency-modulated continuous-wave lidar using I/Q modulator for simplified heterodyne detection (Year: 2012).*

Russian Search Report dated Apr. 15, 2022 issued in respect of the counterpart Russian Patent Application No. RU 2020117983.

Machine translation of BY13509 C1 retrieved on Google Translate on Sep. 23, 2022.

Zhang et al., "Nonlinear Error Correction For Fmcw Ladar By The Amplitude Modulation Method", Optics Express, 1 2018, vol. 26, Issue 9, pp. 11519-11528.

European Search Report dated Oct. 15, 2021 issued in respect of the European Patent Application No. 21175243.1.

* cited by examiner

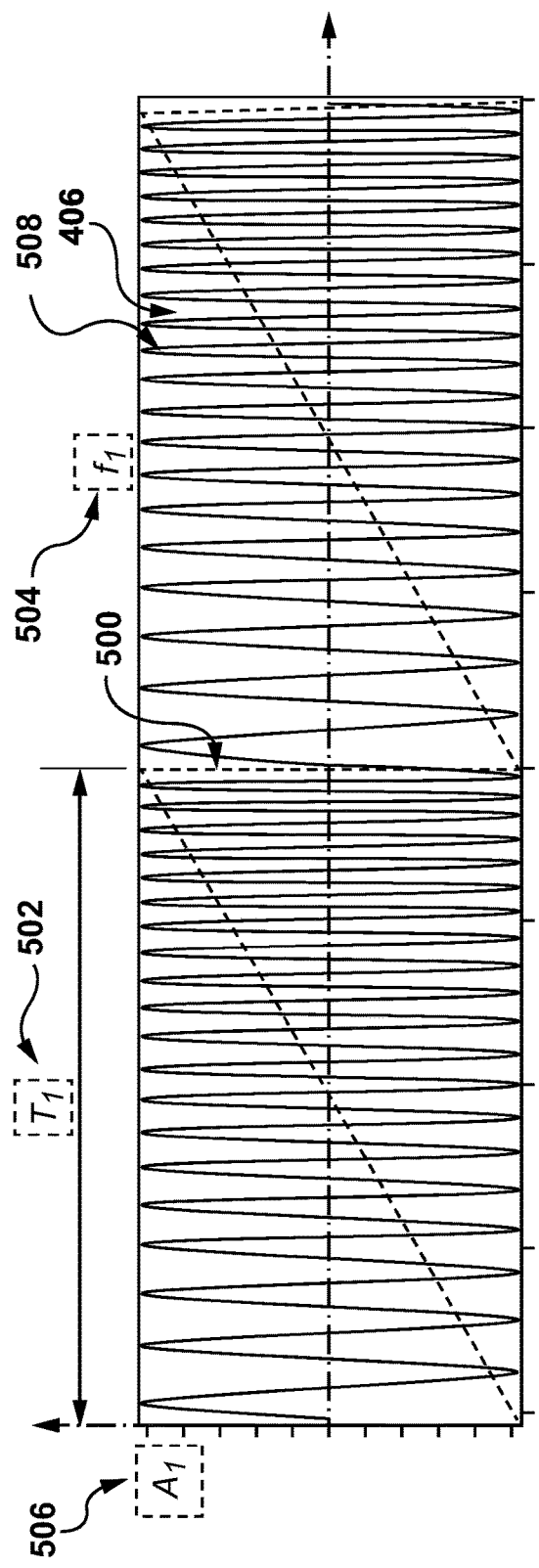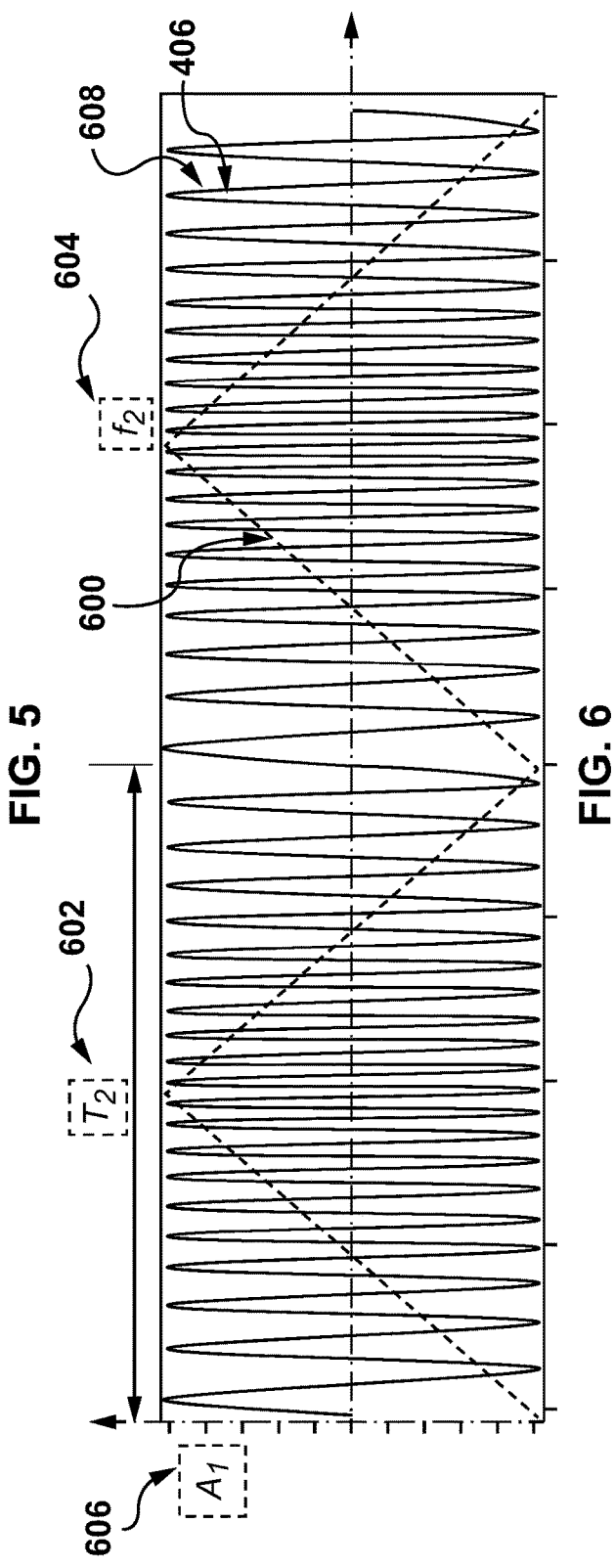

LiDAR DETECTION METHODS AND SYSTEMS

CROSS-REFERENCE

The present application claims priority to Russian Patent Application No. 2020117983, entitled "LiDAR DETECTION METHODS AND SYSTEMS," filed on Jun. 1, 2020, the entirety of which is incorporated herein by reference.

FIELD

The present technology relates to Light Detection and Ranging (LiDAR) systems and methods for detecting objects, in general; and LiDAR systems based on frequency modulated continuous wave (FMCW) light sources, in particular.

BACKGROUND

Several computer-based navigation systems that are configured for aiding navigation and/or control of vehicles have been proposed and implemented in the prior art. These systems range from more basic map-aided localization-based solutions—i.e. use of a computer system to assist a driver in navigating a route from a starting point to a destination point; to more complex ones such as computer-assisted and/or driver-autonomous driving systems.

Some of these systems are implemented as what is commonly known as a "cruise control" system. Within these systems, the computer system boarded on the vehicles maintains a user-set speed of the vehicle. Some of the cruise control systems implement an "intelligent distance control" system, whereby the user can set up a distance to a potential car in front (such as, select a value expressed in a number of vehicles) and the computer system adjusts the speed of the vehicle at least in part based on the vehicle approaching the potential vehicle in front within the pre-defined distance. Some of the cruise control systems are further equipped with collision control systems, which systems, upon detection of the vehicle (or other obstacle) in front of the moving vehicle, slow down or stop the vehicle.

Some of the more advanced systems provide for a fully autonomous driving of the vehicle without direct control from the operator (i.e. the driver). These autonomously driven vehicles include systems that can cause the vehicle to accelerate, brake, stop, change lane and self-park.

One of the main technical challenges in implementing the above systems is the ability to detect objects located around the vehicle. In one example, the systems may need the ability to detect the vehicle in front of the present vehicle (the present vehicle having the system onboard), which vehicle in front may pose a risk/danger to the present vehicle and may require the system to take a corrective measure, be it braking or otherwise changing speed, stopping or changing lanes.

LiDAR-based object detection generally comprises transmitting beams of light towards the region of interest, and detecting reflected light beams, such as from objects in the region of interest, to generate a representation of the region of interest including any objects. Lasers emitting pulses of light within a narrow wavelength are often used as the light source. The position and distance of the object can be computed using Time of Flight calculations of the emitted and detected light beam. By computing such positions as "data points", a digital multi-dimensional representation of the surroundings can be generated.

Generally, as for the physics of LiDAR-based object detection, there are at least two predominant approaches currently known in the art. One is based on utilizing a pulsed (laser) emission (so-called Time of Flight LiDAR systems, ToF LiDAR system). In ToF LiDAR systems, each LiDAR sensor emits a short pulse of a predetermined wavelength and further registers time that it takes for the pulse to scatter from a surrounding object and to return to the respective LiDAR sensor. By rotating the ToF LiDAR system, positioned at the top of the vehicle, comprising a plurality of such LiDAR sensors, by 360 degrees, a 3D representation of the surroundings of the vehicle can be generated.

Another physical approach used in the current LiDAR systems is based on a frequency modulated continuous wave (FMCW)—so-called FMCW or coherent LiDAR systems. In these systems, each LiDAR sensor is configured to emit a coherent continuous wave of a predetermined wavelength (carrier wave) that is further modulated, by a local oscillator, using another (modulating) signal, such as a chirp modulation signal, for example, indicative of a function for modifying the carrier wave. A resulting modulated signal can hence encode certain motion parameters of a surrounding object, off which it has been reflected. Akin to the ToF LiDAR systems, based on Time of Flight calculations, a distance to the surrounded object can be calculated. Further, by superimposing the scattered FMCW signal with the initial one (i.e., the one that initially has been produced by the local oscillator), based on a Doppler effect, a current velocity of the surrounding object relative to the LiDAR system may be yielded.

One of the key advantages of the FMCW LiDAR systems over the ToF LiDAR systems can be that the former allow for using a wave beyond the visible light spectrum (for example, 1550 nm), which results in a longer ranging distance (due to limitations in respect of emission power becoming less strict), a better robustness to interference of other light sources (such as LiDAR systems of other vehicles or the Sun, for example), and stand up for better eye-safety standards.

However, there are certain technical drawbacks associated with the FMCW LiDAR-based object detection. For example, one of the factors affecting a quality of the 3D representation of the surroundings of the vehicle and objects therein, generated by the FMCW LiDAR system, is its inability to register certain beams scattered off distant objects due to a significant loss in their amplitude thereafter. Consequently, generating the 3D representation of the surroundings of the vehicle that would allow for a comprehensive representation of objects therein may be challenging, which may affect the overall safety of operating the vehicle.

In order to address the above-identified problem, certain prior art approaches have been proposed including amplification the scattered modulated signal.

United States Patent Application Publication No.: 2019/0302268-A1 published on Oct. 3, 2019, assigned to GM Global Technology Operations LLC, and entitled "Coherent LiDAR System with Extended Field of View" discloses a coherent LiDAR system, a method of assembling the system and a vehicle including the system involve a light source to output a continuous wave, and a modulator to modulate a frequency of the continuous wave and provide a frequency modulated continuous wave (FMCW) signal. The system includes a splitter to split the FMCW signal to two or more paths, and two or more aperture lenses. At least one of the two or more aperture lenses is associated with each of the two or more paths and is configured to obtain a receive beam resulting from a reflection of an output signal obtained from the FMCW signal.

A PCT Application Publication WO 2019/070751-A1 published on Apr. 11, 2019, assigned to BRIDGER PHOTONICS INC, and entitled "Processing Temporal Segments of Laser Chirps and Examples of Use in FMCW LiDAR Methods and Apparatuses" discloses examples of FMCW laser radar systems and methods that may segment the processing of a broader bandwidth frequency chirp into multiple shorter-duration (e.g., lower bandwidth) frequency chirps. This segmentation may have the benefits in some examples of improving the measurement duty cycle and range resolution, and/or allowing for more flexible processing, and/or enabling improved detection of more distant objects.

An article entitled "Nonlinear Error Correction for FMCW Ladar by the Amplitude Modulation Method" written by Tong Zhang, Xinghua Qu, and Fumin Zhang, and published by Optics Express journal, discloses an amplitude modulation method for correcting the nonlinear error of FMCW technology. The optical structure of the method is comprised of two tandem fiber interferometers. The first interferometer is used to produce a carrier signal and the second one is used to load the range information on the amplitude of the carrier signal. In the end, the experimental result verifies that the nonlinear error can be suppressed effectively, the phase error from the mismatch has been eliminated observably, and the range resolution can be notably improved to 69 μm; the stability is 2.9 μm and the measurement precision is 4.3 μm.

SUMMARY

Therefore, there is a need for systems and methods which avoid, reduce or overcome the limitations of the prior art.

The developers of the present technology have realized that a scattered FMCW signal could be more efficiently received and hence more accurately decoded by the FMCW LiDAR system if its amplitude were amplified based on a distance from a surrounding object, off which it has reflected.

Thus, the developers of the present technology have devised a method directed to modulating the amplitude of the FMCW signal such that its amplitude changes (for example, continuously grows according to a predetermined time law) periodically based on a threshold ranging distance of the FMCW LiDAR system. In this regard, the farther away the surrounding object is located from the FMCW LiDAR system, the more the amplitude of the scattered FMCW signal will be amplified at a moment in time of receiving it, and vice versa.

Therefore, the so modulated FMCW signal (also referred to herein as "Amplitude-Frequency-Modulated Continuous Wave" signal, AFMCW signal) generated by the FMCW LiDAR system is believed to be more robust to attenuation caused by a long distance to a given surrounding object, and thus may allow for registering more distant objects in the surroundings of the vehicle. The non-limiting embodiments of the present technology allow for generating a more comprehensive and broader 3D representation of the surroundings of the vehicle, which is believed to improve the accuracy and ranging distance of the FMCW LiDAR systems, which further provides for a safer operation of the vehicle.

In accordance with a first broad aspect of the present technology, there is provided a LiDAR system that has a threshold ranging distance, the threshold ranging distance being indicative of a longest distance at which the LiDAR system is configured to detect an object. The LiDAR system comprises: a light source configured to produce a continuous wave; a frequency modulator configured to modulate a frequency of the continuous wave, thereby producing a Frequency-Modulated-Continuous-Wave (FMCW) signal; and an amplitude modulator configured to modulate an amplitude of the FMCW signal, thereby producing an Amplitude-Frequency-Modulated-Continuous-Wave (AFMCW) signal, the amplitude of the FMCW signal being modulated in accordance with an amplitude modulation period, and the amplitude modulation period being predetermined based on the threshold ranging distance; a splitter configured to split the AFMCW signal into a first portion and a second portion, the first portion being to be outputted by the LiDAR system for reflecting off the object, thereby producing a reflected signal, and the second portion being to be used for amplifying the reflected signal; and a detector configured to amplify the reflected signal based on the second portion by increasing amplification of the reflected signal as a function of a distance of the object from the LiDAR system, thereby generating an amplified reflected signal, and the amplified reflected signal being indicative of the distance of the object from the LiDAR system.

In some implementations of the LiDAR system, the detector has a threshold amplitude, and wherein the amplified reflected signal has an amplitude that is below the threshold amplitude.

In some implementations of the LiDAR system, the amplitude modulator is configured to modulate the amplitude of the FMCW signal in accordance with a periodic function of amplitude modulation, the periodic function of amplitude modulation being selected by an operator such that the amplitude of the amplified reflected signal is below the threshold amplitude of the detector.

In some implementations of the LiDAR system, the detector is further configured to receive the reflected signal.

In some implementations of the LiDAR system, the splitter is configured to split the AFMCW signal; and the detector is further configured to receive the second portion of the AFMCW signal for amplifying the reflected signal.

In some implementations of the LiDAR system, the splitter is configured to split the FMCW signal; the amplitude modulator is further configured to receive the second portion of the FMCW signal; the amplitude modulator being configured to modulate the amplitude of the FMCW signal comprises the amplitude modulator being configured to modulate the amplitude of the second portion of the FMCW signal; and the detector is further configured to receive the AFMCW signal from the amplitude modulator for amplifying the reflected signal.

In some implementations of the LiDAR system, the amplitude modulator being configured to modulate the amplitude of the FMCW signal comprises the amplitude modulator being configured to: produce the AFMCW signal having a continuously increasing amplitude within the amplitude modulation period.

In some implementations of the LiDAR system, the amplitude modulator being configured to modulate the amplitude of the FMCW signal comprises the amplitude modulator being configured to: produce the AFMCW signal having an asymptotically increasing amplitude within the amplitude modulation period.

In some implementations of the LiDAR system, the amplitude modulator being configured to modulate the amplitude of the FMCW signal comprises the amplitude modulator being configured to: produce the AFMCW signal having a linearly increasing amplitude within the amplitude modulation period.

In some implementations of the LiDAR system, the frequency of the continuous wave is modulated in accordance with a frequency modulation period; and the frequency modulation period is equal to the amplitude modulation period.

In some implementations of the LiDAR system, the amplitude modulation period is pre-determined as a time value corresponding to an amount of time between: a first moment in time when the second portion is outputted from the LiDAR system; and a second moment in time when the reflected signal would be received by the detector if the object is at the threshold ranging distance from the LiDAR system.

In some implementations of the LiDAR system, the frequency modulator is integral with the light source.

In some implementations of the LiDAR system, the amplitude modulator is integral with the light source.

In some implementations of the LiDAR system, the amplitude modulator is at least one of: a MEMS variable optical modulator; an electro-optical modulator; a magneto-optical modulator; a fiber-optical amplifier; a semiconductor optical amplifier; and an other light source.

In some implementations of the LiDAR system, the LiDAR system is equipped to a Self Driving Car (SDC).

In some implementations of the LiDAR system, the amplified reflected signal is further indicative of a velocity of the object relative to the LiDAR system.

In some implementation of the LiDAR system, the distance of the object is used for controlling operation of the SDC.

In accordance with a second broad aspect of the present technology, there is provided a LiDAR system that has a threshold ranging distance, the threshold ranging distance being indicative of a longest distance at which the LiDAR system is configured to detect an object. The LiDAR system comprises: a light source configured to produce a continuous wave; a frequency modulator configured to modulate a frequency of the continuous wave, thereby producing a Frequency-Modulated-Continuous-Wave (FMCW) signal; and a splitter configured to split the FMCW signal into a first portion and a second portion, the first portion being to be outputted by the LiDAR system for reflecting off the object, thereby producing a reflected signal, and the second portion being to be used for amplifying the reflected signal; an amplitude modulator configured to modulate an amplitude of the second portion of the FMCW signal, thereby producing an Amplitude-Frequency-Modulated-Continuous-Wave (AFMCW) signal, the amplitude of the second portion of the FMCW signal being modulated in accordance with an amplitude modulation period, and the amplitude modulation period being pre-determined based on the threshold ranging distance; and a detector configured to amplify the reflected signal based on the AFMCW signal by increasing amplification of the reflected signal as a function of a distance of the object from the LiDAR system, thereby generating an amplified reflected signal, and the amplified reflected signal being indicative of the distance of the object from the LiDAR system.

In accordance with a third broad aspect of the present technology, there is provided a LiDAR system that has a threshold ranging distance, the threshold ranging distance being indicative of a longest distance at which the LiDAR system is configured to detect an object. The LiDAR system comprises: a light source configured to produce a continuous wave; a frequency modulator configured to modulate a frequency of the continuous wave, thereby producing a Frequency-Modulated-Continuous-Wave (FMCW) signal; and a splitter configured to split the FMCW signal into a first portion and a second portion, the second portion being to be used for amplifying the reflected signal; an amplitude modulator configured to modulate an amplitude of the first portion of the FMCW signal, thereby producing an Amplitude-Frequency-Modulated-Continuous-Wave (AFMCW) signal, the amplitude of the first portion of the FMCW signal being modulated in accordance with an amplitude modulation period, and the amplitude modulation period being pre-determined based on the threshold ranging distance AFMCW signal being to be outputted by the LiDAR system for reflecting off the object, thereby producing a reflected signal; and a detector configured to amplify the reflected signal based on the second portion by increasing amplification of the reflected signal as a function of a distance of the object from the LiDAR system, thereby generating an amplified reflected signal, and the amplified reflected signal being indicative of the distance of the object from the LiDAR system.

In accordance with a fourth broad aspect of the present technology, there is provided a LiDAR system that has a threshold ranging distance, the threshold ranging distance being indicative of a longest distance at which the LiDAR system is configured to detect an object. The LiDAR system comprises: a light source configured to produce a continuous wave; a frequency modulator configured to modulate a frequency of the continuous wave, thereby producing a Frequency-Modulated-Continuous-Wave (FMCW) signal; and a splitter configured to split the FMCW signal into a first portion and a second portion, a first amplitude modulator configured to modulate an amplitude of the first portion of the FMCW signal, thereby producing a first Amplitude-Frequency-Modulated-Continuous-Wave (AFMCW) signal, the amplitude of the first portion of the FMCW signal being modulated in accordance with an amplitude modulation period, and the amplitude modulation period being pre-determined based on the threshold ranging distance, the first AFMCW signal to be outputted by the LiDAR system for reflecting off the object, thereby producing a reflected signal; and a second amplitude modulator configured to modulate an amplitude of the second portion of the FMCW signal, thereby producing a second AFMCW signal, the amplitude of the second portion of the FMCW signal being modulated in accordance with the amplitude modulation period, and the amplitude modulation period being pre-determined based on the threshold ranging distance, the second AFMCW signal being to be used for amplifying the reflected signal; a detector configured to amplify the reflected signal based on the second AFMCW signal by increasing amplification of the reflected signal as a function of a distance of the object from the LiDAR system, thereby generating an amplified reflected signal, and the amplified reflected signal being indicative of the distance of the object from the LiDAR system.

In accordance with a fifth broad aspect of the present technology, there is provided a LiDAR system that has a threshold ranging distance, the threshold ranging distance being indicative of a longest distance at which the LiDAR system is configured to detect an object. The LiDAR system comprises: a light source configured to produce a continuous wave; a frequency modulator configured to modulate a frequency of the continuous wave, thereby producing a Frequency-Modulated-Continuous-Wave (FMCW) signal; and an amplitude modulator configured to modulate an amplitude of the FMCW signal, thereby producing an Amplitude-Frequency-Modulated-Continuous-Wave (AFMCW) signal, the amplitude of the FMCW signal being modulated in accordance with an amplitude modulation period, and the amplitude modulation period being pre-determined based on the threshold ranging distance; a splitter configured to split one of the FMCW signal and the AFMCW signal into a first portion and a second portion, the first portion being to be outputted by the LiDAR system for reflecting off the object, thereby producing a reflected signal, and the second portion being to be used for amplifying the reflected signal; and a detector configured to amplify the reflected signal based on the second portion by increasing amplification of the reflected signal proportionally to a distance of the object from the LiDAR system, thereby generating an amplified reflected signal, and the amplified reflected signal being indicative of the distance of the object from the LiDAR system.

In accordance with a sixth broad aspect of the present technology, there is provided a LiDAR system that has a threshold ranging distance, the threshold ranging distance being indicative of a longest distance at which the LiDAR system is configured to detect an object. The LiDAR system comprises: a light source configured to produce a continuous wave; a frequency modulator configured to modulate a frequency of the continuous wave, thereby producing a Frequency-Modulated-Continuous-Wave (FMCW) signal; and an amplitude modulator configured to modulate an amplitude of at least a portion of the FMCW signal, thereby producing an Amplitude-Frequency-Modulated-Continuous-Wave (AFMCW) signal, the amplitude of the at least a portion of the FMCW signal being modulated in accordance with an amplitude modulation period, and the amplitude modulation period being pre-determined based on the threshold ranging distance; a splitter configured to split one of the FMCW signal and the AFMCW signal into a first portion and a second portion, the first portion being for producing an output signal by the LiDAR system for reflecting off the object, thereby producing a reflected signal, and the second portion being for producing a reference signal for amplifying the reflected signal; and a detector configured to amplify the reflected signal based on the reference signal by increasing amplification of the reflected signal as a function of a distance of the object from the LiDAR system, thereby generating an amplified reflected signal, and the amplified reflected signal being indicative of the distance of the object from the LiDAR system.

In accordance with a seventh broad aspect of the present technology, there is provided a method for operating a LiDAR system. The LiDAR system has a threshold ranging distance, the threshold ranging distance being indicative of a longest distance at which the LiDAR system is configured to detect an object. The method executable by the LiDAR system. The method comprises: producing, by the LiDAR system, a continuous wave; modulating, by the LiDAR system, a frequency of the continuous wave so as to produce a Frequency-Modulated-Continuous-Wave (FMCW) signal; modulating, by the LiDAR system, an amplitude of the FMCW signal so as to produce an Amplitude-Frequency-Modulated-Continuous-Wave (AFMCW) signal, the modulating the amplitude comprising modulating, by the LiDAR system, the amplitude in accordance with an amplitude modulation period, and the amplitude modulation period being pre-determined based on the threshold ranging distance; splitting, by the LiDAR system, one of the FMCW signal and the AFMCW signal into a first portion and a second portion, the first portion being to be outputted by the LiDAR system for reflecting off the object, thereby producing a reflected signal, and the second portion being to be used for amplifying the reflected signal; and amplifying, by the LiDAR system, the reflected signal based on the second portion by increasing amplification of the reflected signal as a function of a distance of the object from the LiDAR system, thereby generating an amplified reflected signal, and the amplified reflected signal being indicative of the distance of the object from the LiDAR system.

In some implementations of the method, the method further comprises receiving, by the LiDAR system, the reflected signal.

In some implementations of the method, the LiDAR system is splitting the AFMCW signal; and the second portion of the AFMCW signal is used for amplifying the reflected signal.

In some implementations of the method, the LiDAR system is splitting the FMCW signal; and the modulating the amplitude of the FMCW signal comprises modulating, by the LiDAR system, the amplitude of the second portion of the FMCW signal.

In some implementations of the method, the modulating the amplitude of the FMCW signal comprises: producing, by the LiDAR system, the AFMCW signal having a continuously increasing amplitude within the amplitude modulation period.

In some implementations of the method, the frequency of the continuous wave is modulated in accordance with a frequency modulation period; and the frequency modulation period is equal to the amplitude modulation period.

In some implementations of the method, the amplitude modulation period is pre-determined as a time value corresponding to an amount of time between: a first moment in time when the second portion is outputted from the LiDAR system; and a second moment in time when the reflected signal would be received by the detector if the object is at the threshold ranging distance from the LiDAR system.

In some implementations of the method, the amplified reflected signal is further indicative of a velocity of the object relative to the LiDAR system.

In some implementations of the method, the LiDAR system is equipped to a Self Driving Car (SDC).

In some implementations of the method, the method further comprises controlling operation of the SDC based on the distance of the object.

In the context of the present specification, a "radiation source" broadly refers to any device configured to emit radiation such as a radiation signal in the form of a beam. A radiation source includes, but is not limited to a light source configured to emit light beams. The light source may be a laser such as a solid-state laser, laser diode, a high power laser, or an alternative light source such as, a light emitting diode (LED)-based light source. Some (non-limiting) examples of the light source are Fabry-Perot laser diode, a quantum well laser, a distributed Bragg reflector (DBR) laser, a distributed feedback (DFB) laser, a fiber-laser, or a vertical-cavity surface-emitting laser (VCSEL). In addition, the light source may emit light beams in differing formats, such as light pulses, continuous wave (CW), quasi-CW, and so on. In some non-limiting examples, the light source may include a laser diode configured to emit light at a wavelength between about 650 nm and 1150 nm. Alternatively, the light source may include a laser diode configured to emit light beams at a wavelength between about 800 nm and about 1000 nm, between about 850 nm and about 950 nm, between about 1300 nm and about 1600 nm, or in between any other suitable range. Unless indicated otherwise, the term "about"

with regard to a numeric value is defined as a variance of up to 10% with respect to the stated value.

In the context of the present specification, an "output beam" may be referred to as a radiation beam, such as a light beam, that is generated by the radiation source and is directed downrange towards a region of interest. The output beam may have one or more parameters such as: beam duration, beam angular dispersion, wavelength, instantaneous power, photon density at different distances from the light source, average power, beam power intensity, beam width, beam repetition rate, beam sequence, pulse duty cycle, wavelength, or phase etc. The output beam may be unpolarized or randomly polarized, may have no specific or fixed polarization (e.g., the polarization may vary with time), or may have a particular polarization (e.g., linear polarization, elliptical polarization, or circular polarization).

Further, in the context of the present specification, the output beam may also be referred to as a continuous (electromagnetic) wave having particular characteristics, such as a frequency, an amplitude, a phase, and a wavelength, having been emitted by the light source. Accordingly, a frequency-modulated continuous wave (FMCW) may be referred as a "FMCW output beam", and the FMCW additionally amplitude-modulated may be referred as "AFMCW output beam".

In the context of the present specification, the term "frequency modulation" is broadly referred to variation of the frequency of the continuous wave in time (a frequency carrier wave) according to a frequency predetermined law represented by a frequency modulating function, such as, but without being limited to, a sinusoidal signal, a sawtooth signal, a triangle signal, as an example, in order to encode certain data in the frequency of the continuous wave leaving the amplitude and the phase of the continuous wave unaltered, thereby generating the FMCW.

In the context of the present technology, the term "amplitude modulation" is broadly referred to a variation of the amplitude of the continuous wave and/or the FMCW in time (an amplitude carrier wave) according to an amplitude predetermined law represented by an amplitude modulating signal, such as, but without being limited to, a linear-based signal, an asymptotic function-based signal, and the like, for encoding certain data in the amplitude of the continuous wave and/or FMCW leaving frequency and phase thereof unaltered, thereby producing an amplitude-modulating continuous wave (AMCW) and/or the amplitude and frequency-modulated continuous wave (AFMCW), respectively.

In the context of the present specification, an "input beam" may also be referred to as a radiation beam, such as a light beam, reflected from one or more objects in a region of interest (ROI). By reflected is meant that at least a portion of the output beam incident on one or more objects in the ROI, bounces off the one or more objects. The input beam may have one or more parameters such as: time-of-flight (i.e., time from emission until detection), instantaneous power (e.g., power signature), average power across entire return pulse, and photon distribution/signal over return pulse period etc.

In the context of the present specification, a "Region of Interest" may broadly include a portion of the observable environment of LiDAR system in which the one or more objects may be detected. It is noted that the region of interest of the LiDAR system may be affected by various conditions such as but not limited to: an orientation of the LiDAR system (e.g. direction of an optical axis of the LiDAR system); a position of the LiDAR system with respect to the environment (e.g. distance above ground and adjacent topography and obstacles); operational parameters of the LiDAR system (e.g. emission power, computational settings, defined angles of operation), etc. The ROI of LiDAR system may be defined, for example, by a plane angle or a solid angle. In one example, the ROI may also be defined within a certain range (e.g. up to 200 m or so).

In the context of the present specification, a "server" is a computer program that is running on appropriate hardware and is capable of receiving requests (e.g. from electronic devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices, however it is not required to be the case with respect to the present technology. Thus, some (non-limiting) examples of electronic devices include self-driving unit, personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices.

In the context of the present specification, the expression "information" includes information of any nature or kind whatsoever capable of being stored in a database. Thus information includes, but is not limited to visual works (e.g. maps), audiovisual works (e.g. images, movies, sound records, presentations etc.), data (e.g. location data, weather data, traffic data, numerical data, etc.), text (e.g. opinions, comments, questions, messages, etc.), documents, spreadsheets, etc.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Further, as is discussed herein in other contexts, reference to a "first" element and a "second" element does not preclude the two elements from being the same actual real-world element.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

FIG. 5 depicts representation of a first example frequency modulation function used in the LiDAR system of FIG. 3, in accordance with the non-limiting embodiments of the present technology;

FIG. 6 depicts a representation of a second example frequency modulation function used in the LiDAR system of FIG. 3, in accordance with the non-limiting embodiments of the present technology;

DETAILED DESCRIPTION

Figure 1:
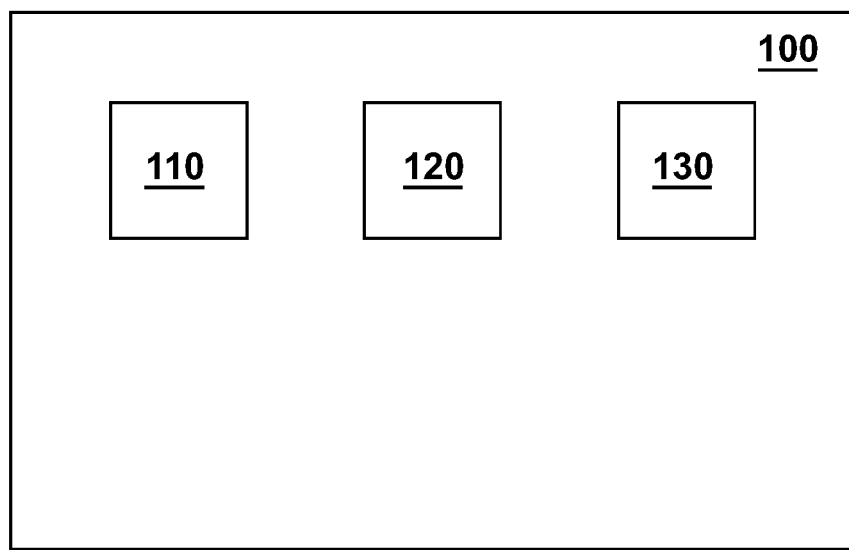
FIG. 1 depicts a schematic diagram of an example computer system for implementing certain non-limiting embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

Referring initially to FIG. 1, there is depicted a schematic diagram of a computer system 100 suitable for use with some implementations of the present technology, the computer system 100 comprising various hardware components including one or more single or multi-core processors collectively represented by processor 110, a solid-state drive 120, a memory 130, which may be a random-access memory or any other type of memory.

Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for determining a presence of an object. For example, the program instructions may be part of a vehicle control application executable by the processor 110. It is noted that the computer system 100 may have additional and/or optional components (not depicted), such as network communication modules, locationalization modules, and the like.

Networked Computer Environment

Figure 2:
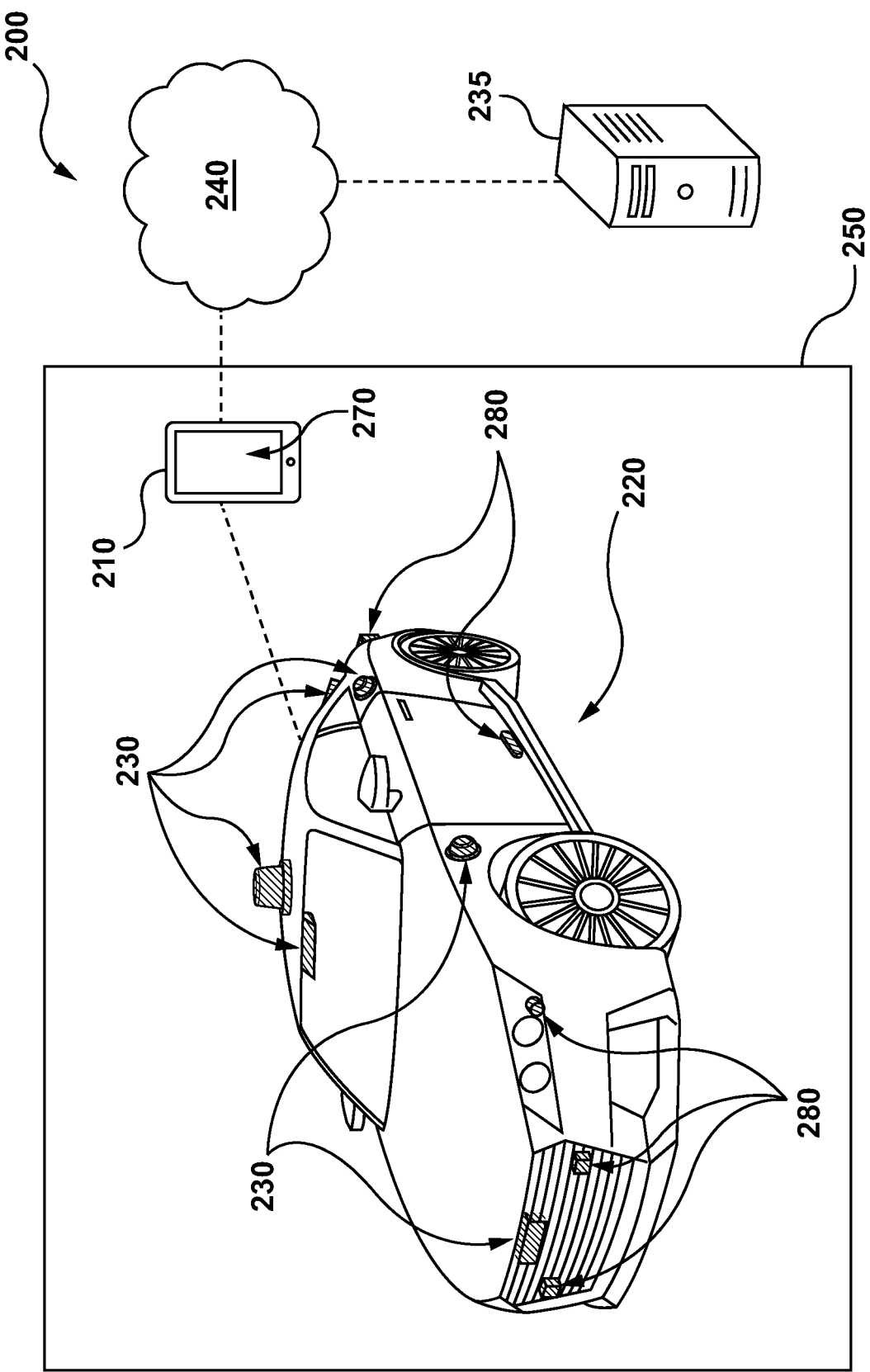
FIG. 2 depicts a networked computing environment suitable for use with certain non-limiting embodiments of the present technology.

FIG. 2 depicts a schematic diagram of a networked computer environment 200 suitable for use with some embodiments of the systems and/or methods of the present technology. The networked computer environment 200 comprises an electronic device 210 associated with a vehicle 220, and/or associated with a user (not depicted) who is associated with the vehicle 220, such as an operator of the vehicle 220, a server 235 in communication with the electronic device 210 via a communication network 240 (e.g. the Internet or the like, as will be described in greater detail herein below).

Optionally, the networked computer environment 200 can also include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220 to which the electronic device 210 is associated may comprise any transportation vehicle, for leisure or otherwise, such as a private or commercial car, truck, motorbike or the like. Although the vehicle 220 is depicted as being a land vehicle, this may not be the case in each embodiment of the present technology. For example, the vehicle 220 may be a watercraft, such as a boat, or an aircraft, such as a flying drone.

The vehicle 220 may be user operated or a driver-less vehicle. In at least some embodiments of the present technology, it is contemplated that the vehicle 220 may be implemented as a Self-Driving Car (SDC). It should be noted that specific parameters of the vehicle 220 are not limiting, these specific parameters including: vehicle manufacturer, vehicle model, vehicle year of manufacture, vehicle weight, vehicle dimensions, vehicle weight distribution, vehicle surface area, vehicle height, drive train type (e.g. 2× or 4×), tire type, brake system, fuel system, mileage, vehicle identification number, and engine size.

The implementation of the electronic device 210 is not particularly limited, but as an example, the electronic device 210 may be implemented as a vehicle engine control unit, a vehicle CPU, a vehicle navigation device (e.g. TomTom™, Garmin™), a tablet, a personal computer built into the vehicle 220, and the like. Thus, it should be noted that the electronic device 210 may or may not be permanently associated with the vehicle 220. Additionally or alternatively, the electronic device 210 can be implemented in a wireless communication device such as a mobile telephone (e.g. a smart-phone or a radio-phone). In certain embodiments, the electronic device 210 has a display 270.

The electronic device 210 may comprise some or all of the components of the computer system 100 depicted in FIG. 1. In certain embodiments, the electronic device 210 is an on-board computer device and comprises the processor 110, the solid-state drive 120 and the memory 130. In other words, the electronic device 210 comprises hardware and/or software and/or firmware, or a combination thereof, for processing data as will be described in greater detail below.

In some embodiments of the present technology, the communication network 240 is the Internet. In alternative non-limiting embodiments, the communication network 240 can be implemented as any suitable local area network (LAN), wide area network (WAN), a private communication network or the like. It should be expressly understood that implementations for the communication network 240 are for illustration purposes only. A communication link (not separately numbered) is provided between the electronic device 210 and the communication network 240, the implementation of which will depend inter alia on how the electronic device 210 is implemented. Merely as an example and not as a limitation, in those embodiments of the present technology where the electronic device 210 is implemented as a wireless communication device such as a smartphone or a navigation device, the communication link can be implemented as a wireless communication link. Examples of wireless communication links include, but are not limited to, a 3G communication network link, a 4G communication network link, and the like. The communication network 240 may also use a wireless connection with the server 235.

In some embodiments of the present technology, the server 235 is implemented as a computer server and may comprise some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server is a single server. In alternative non-limiting embodiments of the present technology (not shown), the functionality of the server 235 may be distributed and may be implemented via multiple servers.

In some non-limiting embodiments of the present technology, the processor 110 of the electronic device 210 can be in communication with the server 235 to receive one or more updates. The updates can be, but are not limited to, software updates, map updates, routes updates, weather updates, and the like. In some embodiments of the present technology, the processor 110 can also be configured to transmit to the server 235 certain operational data, such as routes travelled, traffic data, performance data, and the like. Some or all data transmitted between the vehicle 220 and the server 235 may be encrypted and/or anonymized.

It should be noted that a variety of sensors and systems may be used by the electronic device 210 for gathering information about surroundings 250 of the vehicle 220. As seen in FIG. 2, the vehicle 220 may be equipped with a plurality of sensor systems 280. It should be noted that different sensor systems from the plurality of sensor systems 280 may be used for gathering different types of data regarding the surroundings 250 of the vehicle 220.

In one example, the plurality of sensor systems 280 may comprise one or more camera-type sensor systems that are mounted to the vehicle 220 and communicatively coupled to the processor 110. Broadly speaking, the one or more camera-type sensor systems may be configured to gather image data about various portions of the surroundings 250 of the vehicle 220. In some cases, the image data provided by the one or more camera-type sensor systems may be used by the electronic device 210 for performing object detection procedures. For example, the electronic device 210 may be configured to feed the image data provided by the one or more camera-type sensor systems to an Object Detection Neural Network (ODNN) that has been trained to localize and classify potential objects in the surroundings 250 of the vehicle 220.

In another example, the plurality of sensor systems 280 may comprise one or more radar-type sensor systems that are mounted to the vehicle 220 and communicatively coupled to the processor 110. Broadly speaking, the one or more radar-type sensor systems may be configured to make use of radio waves to gather data about various portions of the surroundings 250 of the vehicle 220. For example, the one or more radar-type sensor systems may be configured to gather radar data about potential objects in the surroundings 250 of the vehicle 220 and which data may be representative of distance of objects from the radar-type sensor system, orientation of objects, velocity and/or speed of objects, and the like.

It should be noted that the plurality of sensor systems 280 may comprise additional types of sensor systems to those non-exhaustively described above and without departing from the scope of the present technology.

Furthermore, the vehicle 220 is equipped with one or more Light Detection and Ranging (LiDAR) systems for gathering information about surroundings 250 of the vehicle 220. The LiDAR systems may be in addition to, or in some cases instead of, the plurality of sensor systems 280. A given LiDAR system 230 from the one or more LiDAR systems may be mounted, or retrofitted, to the vehicle 220 in a variety of locations and/or in a variety of configurations.

For example, a given LiDAR system 230 may be mounted on an interior, upper portion of a windshield of the vehicle 220. Nevertheless, as illustrated in FIG. 2, other locations for mounting the given LiDAR system 230 are within the scope of the present disclosure, including on a back window, side windows, front hood, rooftop, front grill, front bumper or the side of the vehicle 220. In some cases, the given LiDAR system 230 can even be mounted in a dedicated enclosure mounted on the top of the vehicle 220.

As mentioned above, the LiDAR system 230 may also be mounted in a variety of configurations.

In one embodiment, such as that of FIG. 2, the given LiDAR system 230 of the one or more LiDAR systems is mounted to the rooftop of the vehicle 220 in a rotatable configuration. For example, the given LiDAR system 230 mounted to the vehicle 220 in a rotatable configuration may comprise at least some components that are rotatable 360 degrees about an axis of rotation of the given LiDAR system 230. It should be noted that the given LiDAR system 230 mounted in rotatable configurations may gather data about most of the portions of the surroundings 250 of the vehicle 220.

In another embodiment, such as that of FIG. 2, the given LiDAR system 230 of the one or more LiDAR systems is mounted to the side, or the front grill, for example, in a non-rotatable configuration. For example, the given LiDAR system 230 mounted to the vehicle 220 in a non-rotatable configuration may comprise at least some components that are not rotatable 360 degrees and are configured to gather data about pre-determined portions of the surroundings 250 of the vehicle 220.

Irrespective of the specific location and/or the specific configuration of the given LiDAR system 230, the LiDAR system 230 is configured to capture data about the surroundings 250 of the vehicle 220 for building a multi-dimensional map of objects in the surroundings 250 of the vehicle 220. How the given LiDAR system 230 is configured to capture data about the surroundings 250 of the vehicle 220 will now be described.

LiDAR System

Figure 3:
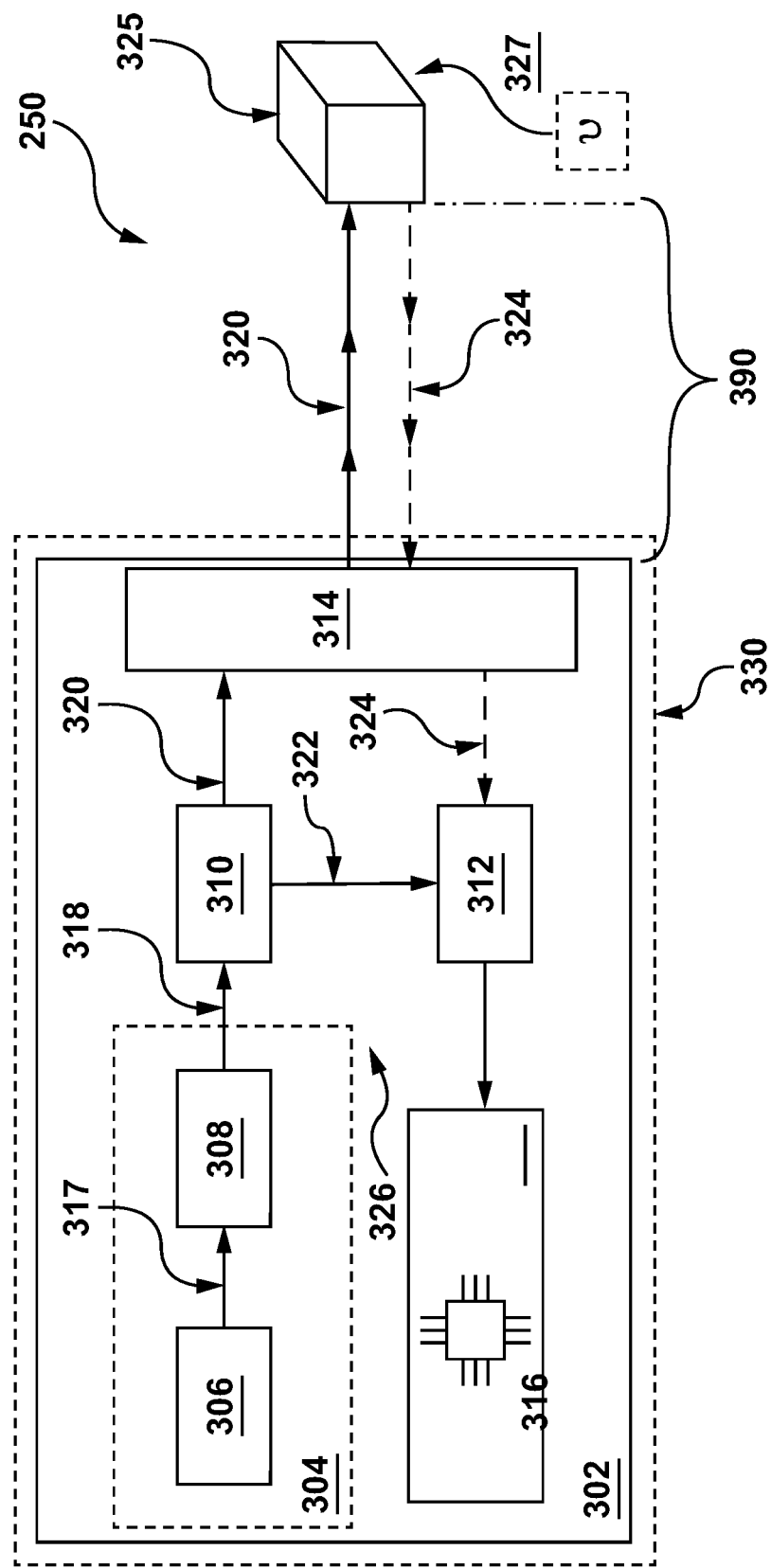
FIG. 3 depicts a schematic diagram of an example LiDAR system for implementing certain non-limiting embodiments of systems and/or methods of the present technology.

With reference to FIG. 3, there is depicted a schematic diagram of a non-limiting example of a LiDAR system 302. It should be noted that the LiDAR system 230 (present in the network computer environment depicted in FIG. 2) may be implemented in a similar manner to the implementation of the LiDAR system 302.

In general, the operation of the LiDAR system 302 may be described as follows: a light source (such as a light source component 306) of the LiDAR system 302 sends out an output light beam for locating/capturing data of apriori unknown objects (such as an object 325) in the surroundings 250 of the vehicle 220, for example, for generating a multi-dimensional map thereof where objects (including the object 325) are represented in a form of one or more data points.

For example, let it be assumed that the object 325 is located at a distance 390 from the LiDAR system 302. Once the output light beam reaches the object 325, the object 325 may reflect at least a portion of light from the output light beam, and some of the reflected light beams may return back towards the LiDAR system 302 in a form of an input light beam. By reflecting, it is meant that at least a portion of light beam from the output light beam bounces off the object 325. A portion of the light beam from the output light beam may be absorbed by the object 325.

Accordingly, the input light beam is captured by the LiDAR system 302 via a receiver component 312. Finally, by measuring a time between emitting the output light beam and receiving the input light beam, as will be explained in greater detail below, the distance 390 to the object 325 may be calculated, for example, by a controller component 316.

In the non-limiting embodiments of the present technology, the LiDAR system 302 may be a frequency-modulated continuous wave LiDAR system (FMCW LiDAR system). In these embodiments, the light source component 306 may comprise one or more continuous-wave lasers. In these embodiments, the light source component 306 is configured to continuously emit radiation in a form of a light beam of the predetermined wavelength (such as a CW output beam 317). Accordingly, to receive data of the object 325, the LiDAR system 302 may be configured to modulate frequency of the CW output beam 317, thereby generating an FMCW output beam 318, which is further split into an FMCW scanning beam 320 and an FMCW reference beam 322. Finally, the LiDAR system 302 is further configured to compare certain characteristics of the input light beam (such as an FMCW input beam 324), reflected off the object 325, and the FMCW reference beam 322. By doing so, the LiDAR system 302 may be configured to calculate the distance 390 to the object 325 and, for example, an instantaneous speed thereof. How the LiDAR system 302 is configured to operate in order to determine the data of the object 325 will be described immediately with continued reference to FIG. 3 and with reference to FIGS. 4 to 7.

Broadly speaking, the LiDAR system 302 may comprise a variety of internal components such as, but not limited to: (i) a frequency-modulated continuous wave (FMCW) light source component 304; (ii) a beam splitter component 310; (iii) a scanner component 314, (iv) the receiver component 312 (also referred to herein as a "detection system" or a "detector"), and (v) the controller component 316. It is contemplated that in addition to the internal components non-exhaustively listed above, the LiDAR system 302 may further comprise a variety of sensors (such as, for example, a temperature sensor, a moisture sensor, etc.) which are omitted from FIG. 3 for the sake of clarity.

In certain non-limiting embodiments of the present technology, one or more of the internal components of the LiDAR system 302 may be implemented in a common housing 330 as depicted in FIG. 3. In other non-limiting embodiments of the present technology, at least the controller component 316 may be located outside of the common housing 330, and optionally remotely thereto.

FMCW Light Source Component

According to the non-limiting embodiments of the present technology, the FMCW light source component 304 is configured to generate a light beam representable by a FMCW light beam (for example, the FMCW output beam 318). To that end, in the non-limiting embodiments of the present technology, the FMCW light source component 304 comprises the light source component 306 (also referred to as a "radiation source component") and a frequency modulation (FM) component 308.

It should be expressly understood that the FMCW light source component 304 may further include other components, which are omitted in FIG. 3 for the sake of clarity, that may include, without being limited to, optical components, such as lenses, prisms, mirrors, collimators, polarizers, and the like for generating and directing the FMCW output beam 318 further, through the LiDAR system 302, transforming it into the FMCW scanning beam 320 that is finally directed downrange towards the surroundings 250 of the vehicle 220.

In some non-limiting embodiments of the present technology, the light source component 306 and the FM component 308, along with the other components, of the FMCW light source component 304 may be installed independently within the common housing 330 of the LiDAR system 302. In other non-limiting embodiments of the present technology, the light source component 306 and the FM component 308 may be enclosed in a separate housing (not separately depicted).

Further, it should be noted that in at least some non-limiting embodiments of the present technology, the FMCW light source component 304 may be rotatable, such as by 360 degrees or less, about the axis of rotation (not depicted) of the LiDAR system 302 when the LiDAR system 302 is implemented in a rotatable configuration. However, in other embodiments, the FMCW light source component 304 may be stationary even when the LiDAR system 302 is implemented in a rotatable configuration, without departing from the scope of the present technology.

Light Source Component

The light source component 306 is communicatively coupled to the controller component 316 and is configured to emit radiation, such as a radiation signal in the form of a beam. In certain embodiments, the light source component 306 is configured to emit light. The light source component 306 comprises one or more lasers that emit light having a particular operating wavelength. The operating wavelength of the light source component 306 may be in the infrared, visible, and/or ultraviolet portions of the electromagnetic spectrum. For example, the light source component 306 may include one or more lasers with an operating wavelength between about 650 nm and 1150 nm. Alternatively, the light source component 306 may include a laser diode configured to emit light at a wavelength between about 800 nm and about 1000 nm, between about 850 nm and about 950 nm, or between about 1300 nm and about 1600 nm. However, it should be noted that the light source component 306 may include lasers with different operating wavelengths, without departing from the scope of the present technology. In certain other non-limiting embodiments of the present technology, the light source component 306 comprises a light emitting diode (LED).

In accordance with certain non-limiting embodiments of the present technology, the light source component 306 may be configured to emit a light beam representable by a continuous wave of the operating wavelength. To that end, as alluded to above, the light source component 306 may include one or more continuous wave lasers, for generating the CW output beam 317.

Broadly speaking, within the context of the present specification, a given continuous wave laser (or otherwise, a laser configured to operate in a continuous-wave operation mode) is broadly referred to as a laser radiation source that is configured to emit a continuous uninterrupted beam of light (such as the CW output beam 317) represented by an electromagnetic wave of the predetermined wavelength with constant amplitude and frequency, which may thus be characterized by a relatively stable output power.

In accordance with certain non-limiting embodiments of the present technology, the CW output beam 317 may be represented by a continuous wave electrical signal (voltage or current), for example, in a form of a sinusoidal waveform.

Figure 4:
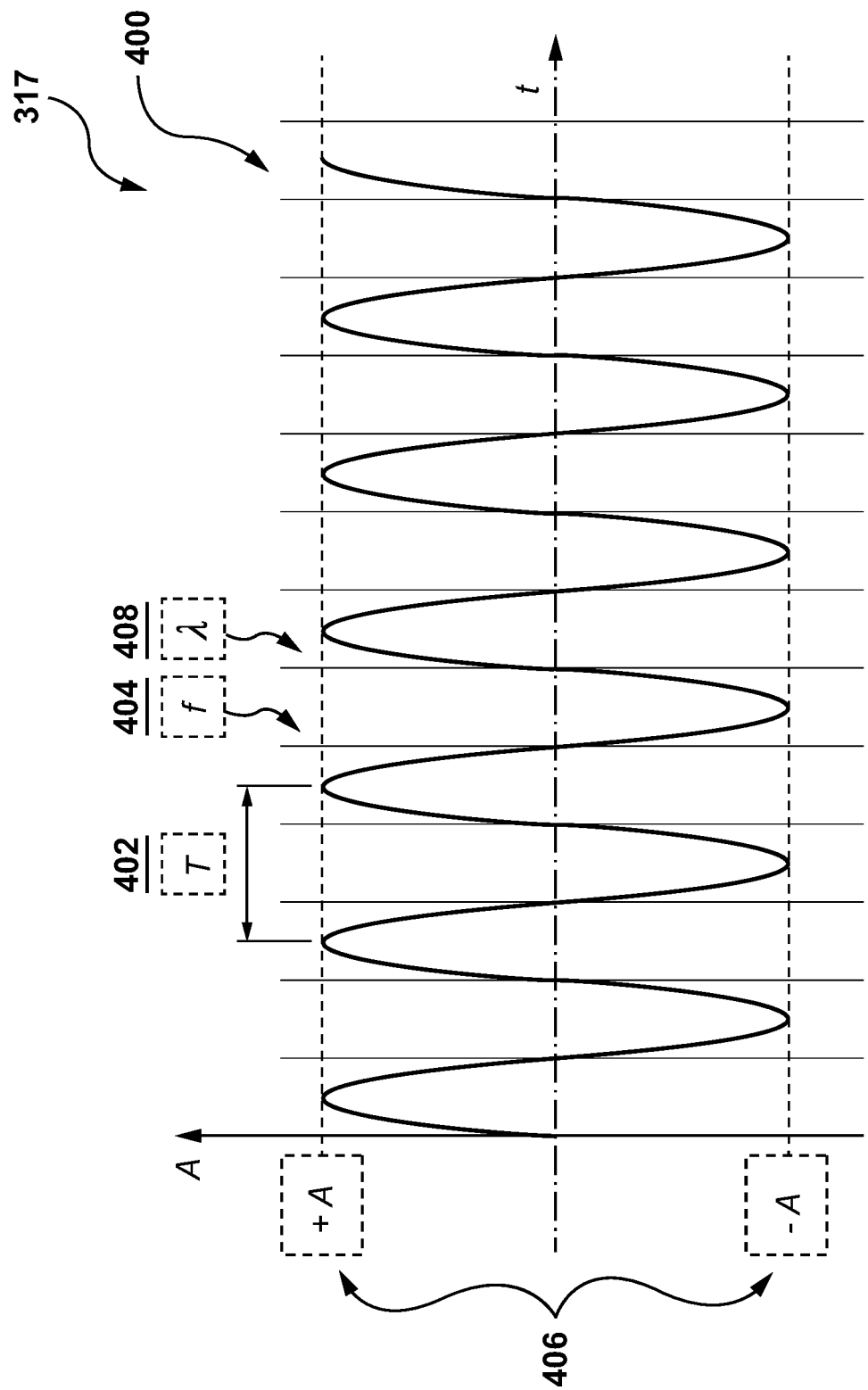
FIG. 4 depicts a representation of a continuous wave-based (CW-based) optical signal used in the LiDAR system of FIG. 3 detecting objects in surroundings of a vehicle present in the network computing environment of FIG. 2, in accordance with the non-limiting embodiments of the present technology.

With reference to FIG. 4, there is depicted a representation of a CW electrical signal 400 generated by the controller component 316 based on the CW output beam 317 emitted by the light source component 306 of the LiDAR system 302, in accordance with the non-limiting embodiments of the present technology.

As it can be appreciated from FIG. 4, the CW electrical signal 400 may be characterized by at least the following parameters: a CW oscillation period 402, T and a CW amplitude 406, A. Further, based on these parameters and, for example, the speed of light, other parameters of the CW electrical signal 400 may be derived, such as a CW frequency 404, f, and a CW wavelength 408, λ (the operating wavelength of the light source component 306). Formally, the CW electrical signal 400 of the CW output beam 317 may be defined as a function of time y(t), for example, by the following equation:

$$y(t) = A \sin(\omega t + \varphi), \quad (1)$$

where A is the CW amplitude 406;
  ω is a CW angular frequency defined as 2πf (2π multiplied by the CW frequency 404);
  φ is an oscillation phase (not separately depicted); and
  t is time.

It should be noted that some of the above characteristics of the CW electrical signal 400 of the CW output beam 317 (for example, the CW oscillation period 402, and hence the CW frequency 404) may be dependent on the operating wavelength of the light source component 306, which is further associated with various types (defined by used laser gain media therein, for example) of the one or more continuous wave lasers, which the light source component 306 includes.

In some non-limiting embodiments of the present technology, the light source component 306 may comprise one or more laser diodes, such as, but not limited to: Fabry-Perot laser diode, a quantum well laser, a distributed Bragg reflector (DBR) laser, a distributed feedback (DFB) laser, or a vertical-cavity surface-emitting laser (VCSEL). Just as examples, a given laser diode operating in the light source component 306 may be an aluminum-gallium-arsenide (AlGaAs) laser diode, an indium-gallium-arsenide (InGaAs) laser diode, or an indium-gallium-arsenide-phosphide (InGaAsP) laser diode, or any other suitable laser diode. It should be expressly understood that other laser types associated with respective laser gain media, allowing the light source component 306 to operate in the continuous-wave operation mode, may be used without departing from the scope of the present technology, such as gas lasers, solid-state lasers, chemical lasers, and the like.

It is contemplated that the LiDAR system 302 may comprise an eye-safe laser, or put another way, the LiDAR system 302 may be classified as an eye-safe laser system or laser product. Broadly speaking, an eye-safe laser, laser system, or laser product may be a system with some or all of: an emission wavelength, average power, peak power, peak intensity, pulse energy, beam size, beam divergence, exposure time, or scanned output beam such that emitted light from this system presents little or no possibility of causing damage to a person's eyes.

Further, it is contemplated that using the light source component 306 comprising one or more continuous-wave lasers provides a safer operation of the LiDAR system 302 in terms of saving human eyes from damaging. Specifically, in such a configuration of the light source component 306, the LiDAR system 302 may be configured to register data of the object 325 using the CW output beam 317, whose wavelength is beyond the visible light spectrum (for example, in the infrared spectrum), which allows for increasing power of the CW output beam 317 more without risks to damage people's vision. Finally, using the CW output beam 317 outside the visible light spectrum may further increase the robustness of the LiDAR system 302 to the sun light and other emissions, such as radiation emitted by other LiDAR systems. Thus, in certain non-limiting embodiments, the LiDAR system 302 may provide increased eye-safety and better resistance to light interference.

As will be described below in greater detail, according to the non-limiting embodiments of the present technology, based on the CW output beam 317, the LiDAR system 302 may be further configured to generate the FMCW scanning beam 320, which, when exiting the LiDAR system 302, is directed downrange towards the surroundings 250.

FM Component

According to the non-limiting embodiments of the present technology, the FM component 308 is communicatively coupled with the controller component 316 and is thereby configured to modulate the CW frequency 404 of the CW electrical signal 400 associated with the CW output beam 317 emitted by the light source component 306. By doing so, the FM component 308 is configured, by the controller component 316, to generate the FMCW output beam 318.

In the context of the present specification "frequency modulation" is broadly referred to as encoding information (for example, the data of the object 325) in a carrier signal (that is, the CW output beam 317) by forcedly varying its instantaneous frequency (that is, the CW frequency 404) according to a predetermined function, while the CW amplitude 406 and the oscillation phase (not depicted) remain constant. The predetermined function for varying the CW frequency 404 is accordingly referred to herein as a "frequency modulation function".

In some non-limiting embodiments of the present technology, the frequency modulation function may comprise a periodic frequency modulation function, such as a lower-frequency sinusoidal-based function, a rectangular function, and the like. In other non-limiting embodiments of the present technology, the frequency modulation function may be a chirp modulation function, such as a sawtooth function.

With reference to FIG. 5, there is depicted an example of a sawtooth function 500 used, by the FM component 308, for modulating the CW frequency 404, thereby generating the FMCW output beam 318, in accordance with some non-limiting embodiments of the present technology.

As it can be appreciated from FIG. 5, the sawtooth function 500 may be characterized by the following parameters: a sawtooth frequency modulation period 502, $T_1$, a sawtooth modulation frequency 504, $f_1$, and a sawtooth modulation amplitude 506, $A_1$. Thus, using the sawtooth function 500, the FM component 308 is configured to linearly continuously increase the CW frequency 404 of the CW electrical signal 400 from its initial value over the sawtooth frequency modulation period 502 until it reaches a value of the sawtooth modulation amplitude 506. Once the CW frequency 404 has reached the sawtooth modulation amplitude 506, the FM component 308 is further configured to reset the CW frequency 404 to its initial value and increase it over again at the sawtooth modulation frequency 504. By doing so, the FM component 308 is configured to repeatedly increase the CW frequency 404 at the sawtooth modulation frequency 504, thereby generating the FMCW output beam 318.

Thus, in these embodiments, the FMCW output beam 318 can be represented by a sawtooth chirp representation 508. As it can be appreciated, an amplitude (not separately depicted) and an oscillation phase (not separately depicted) of the sawtooth chirp representation 508, compared to those of the CW electrical signal 400, have remained unaltered, while its frequency changes according to the sawtooth function 500—that is, continuously linearly increases over a fixed period of time indicated by the sawtooth frequency modulation period 502. Thus, it can be said that the sawtooth function 500 defines a sawtooth frequency ramp waveform associated with the FMCW output beam 318.

In yet other non-limiting embodiments of the present technology, the frequency modulation function may be a triangle function. With reference to FIG. 6, there is depicted a triangle function 600 used, by the FM component 308 for modulating the CW frequency 404, in accordance with some non-limiting embodiments of the present technology.

As it can be appreciated from FIG. 6, the triangle function 600 may be characterized by the following parameters: a triangle frequency modulation period 602, $T_2$, a triangle modulation frequency 604, $f_2$, and a triangle modulation amplitude 606, $A_2$. Thus, using the triangle function 600, the FM component 308 is configured to (1) linearly increase the CW frequency 404 of the CW electrical signal 400 from its initial value over the first half ($T_2/2$) of the triangle frequency modulation period 602 to a value of the triangle modulation amplitude 606; and (2) linearly decrease the CW frequency 404 resetting it to its initial value, over the second half of the triangle frequency modulation period 602. Thus, the FM component 308 is configured to repeatedly increase and decrease the CW frequency linearly at the triangle modulation frequency 604, thereby generating the FMCW output beam 318.

Thus, in these embodiments, the FM output beam 318 can be represented by a triangular chirp representation 608. As it can be appreciated, an amplitude (not separately depicted) and an oscillation phase (not separately depicted) of the triangular chirp representation 608 remain constant (that is unchanged relative to those of the CW electrical signal 400), while its frequency (not separately depicted) changes according to the triangle function 600—that is, continuously linearly increases during a fixed period of time corresponding to the first half of the triangle frequency modulation period 602, and linearly decreases during another fixed period of time corresponding to the second half of the triangle frequency modulation period 602. Thus, it can be said that the triangle function 600 defines a triangle frequency ramp waveform for the FMCW output beam 318.

Accordingly, for the sake of simplicity and clarity of explanation only, the description presented below is based on a premise that the amplitude associated with the FMCW output beam 318 is the CW amplitude 406 of the CW electrical signal 400 generated based on the CW output beam 317.

According to the non-limiting embodiments of the present technology, the FM component 308 may be implemented, for example, however without not being limited to, as one of an electro-optical modulation device, an acousto-optical modulation device, a fiber-coupled acousto-optic modulation device, and the like.

In a specific non-limiting example, the FM component 308 can be implemented as a circuit-based modulation device that may be of a type available from Gooch & Housego PLC of Dowlish Ford, Ilminster, TA19 0PF, United Kingdom. It should be expressly understood that the FM component 308 can be implemented in any other suitable equipment.

It should be noted that, in some non-limiting embodiments of the present technology, the FMCW output beam 318 generated by the FMCW light source component 304 may be a collimated optical beam with any suitable beam divergence for a given application. Broadly speaking, divergence of the FMCW output beam 318 is an angular measure of an increase in beam size (e.g., a beam radius or beam diameter) as the FMCW output beam 318 travels away from the FMCW light source component 304 or the LiDAR system 302. In some embodiments, the FMCW output beam 318 may have a substantially circular cross section.

It is also contemplated that the FMCW output beam 318 emitted by FMCW light source component 304 may be unpolarized or randomly polarized, may have no specific or fixed polarization (e.g., the polarization may vary with time), or may have a particular polarization (e.g., the FMCW output beam 318 may be linearly polarized, elliptically polarized, or circularly polarized).

Beam Splitter Component

Referring back to FIG. 3, there is further provided the beam splitter component 310 coupled to the FMCW light source component 304. Broadly speaking, in accordance with the non-limiting embodiments of the present technology, the beam splitter component 310 is an optical device that is configured to split a light beam (for example, the FMCW output beam 318) into at least two components of lesser intensity (for example, into the FMCW scanning beam 320 and the FMCW reference beam 322). As previously mentioned, the FMCW scanning beam 320 is further emitted towards the surroundings 250 of the vehicle 220 and used for capturing the data of the object 325, while the FMCW reference beam 322 is directed to the receiver component 312.

In other words, the beam splitter component 310 can be said to be configured to divide an intensity (optical power) of the FMCW output beam 318 between the FMCW scanning beam 320 and the FMCW reference beam 322. In some non-limiting embodiments of the present technology, the beam splitter component 310 may be configured to divide the intensity of the FMCW output beam 318 between the FMCW scanning beam 320 and the FMCW reference beam 322 equally. However, in other non-limiting embodiments of the present technology, the beam splitter component 310 may be configured to divide the intensity of the FMCW output beam 318 at any splitting ratio. For example, the beam splitter component 310 may be configured to use up to 80% of the intensity of the FMCW output beam 318 for forming the FMCW scanning beam 320, and the remainder of up to 20% of the intensity of the FMCW output beam 318—for forming the FMCW reference beam 322. In yet other non-limited embodiments of the present technology, the beam splitter component 310 may be configured to vary the splitting ratio for forming the FMCW scanning beam 320 (for example, from 1% to 95% of the intensity of the FMCW output beam 318).

Thus, akin to the FMCW output beam 318, the FMCW scanning beam 320 and the FMCW reference beam 322 also comprise FMCW beams of respective intensity portions of the FMCW output beam 318. Accordingly, as the intensity of a light beam and the amplitude of an electrical representation thereof are functionally related (based on a quadratic function, for example), an FMCW scanning amplitude associated with the FMCW scanning beam 320 and an FMCW reference amplitude associated with the FMCW reference beam 322 may be determined based on the CW amplitude 406 associated with the FMCW output beam 318 and the splitting ratio of the beam splitter component 310.

It should further be noted that some portion (for example, up to 10%) of the intensity of the FMCW output beam 318 may be absorbed by a material of the beam splitter component 310, which depends on a particular configuration thereof.

It should be expressly understood that ways of implementation of the beam splitter component 310 are not limited, and may include, according to the non-limiting embodiments of the present technology, a glass prism-based beam splitter component, a half-silver mirror-based beam splitter component, a dichroic mirror prism-based beam splitter component, a fiber-optic-based beam splitter component, and the like.

Thus, according to the non-limiting embodiments of the present technology, a non-exhaustive list of adjustable parameters associated with the beam splitter component 310, based on a specific application thereof, may include, for example, an operating wavelength range, which may vary from a finite number of wavelengths to a broader light spectrum (from 1200 to 1600 nm, as an example); an income incidence angle; polarizing/non-polarizing, and the like.

In a specific non-limiting example, the beam splitter component 310 can be implemented as a fiber-optic-based beam splitter component that may be of a type available from OZ Optics Ltd. of 219 Westbrook Rd Ottawa, Ontario K0A 1L0 Canada. It should be expressly understood that the beam splitter component 310 can be implemented in any other suitable equipment.

In yet other specific non-limiting embodiments of the present technology, the beam splitter component 310 may be part of the FMCW light source component 304.

Internal Beam Paths

As schematically depicted in FIG. 3, the LiDAR system 302 may make use of a given internal beam path from a plurality of internal beam paths 326 for emitting the FMCW scanning beam 320 (formed by the beam splitter component 310) towards the surroundings 250. In one example, the given internal beam path amongst the plurality of internal beam paths 326 may allow providing the light from the light source component 306 to the FM component 308, further to the beam splitter component 310, and finally, to the scanner component 314 and, in turn, the scanner component 314 may allow the FMCW scanning beam 320 to be directed downrange towards the surroundings 250. Also, another of the plurality of internal beam paths may be used by the LiDAR system 302 for providing light from the beam splitter component 310 to the receiver component 312.

Further, the LiDAR system 302 may make use of another given internal beam path from the plurality of internal beam paths 326 for providing the FMCW input beam 324 to the receiver component 312. In one example, the other given internal beam path amongst the plurality of internal beam paths 326 may allow providing the FMCW input beam 324 from the scanner component 314 to the receiver component 312. In another example, the another given internal beam path amongst the plurality of internal beam paths 326 may allow providing the FMCW input beam 324 directly from the surroundings 250 to the receiver component 312 (without the FMCW input beam 324 passing through the scanner component 314).

It should be noted that the plurality of internal beam paths 326 may comprise a variety of optical components. For example, the LiDAR system 302 may include one or more optical components configured to condition, shape, filter, modify, steer, or direct the FMCW scanning beam 320 and/or the FMCW input beam 324. For example, the LiDAR system 302 may include one or more lenses, mirrors, filters (e.g., band pass or interference filters), optical fibers, circulators, beam splitters, polarizers, polarizing beam splitters, wave plates (e.g., half-wave or quarter-wave plates), diffractive elements, microelectromechanical (MEM) elements, collimating elements, or holographic elements.

It is contemplated that in at least some non-limiting embodiments of the present technology, the given internal beam path and the another internal beam path from the plurality of internal beam paths 326 may share at least some common optical components, however, this might not be the case in each and every embodiment of the present technology.

Scanner Component

Generally speaking, the scanner component 314 steers the FMCW scanning beam 320 in one or more directions downrange towards the surroundings 250. The scanner component 314 may comprise a variety of optical components and/or mechanical-type components for performing the scanning of the FMCW scanning beam 320. For example, the scanner component 314 may include one or more mirrors, prisms, lenses, MEM components, piezoelectric components, optical fibers, splitters, diffractive elements, collimating elements, and the like. It should be noted that the scanner component 314 may also include one or more actuators (not separately depicted) driving at least some optical components to rotate, tilt, pivot, or move in an angular manner about one or more axes, for example.

Further, the scanner component 314 may be configured to scan the FMCW scanning beam 320 over a variety of horizontal angular ranges and/or vertical angular ranges. In other words, the scanner component 314 may be instrumental in providing the LiDAR system 302 with a desired Region of Interest (ROI, not separately depicted). The ROI (not separately depicted) of the LiDAR system 302 may refer to an area, a volume, a region, an angular range, and/or portion(s) of the surroundings 250 about which the LiDAR system 302 may be configured to scan and/or can capture data.

The scanner component 314 may be communicatively coupled to the controller component 316. As such, the controller component 316 may be configured to control the scanner component 314 so as to guide the FMCW scanning beam 320 in a desired direction downrange and/or along a desired scan pattern. Broadly speaking, a scan pattern may refer to a pattern or path along which the FMCW scanning beam 320 is directed by the scanner component 314 during operation.

In operation, in certain embodiments, having received the FMCW output beam 318, the beam splitter component 310 further forms the FMCW scanning beam 320, which the scanner component 314 scans across the ROI (not separately depicted) of the LiDAR system 302 in accordance with the scan pattern. Further, the object 325 may reflect at least a portion of the FMCW scanning beam 320, thereby generating the FMCW input beam 324, which, akin to the FMCW scanning beam 320. The receiver component 312 receives or detects photons from the FMCW input beam 324 and generates one or more representative data signals (electrical signals, for example). The receiver component 312 may also provide the so-generated electrical signal to the controller component 316 for further processing, which will be described below with reference to FIG. 7.

Receiver Component

According to the non-limiting embodiments of the present technology, the receiver component 312 (also referred to herein as a "detector") is communicatively coupled to the controller component 316 and may be implemented in a variety of ways. Broadly speaking, the receiver component 312 is an optoelectronic device configurable, by the controller component 316, to convert an optical signal (such as the FMCW input beam 324) into a respective electrical signal (current and/or voltage). To that end, the receiver component 312 may comprise, for example, a photoreceiver, optical receiver, optical sensor, detector, photodetector, optical detector, optical fibers, and the like.

According to the non-limiting embodiments of the present technology, the receiver component 312 may be configured to receive at least a portion of the FMCW scanning beam 320 having been reflected off the object 325, which may be represented by the FMCW input beam 324. It should be noted that, in some cases, the FMCW input beam 324 may contain only a relatively small fraction of the light from the FMCW scanning beam 320 due to attenuation thereof caused by the reflection off the object 325. It should also be noted that an angle of the FMCW input beam 324 relative to a surface of the object 325 ("angle of incidence") may be the same or different than an angle of the FMCW scanning beam 320 relative to surface of the object 325 ("angle of reflection").

In this regard, according to the non-limiting embodiments of the present technology, the receiver component 312 may be configured to convert the FMCW input beam 324 into an FMCW input electrical signal. Further, the receiver component 312 may be configured to send the so generated FMCW input electrical signal to the controller component 316 for further analysis.

According to some non-limiting embodiments of the present technology, the receiver component 312 may further comprise at least two inputs so as to be configured to receive at least an other optical signal, aside from the FMCW input beam 324—for example, the FMCW reference beam 322. Further, the receiver component 312 can be configured to convert the FMCW reference beam 322 into an FMCW reference electrical signal and further send it to the controller component 316 for further analysis.

Thus, according to some non-limited embodiments of the present technology, the receiver component 312 may be configured to (1) receive FMCW input beam 324 and the FMCW reference beam 322; (2) convert the FMCW input beam 324 and the FMCW reference beam 322 into the FMCW input electrical signal and the FMCW reference electrical signal, respectively; and (3) transmit the FMCW input electrical signal and the FMCW reference electrical signal to the controller component 316 for analyzing certain characteristics thereof, thereby determining the data of the object 325, as will be described below with reference to FIG. 7.

In some non-limiting embodiments of the present technology, before transmitting the FMCW input electrical signal and the FMCW reference electrical signal to the controller component 316, the receiver component 312 may further be configured to generate a composition thereof, and further transmit it to the controller component 316 for making use thereof to determine the data of the object 325, as will be described below with reference to FIGS. 8 to 23.

In certain non-limiting embodiments of the present technology, the receiver component 312 is a coherent receiver component. In other words, the receiver component 312 may be configured, by the controller component 316, to receive the FMCW input beam 324 only if it is coherent with the FMCW reference beam 322, that is at least one of phase differences, frequencies, and waveforms respectively associated therewith are substantially identical and constant in time.

It is contemplated that the receiver component 312 may be implemented with one or more avalanche photodiodes (APDs), one or more single-photon avalanche diodes (SPADs), one or more PN photodiodes (e.g., a photodiode structure formed by a p-type semiconductor and a n-type semiconductor), one or more PIN photodiodes (e.g., a photodiode structure formed by an undoped intrinsic semiconductor region located between p-type and n-type regions), and the like.

In some non-limiting embodiments, the receiver component 312 may also comprise circuitry that performs signal amplification, sampling, filtering, signal conditioning, analog-to-digital conversion, time-to-digital conversion, pulse detection, threshold detection, rising-edge detection, falling-edge detection, and the like. For example, the receiver component 312 may include electronic components configured to convert a received photocurrent (e.g., a current produced by an APD in response to a received optical signal) into a voltage signal.

In some non-limiting embodiments of the present technology, the receiver component 312 and the controller component 316 may be implemented as an integral component of the LiDAR system 302, enclosed in a separate housing (not separately depicted), thereby providing for receiving incoming light beams, generating respective electrical signal and determining, based on analyzing the respective electrical signals, the data of the object 325.

Controller Component

In the non-limiting embodiments of the present technology, the controller component 316 may include one or more processors, an application-specific integrated circuit (ASIC), a field-programmable gate array (FPGA), and/or other suitable circuitry. The controller component 316 may also include non-transitory computer-readable memory to store instructions executable by the controller component 316 as well as data, which the controller component 316 may produce based on the signals acquired from other internal components of the LiDAR system 302 and/or may provide signals to the other internal components of the LiDAR system 302. The memory can include volatile (e.g., RAM) and/or non-volatile (e.g., flash memory, a hard disk) components. The controller component 316 may be configured to generate data during operation and store it in the memory. For example, this data generated by the controller component 316 may be indicative of the data points in the point cloud of the LiDAR system 302.

It is contemplated that in at least some non-limiting embodiments of the present technology, the controller component 316 may be implemented in a similar manner to the electronic device 210 and/or the computer system 100, without departing from the scope of the present technology.

In addition to collecting data from the receiver component 312, the controller component 316 may also be configured to provide control signals to, and potentially receive diagnostics data from, the light source component 306, the FM component 308, and the scanner component 314.

As previously stated, the controller component 316 is communicatively coupled to one or more of the light source component 306, the FM component 308, the scanner component 314, and the receiver component 312. According to the non-limiting embodiments of the present technology, the controller component 316 may further provide instructions, a control signal, and/or a trigger signal to the FMCW light source component 304 causing the FMCW light source component 304 to produce light emission.

Just as an example, the controller component 316 may be configured to send an electrical signal so that the FMCW light source component 304 begins to emit the FMCW output beam 318. It is also contemplated that, the controller component 316 may cause the FMCW light source component 304 to adjust one or more characteristics of the light emission produced by the FMCW light source component 304 such as, but not limited to: frequency, period, duration, output power, and wavelength of the FMCW output beam 318 (and/or of the CW output beam 317). Further, the controller component 316 may be configured to cause the FMCW light source component 304 to apply a particular frequency modulation function (such as the sawtooth function 500 and the triangle function 600).

As previously mentioned, the controller component 316 may be further configured to determine the data of the object 325 captured, by the FMCW light source component 304, in the surroundings 250 of the vehicle 220.

In some non-limiting embodiments of the present technology, the object 325 may comprise a static object, such as a traffic light, a pylon, a stopped vehicle, and the like. In other non-limiting embodiments of the present technology, the object 325 may comprise a dynamic object, such as a moving vehicle, a cyclist, a pedestrian, an animal, and the like.

Thus, according to the non-limiting embodiments of the present technology, the data of the object 325 may include at least the distance 390 thereto from the LiDAR system 302, and the instantaneous speed 327 thereof relative to the LiDAR system 302, as an example.

According to the non-limiting embodiments of the present technology, the controller component 316 is configured to determine the data of the object 325 based on analyzing the FMCW input electrical signal and the FMCW reference electrical signal generated by the receiver component 312 in response to receiving the FMCW input beam 324 and the FMCW reference beam 322, respectively.

Figure 7:
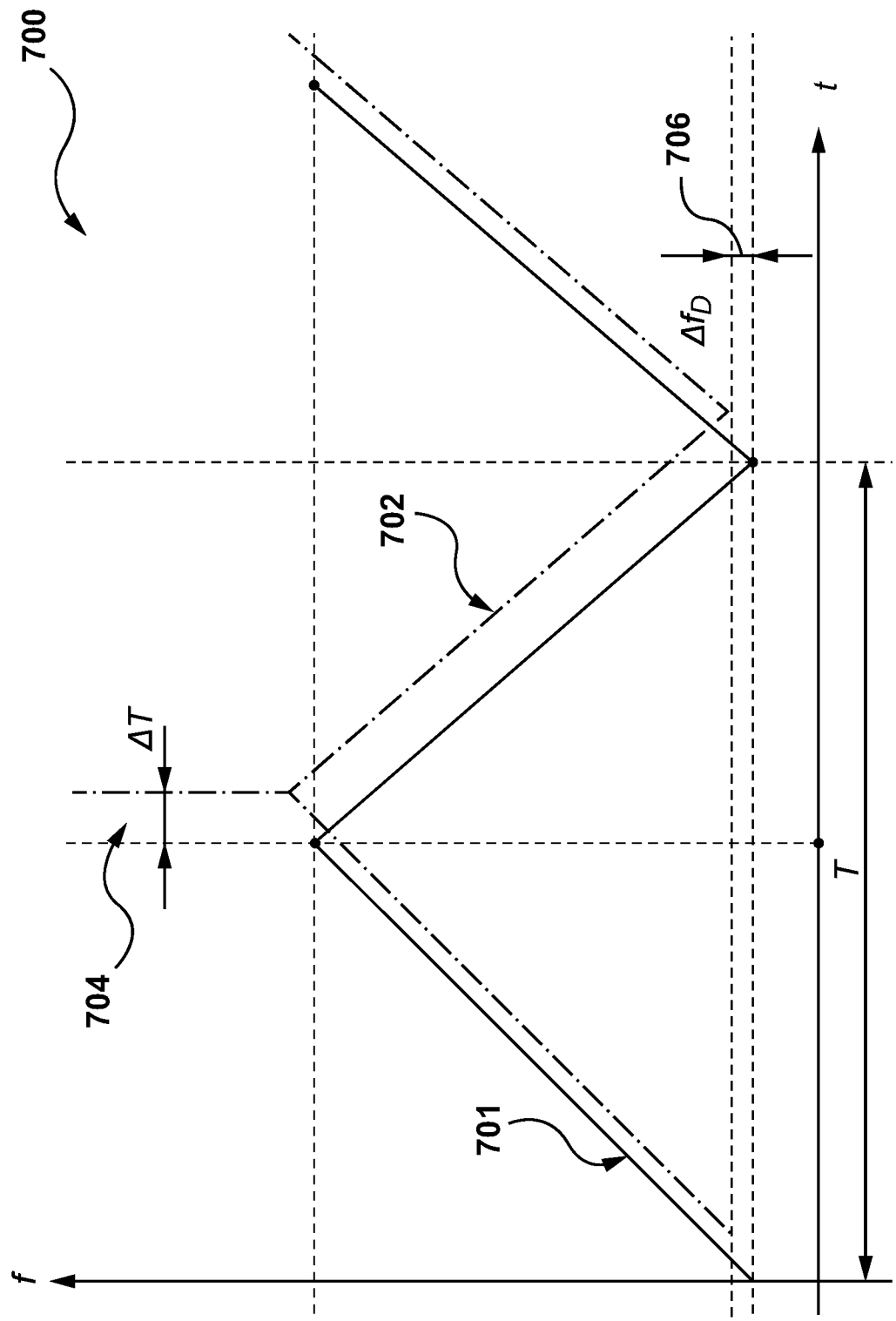
FIG. 7 depicts a schematic diagram of a method for determining data of an object located in the surroundings of the vehicle present in the network computing environment of FIG. 2 based on data obtained by the LiDAR system of FIG. 3, in accordance with the non-limiting embodiments of the present technology.

With reference to FIG. 7, there is depicted a schematic diagram of a superimposition 700 of a first triangle frequency ramp waveform 701 corresponding to the FMCW reference beam 322 and a second triangle frequency ramp waveform 702 corresponding to the FMCW input beam 324 acquired by the controller component 316 from the receiver component 312, in accordance with the non-limiting embodiments of the present technology. As it can be appreciated, the first triangle frequency ramp waveform 701 and the second triangle frequency ramp waveform 702 may be generated by the FMCW light source component 304 having applied the triangle function 600 as described above with reference to FIG. 6.

As it can be appreciated from FIG. 7, as the FMCW scanning beam 320 (mirrored in the FMCW reference beam 322) has reflected off the object 325, triggering generation of the FMCW input beam 324, the reflecting has caused a time shift 704, $\Delta T$ and a frequency shift 706, $\Delta f_D$ (also referred to herein as a Doppler frequency) therebetween. According to the non-limiting embodiments of the present technology, the controller component 316 may be configured to determine the data of the object 325 based on the time shift 704 and the frequency shift 706. By doing so, the controller component 316 can be said to decode the data of the object 325 from the FMCW input beam 324 encoded thereto by the frequency modulation.

For example, as it can be shown that the time shift 704 is indicative of the "round trip time" for an emitted light beam to travel from the LiDAR system 302 to the object 325 and back to the LiDAR system 302, the controller component 316 may be configured to calculate the distance 390 in accordance with the following equation:

$$D = \frac{c\Delta T}{2}, \tag{2}$$

where D is the distance 390 to the object 325;
c is the speed of light (approximately $3.0 \times 10^8$ m/s); and
$\Delta T$ is the time shift 704.

Further, based on the frequency shift 706, the controller component 316 may be configured to calculate the instantaneous speed of the object 325 relative to the LiDAR system 302, in accordance with the following equation:

$$v = \frac{\lambda}{2}\Delta f_D, \tag{3}$$

where v is the instantaneous speed 327 of the object 325 relative to the LiDAR system 302;
$\lambda$ is the operating wavelength of the light source component 306 (the CW wavelength 408); and
$\Delta f_D$ is the frequency shift 706 between the first triangle frequency ramp waveform 701 and the second triangle frequency ramp waveform 702.

Thus, in accordance with certain non-limiting embodiments of the present technology, the LiDAR system 302 may be used for determining distances to one or more other potential objects located in the surroundings 250 of the vehicle 220 representing the so determined distances (similar to the distance 390) in a form of a point cloud, which is further may be used for generating the multi-dimensional map of the surroundings 250. Further, the LiDAR system 302 may be configured for "online" speed and distance registration (akin to determining the instantaneous speed 327) of the objects located in the surroundings 250, which may further allow for planning trajectory for the vehicle 220 in respect of road safety (avoiding collisions with other vehicles, for example) and passenger comfort.

According to the non-limiting embodiments of the present technology, the LiDAR system 302, based on specific parameters thereof, such as the FMCW light source component 304 and the receiver component 312, may be associated with a threshold ranging distance value indicative of a longest distance, within which the LiDAR system 302 may be configured to detect an object (such as the object 325). In other words, the threshold ranging distance value associated with the LiDAR system 302 may be indicative of a distance, from which the LiDAR system 302 may be configured to receive the FMCW input beam 324 allowing for obtaining reliable data of the object 325.

However, as noted hereinabove, the FMCW input beam 324 may be attenuated, when carrying data of the object 325, by reflection therefrom, that is, the intensity of the FMCW input beam 324 may be significantly decreased (in a sense, "faded out") which may result in the receiver component 312 being unable to receive the FMCW input beam 324 and/or generate an electrical signal allowing for obtaining the reliable data of the object 325.

In the context of the present specification, the term "attenuation" is broadly referred to as a reduction of an intensity of a light beam (for example, the FMCW input beam 324) as it is travelling through a medium due to absorption or scattering of its photons. Thus, certain factors causing the attenuation may include, without being limited to: (1) background optical noise caused, for example, by other LiDAR systems operating in the surroundings 250 or solar irradiance (or any other electromagnetic interference); (2) various physical obstacles (such as other objects in the surroundings 250) in a way between the object 325 and the LiDAR system 302 that may hamper free propagation of the FMCW input beam 324 or absorb at least a portion thereof; and (3) various media that may be potentially present in the air, such as gases, moisture (due to mist, for example), and the like, where an attenuation rate depends on the distance 390 to the object 325. Further, greater values of the distance 390 may further increase likelihood of the FMCW input beam 324 being affected by the above factors, which allows to consider the distance 390 per se as an independent attenuation factor.

Thus, some non-limiting embodiments of the present technology are directed to systems and methods for amplifying a given input light beam (that is, forcedly increasing its intensity) before the given input light beam (or a respective electrical signal indicative thereof) is being analyzed by the controller component 316 for determining the data of the object 325.

As it will become apparent from the description presented herein further below, in some non-limiting embodiments of the present technology, the given input light beam may be an FMCW input light beam (such as the FMCW input light beam 324), whereas in other non-limiting embodiments of the present technology, the given input light beam may be an amplitude-modulated FMCW input light beam.

Therefore, in some non-limiting embodiments of the present technology, the amplifying the FMCW input beam 324 may comprise modulating, by the LiDAR system 302, one of the CW amplitude 406 associated with the FMCW output beam 318, the output amplitude associated with the FMCW scanning beam 320, and the reference amplitude associated with the FMCW reference beam 322 based on an amplitude modulation function.

In the context of the present specification, the term "amplitude modulation" is broadly referred to as forcedly varying an intensity of a given light beam (represented by an associated amplitude, such as the CW amplitude 406 associated with the FMCW output beam 318, for example) according to the amplitude modulation function.

Thus, according to the non-limiting embodiments of the present technology, in order to apply the amplitude modulation function to one of the FMCW output beam 318, the FMCW scanning beam 320, and the FMCW reference beam 322, the LiDAR system 302 may further include an amplitude modulator (AM) component.

AM Component

Figure 8:
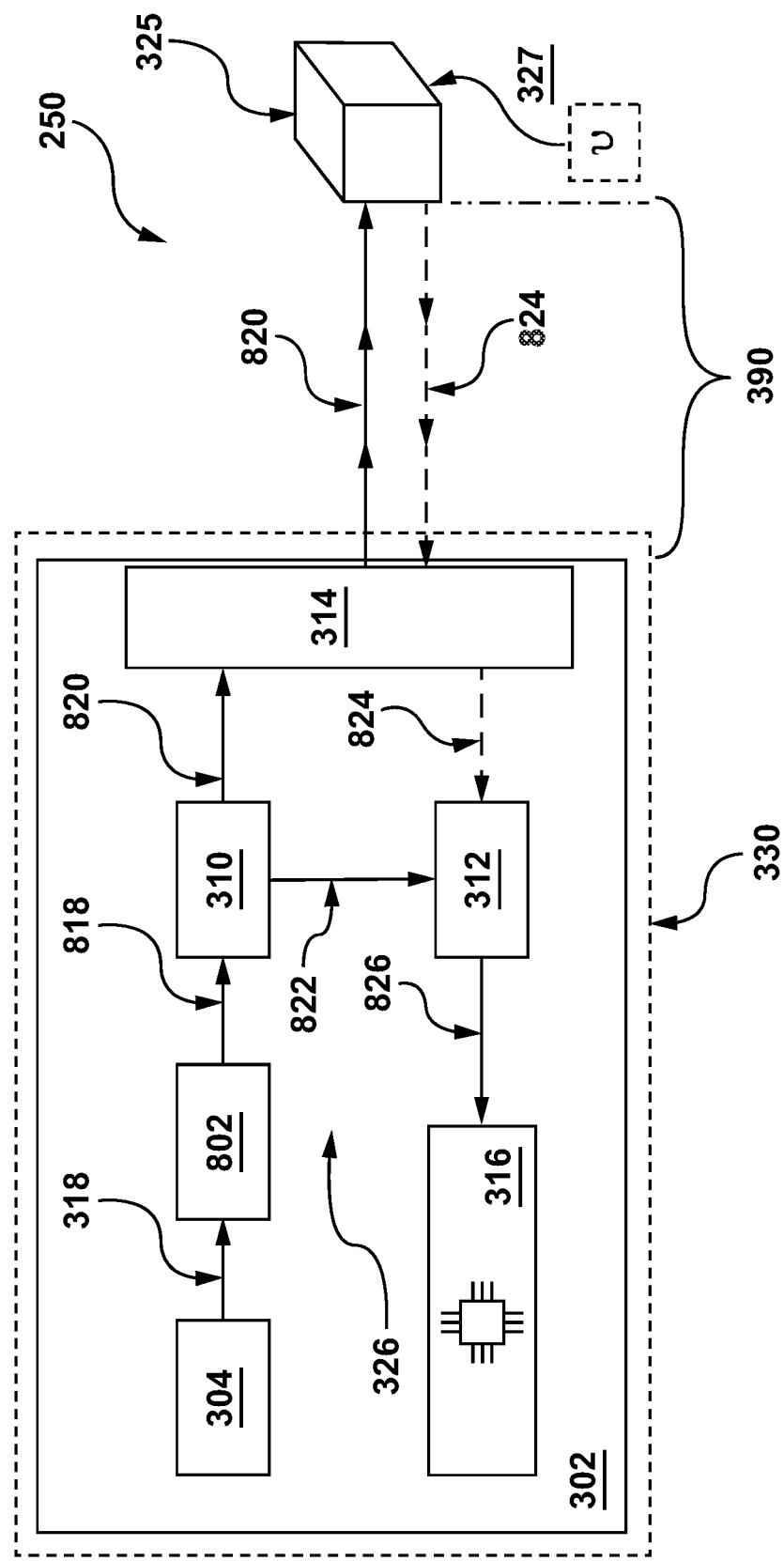
FIG. 8 depicts a first implementation of the LiDAR system of FIG. 3, in accordance with certain non-limiting embodiments of the present technology.

With reference to FIG. 8, there is depicted a schematic diagram of a first implementation of the LiDAR system 302, according to some non-limiting embodiments of the present technology. Specifically, in the first implementation, the LiDAR system 302, aside from the components thereof described above with reference to FIG. 3, includes an AM component 802 coupled to the FMCW light source component 304.

Broadly speaking, the AM component 802 is coupled with the controller component 316 and is thereby configured to receive an FMCW light beam and apply thereto the amplitude modulation function modulating an associated amplitude thereof, thereby generating an amplitude-frequency-modulated continuous wave (AFMCW) light beam. Thus, according to the non-limiting embodiments of the present technology, the AM component 802 may be configured to receive the FMCW output beam 318 generated by the FMCW light source component 304, apply thereto the amplitude modulation function for modulating the CW amplitude 406, thereby generating an AFMCW output beam 818. The LiDAR system 302 including the AM component 802 may be hence referred to as an "AFMCW" LiDAR system. Accordingly, certain parameters of the AFMCW output beam 818 are dependent on the amplitude modulation function.

According to the non-limiting embodiments of the present technology, the amplitude modulation function may comprise a periodic function (such as a sawtooth function, triangle function, sinusoid-based function, and the like), such that the CW amplitude 406 continuously changes (increases, for example) over an amplitude modulation period of the amplitude modulation function. Based on a specific configuration of the amplitude modulation function, there can be considered at least two scenarios for operating the AM component 802 in the LiDAR system 302.

Figure 9:
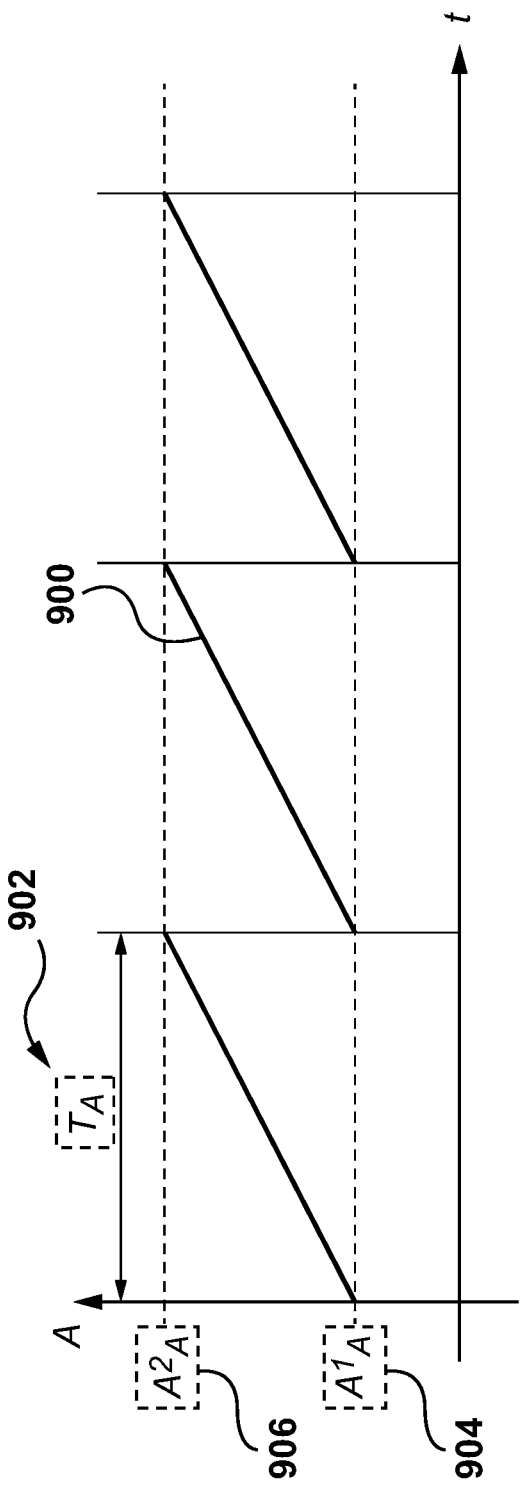
FIG. 9 depicts representation of a first example amplitude modulation function used in the LiDAR system of FIG. 3, in accordance with the non-limiting embodiments of the present technology.

In some non-limiting embodiments of the present technology, the amplitude modulation function may comprise a linear periodic function (Scenario 1). With reference to FIG. 9, there is depicted a graph of a linear periodic function 900 used by the AM component 802 for generating the AFMCW output beam 818 based on the FMCW output beam 318, in accordance with the non-limiting embodiments of the present technology. As it can be appreciated from FIG. 9, the linear periodic function 900 can be characterized by the following parameters: an amplitude modulation period 902, $T_A$, a first amplitude value 904, $A^1_A$, a second amplitude value 906, $A^2_A$. Further, the first amplitude value 904 and the second amplitude value 906 can hence be said to define a range of amplitude modulation associated with the AM component 802. Thus, using the linear periodic function 900, the AM component 802 of the LiDAR system 302 may be configured to continuously linearly increase the CW amplitude 406 associated with the FMCW output beam 318 from the first amplitude value 904 to the second amplitude value 906 over the amplitude modulation period 902, thereby generating the AFMCW output beam 818. Once the CW amplitude 406 reaches the second amplitude value 906, the AM component 802 is configured to reset it again to the first amplitude value 904, thereby generating a linear amplitude ramp waveform for the AFMCW output beam 818.

Figure 10:
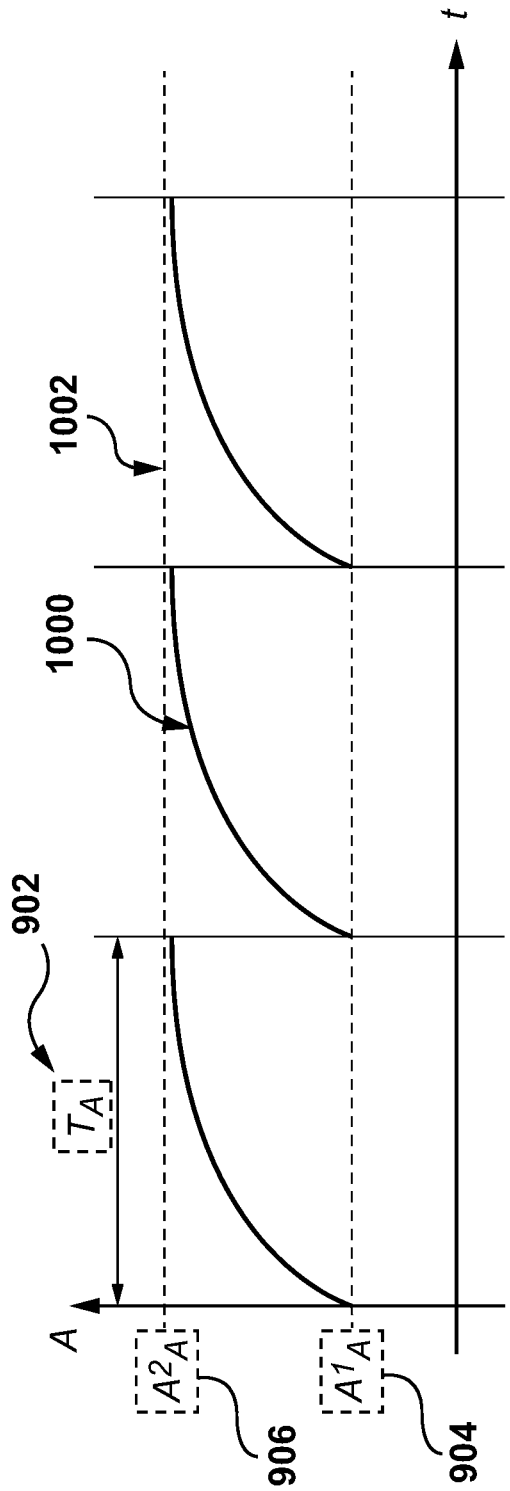
FIG. 10 depicts representation of a second example amplitude modulation function used in the LiDAR system of FIG. 3, in accordance with the non-limiting embodiments of the present technology.

In other non-limiting embodiments of the present technology, the amplitude modulation function may be any other periodic function, for example, an asymptotic periodic function (Scenario 2). With reference to FIG. 10, there is depicted a graph of an asymptotic periodic function 1000 used by the AM component 802 for modulating the CW amplitude 406 associated with the FMCW output beam 318, thereby generating the AFMCW output beam 818, in accordance with some non-limiting embodiments of the present technology.

Thus, in these embodiments, using the asymptotic periodic function 1000, the AM component 802 is configured to increase the CW amplitude 406 from the first amplitude value 904 continuously along the curve representative of the asymptotic periodic function 1000 over the amplitude modulation period 902 approaching the second amplitude value 906, operating within its the range of amplitude modulation. Further, as it can be appreciated, using the asymptotic periodic function 1000, the AM component 802 cannot be configured to increase the CW amplitude 406 to the second amplitude value 906, as in these embodiments, the CW amplitude 406 may only infinitely approach the second amplitude value 906 along an asymptote 1002 indicated thereby over the amplitude modulation period 902. Accordingly, with the amplitude modulation period 902, the AM component 802 is configured to repeatedly modulate the CW amplitude 406 using the asymptotic periodic function 1000, thereby generating an asymptotic amplitude ramp waveform for the AFMCW output beam 818.

In some non-limiting embodiments of the present technology, the amplitude modulation period 902 may be equal to a frequency modulation period (such as the sawtooth frequency modulation period 502 or the triangle frequency modulation period 602) such that the CW output beam 317 may be frequency- and amplitude-modulated over a common modulation period. For example, once the CW output beam 317 is directed through the FM component 308, its associated frequency, that is, the CW frequency 404, is modulated by the frequency modulation function over the frequency modulation period, thereby producing the FMCW output beam 318. Further, as another example, when the FMCW output beam 318 is being directed through the AM component 802, the CW amplitude 406 is modulated by the amplitude modulation function over the amplitude modulation function, thereby producing the AFMCW output beam 818.

In specific non-limiting embodiments of the present technology, the amplitude modulation period 902 may be predetermined based on the threshold ranging distance value associated with the LiDAR system 302. As previously noted, the longer the distance 390 to the object 325 is, the more attenuated the FMCW input beam 324 will be. To that end, the developers of the present technology have realized that, to be able to receive consistently reliable data of the object 325, an FMCW output beam of the LiDAR system 302 (such as the FMCW output beam 318 and/or FMCW scanning beam 320, for example) may be amplitude-modulated over the amplitude modulation period 902 which has been determined based on the threshold ranging distance value of the LiDAR system 302. In other words, the amplitude modulation period 902 may be predetermined to be equal to the round trip time for the FMCW scanning beam 320 to travel to the object 325 when it is located at the threshold ranging distance from the LiDAR system 302; reflected off the object 325; and return back to the LiDAR system 302. Further, the developers have appreciated that such approach to modulating the FMCW scanning beam 320 may allow for amplifying an input beam of the LiDAR system 302 (such as an AFMCW input beam 824, for example) as a function of the distance 390, such that the farther away the object 325 is located from the LiDAR system 302, the greater the amplitude associated with AFMCW input beam 824 would be.

In some non-limiting embodiments of the present technology, various ways of implementing the AM component 802 can be used, including, however, without being limited to:
- a MEMS variable optical modulator;
- an electro-optical modulator;
- a magneto-optical modulator;
- a fiber-optical amplifier;
- a semiconductor optical amplifier; and
- an other light source (such as another AFMCW light source, for example).

Thus, in order to apply the amplitude modulation function, the AM component 802 may be configured to use a variety of associated with respective implementations thereof including, but without being limited to: (1) deep attenuation of the continuous wave-based light beam followed by continuous decreasing a level of the attenuation in accordance with the amplitude modulation function; (2) continuous increasing a level of amplification of the continuous wave-based light beam; or (3) using a combined approach considering the level of attenuation and the level of amplification of the continuous wave-based light beam, as an example.

It is further contemplated that, in some non-limiting embodiments of the present technology, the AM component 802 may be an integral component of the FMCW light source component 304 such that the FMCW light source component 304 may be configured to generate an AFMCW beam (the AFMCW output beam 818, as an example).

Accordingly, the description below in respect of certain implementations of the LiDAR system 302 including the AM component 802 will be provided in light of Scenario 1 and Scenario 2. Further, it should be noted that depending on a particular placement of the AM component 802 within the LiDAR system 302, various implementations thereof may further be considered.

First Implementation of LiDAR System

Referring back to FIG. 8, according to the first implementation of the LiDAR system 302, the AM component 802 is configured to direct the AFMCW output beam 818 to the beam splitter component 310, which is configured to split it into an AFMCW scanning beam 820 directed downrange towards the surroundings 250 and an AFMCW reference beam 822 directed to the receiver component 312. Further, as previously alluded to, the AFMCW scanning beam 820 may scatter off one or more objects (such as the object 325) located in the surroundings 250, thereby generating an AFMCW input beam 824, which is further may be registered by the receiver component 312.

It should be expressly understood that for the sake of clarity of further description, it is assumed that the beam splitter component 310 divides an incoming light beam (such as the AFMCW output beam 818) equally into the respective output beams (such as the AFMCW scanning beam 820 and the AFMCW reference beam 822). Thus, it can be said that the AFMCW reference beam 822 may be considered as a "replica" of the AFMCW scanning beam 820.

As previously alluded to, the receiver component 312 may be configured, by the controller component 316, to receive the AFMCW reference beam 822 and the AFMCW input beam 824, generate electrical signals representative thereof, and further send the so generated electrical signal to the controller component 316 for further analysis. As a result, the controller component 316 may be configured to determine, based on analyzing the respective electrical signals, the data of the object 325, such as the distance 390 and the instantaneous speed 327 relative to the LiDAR system 302, as describe above with reference to FIG. 7.

However, due to attenuation of the AFMCW input beam 824, the controller component 316 may not be able to determine the reliable data of the object 325. Thus, as previously mentioned, according to the non-limiting embodiment of the present technology, the receiver component 312 may be configured to use the AFMCW reference beam 822 for amplifying the AFMCW input beam 824.

Specifically, in some non-limiting embodiments of the present technology, the receiver component 312 may be configured, by the controller component 316, to (1) receive the AFMCW input beam 824 and the AFMCW reference beam 822; (2) generate an AFMCW input electrical signal and an AFMCW reference electrical signal respectively associated therewith; (3) generate a composition of the AFMCW input electrical signal and the AFMCW reference electrical signal, thereby generating a first amplified AFMCW input electrical signal 826. Further, the controller component 316 may be configured to receive the so generated first amplified AFMCW electrical signal 826 for further analysis thereof in respect of the AFMCW reference electrical signal for determining the data of the object 325.

For example, and not as a limitation, the receiver component 312 may be configured to generate the AFMCW input electrical signal and the AFMCW reference electrical signal defined by the following equations:

$$\begin{cases} S_I = A_I \sin(\omega_I t + \varphi_0) \\ S_R = A_R \sin(\omega_R t + \varphi_0) \end{cases}, \quad (4)$$

where $S_I$ is a representation of the AFMCW input electrical signal;
$S_R$ is a representation of the AFMCW reference electrical signal
$A_I$ is an amplitude of the AFMCW input electrical signal;
$A_R$ is an amplitude of the AFMCW reference electrical signal;
$\omega_I$ is an angular frequency of the AFMCW input electrical signal;
$\omega_R$ is an angular frequency of the AFMCW reference electrical signal; and
$\varphi_0$ is an oscillation phase of the AFMCW input electrical signal and the AFMCW reference electrical signal.

It should be expressly understood that terms $A_I$, $A_R$, $\omega_I$, $\omega_R$, and $\varphi_0$ of Equations (4) are expressed as independent variables only for the sake of clarity of description and may be expressed as functions of time (such as respective configurations of the amplitude modulation function and the frequency modulation function) as described above with reference to the respective FIGS. 5 to 6 and 9 to 10.

Further, the receiver component 312, may be configured to generate the composition of the AFMCW input electrical signal and the AFMCW reference electrical signal. To that end, the receiver component may be configured to generate a summation (as an example, but other processing operations, such as multiplication, can be used as well) of these signals. For example, the composition of the AFMCW input electrical signal and the AFMCW reference electrical signal may be expressed by the following equation:

$$S = S_I + S_R = A\sin\left(\frac{\omega_1 + \omega_R}{2}t + \varphi_0\right)\cos\left(\frac{\omega_1 - \omega_R}{2}t\right), \quad (5)$$

where S is a representation of the first amplified AFMCW input electrical signal 826, and
A is an amplitude of the first amplified AFMCW input electrical signal 826, which can be determined in accordance with the following equation:

$$A = 2(A_I + A_R)^2. \quad (6)$$

Thus, the amplitude of the first amplified AFMCW input electrical signal 826 may be determined based on the respective amplitudes of the AFMCW input electrical signal and the AFMCW reference electrical signal, various approaches to generating which, by the AM component 802, will be described below with reference to FIGS. 11 and 12.

Further, it is contemplated that the receiver component 312 may have an input power threshold, which is indicative of maximum intensity values of received light beams (such as the AFMCW reference beam 822 and the AFMCW input beam 824) allowing for reliable conversion thereof into respective electrical signals (such as the AFMCW reference electrical signal and the AFMCW input electrical signal) without damaging the receiver component 312.

Thus, according to the non-limiting embodiments of the present technology, certain parameters of the AM component 802 may be adjusted, for example, a used amplitude modulation function (such as the linear periodic function 900 or the asymptotic periodic function 1000), certain parameters of the used amplitude modulation function (such as the second amplitude value 906), a used modulation technique, and the like, in order for a maximum value of the amplitude of the amplified AFMCW input electrical signal (determined based on Equation (6), for example) would not exceed a predetermined threshold amplitude value associated with the input power threshold of the receiver component 312. This condition can formally be expressed by the following equation:

$$|A_{max}| \leq R, \quad (7)$$

where $|A_{max}|$ is the maximum value of the amplitude of the amplified AFMCW input electrical signal determined based on the Equation (6); and
R is the predetermined threshold amplitude value associated with the receiver component 312.

For example, in those non-limiting embodiments of the present technology where the receiver component 312 comprises a semiconductor-based optical detector, the predetermined amplitude threshold value may be indicative of a peak inverse voltage associated with the receiver component 312.

In some non-limited embodiments of the present technology, the parameters of the AM component 802 in order to respect the condition (7) may be adjusted by an operator.

Scenario 1

Figure 11:
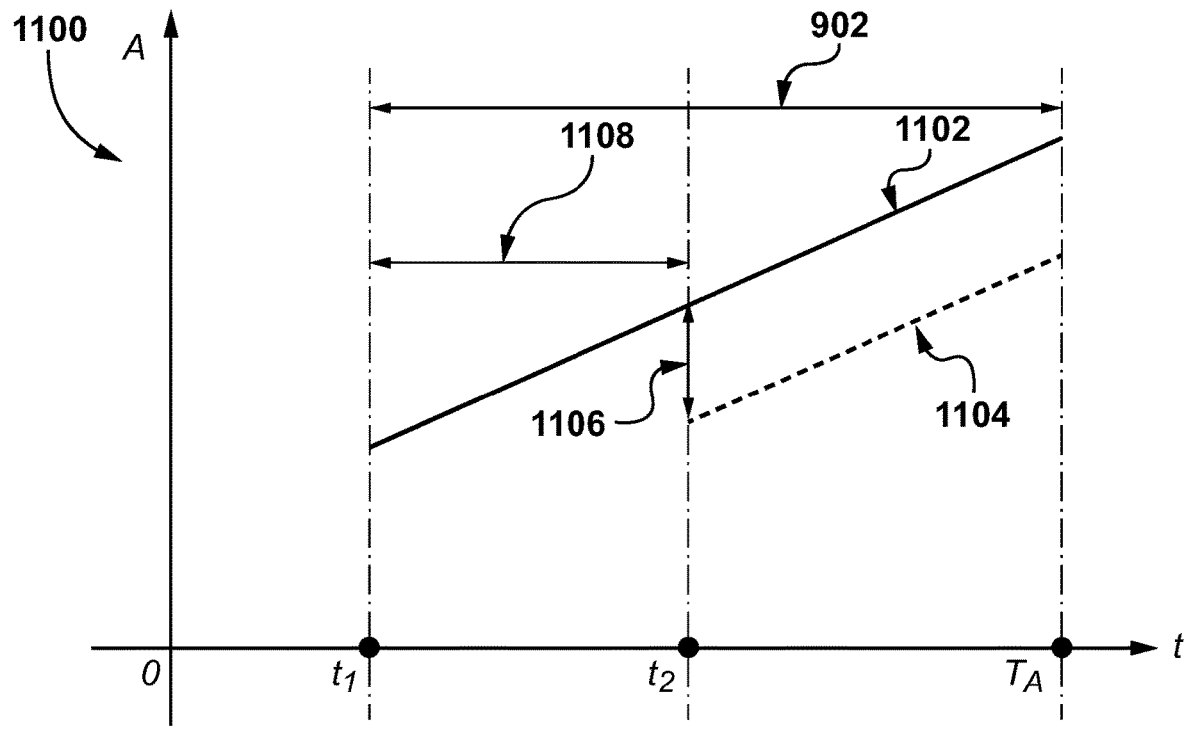
FIG. 11 depicts a schematic diagram of a first example method for amplifying an input CW-based optical signal of the LiDAR system of FIG. 10, in accordance with the non-limiting embodiments of the present technology.

With reference to FIG. 11, there is depicted a first amplitude ramp waveform representation 1100 of the AFMCW reference electrical signal and the AFMCW input electrical signal depicting a linear AFMCW reference amplitude signal 1102 and a linear AFMCW input amplitude signal 1104, in accordance with the first implementation of the LiDAR system 302. The linear AFMCW reference amplitude signal 1102 and the linear AFMCW input amplitude signal 1104 have been generated by the receiver component 312 based on the received AFMCW reference beam 822 and the AFMCW input beam 824, respectively.

As it can be appreciated from FIG. 11, the AFMCW reference beam 822 has been generated based on the AFMCW output beam 818 that was amplitude-modulated by the AM component 802 using the linear periodic function 900 as described above with reference to FIG. 9.

Thus, with continued reference to FIG. 11 and referring back to FIG. 8, first, at a first moment in time $t_1$, the AFMCW reference beam 822 is received by the receiver component 312 while the AFMCW scanning beam 820 is directed downrange towards the surroundings 250 of the vehicle 220, which is represented by the linear AFMCW reference amplitude signal 1102. Consequently, having reflected off the object 325, the AFMCW scanning beam 820 generates the AFMCW input beam 824 that may be received, by the receiver component 312, at a second moment in time $t_2$, as represented by the linear AFMCW input amplitude signal 1104. Both the linear AFMCW reference amplitude signal 1102 and the linear AFMCW input amplitude signal 1104 are continuously growing within the amplitude modulation period 902, in accordance with the linear periodic function 900.

As it can be further appreciated from FIG. 11, the reflection of the AFMCW scanning beam 820 off the object 325 and the distance 390 travelled back to the LiDAR system 302 have caused attenuation to the AFMCW input beam 824, which have resulted in a constant linear amplitude difference 1106.

Accordingly, as alluded to above, the receiver component 312 may be configured to generate the composition of the AFMCW reference electrical signal and the AFMCW input electrical signal, thereby generating the first amplified AFMCW input electrical signal 826, whose amplitude may be determined, for example, in accordance with Equation (6) based on the linear AFMCW reference amplitude signal 1102 and the linear AFMCW input amplitude signal 1104.

Finally, the first amplified AFMCW input electrical signal 826 may further be used, by the controller component 316, for determining the data of the object 325. For example, based on a time difference 1108 between the second moment in time $t_2$ and the first moment in time $t_1$, the controller component 316 may determine the distance 390 in accordance with Equation (2).

Thus, it can be said, that the amplitude modulation period 902 is indicative of a time difference between the second moment in time $t_2$ and the first moment in time $t_1$ when the object 325 is located in the surroundings 250 at the threshold ranging distance associated with the LiDAR system 302 (that is, when the distance 390 is equal to the threshold ranging distance).

Scenario 2

Figure 12:
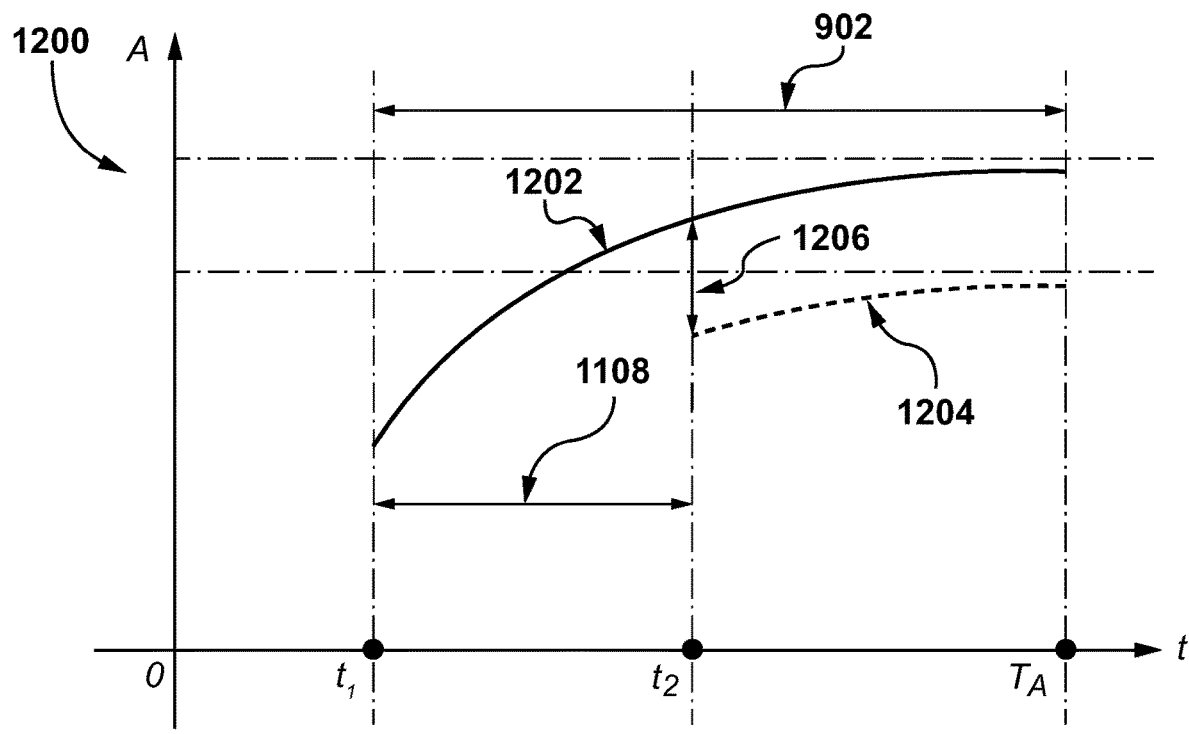
FIG. 12 depicts a schematic diagram of a second example method for amplifying an input CW-based optical signal of the LiDAR system of FIG. 10, in accordance with the non-limiting embodiments of the present technology.

With reference to FIG. 12, there is depicted a second amplitude ramp waveform representation 1200 of the AFMCW reference electrical signal and the AFMCW input electrical signal depicting an asymptotic AFMCW reference amplitude signal 1202 and an asymptotic AFMCW input amplitude signal 1204, in accordance with the first implementation of the LiDAR system 302. The asymptotic AFMCW reference amplitude signal 1202 and the asymptotic AFMCW input amplitude signal 1204 have been generated by the receiver component 312 based on the received AFMCW reference beam 822 and the AFMCW input beam 824, respectively.

As it can be appreciated from FIG. 12, the AFMCW reference beam 822 has been generated based on the AFMCW output beam 818 that was amplitude-modulated by the AM component 802 using the asymptotic periodic function 1000 as described above with reference to FIG. 10.

With continued reference to FIG. 12 and referring back to FIG. 8, as in Scenario 1, first, at the first moment in time $t_1$, the AFMCW reference beam 822 is received by the receiver component 312 while the AFMCW scanning beam 820 is directed downrange towards the surroundings 250 of the vehicle 220, which is represented by the asymptotic AFMCW reference amplitude signal 1202. Consequently, having reflected off the object 325, the AFMCW scanning beam 820 generates the AFMCW input beam 824 that may be received, by the receiver component 312, at the second moment in time $t_2$, as represented by the asymptotic AFMCW input amplitude signal 1204. Both the asymptotic AFMCW reference amplitude signal 1202 and the asymptotic AFMCW input amplitude signal 1204 are continuously growing within the amplitude modulation period 902 in accordance with the asymptotic periodic function 1000.

A constant asymptotic amplitude difference 1206 caused by the attenuation of the AFMCW input beam 824 may thus be compensated for by the receiver component 312 generating the composition of the AFMCW reference electrical signal and the AFMCW input electrical signal, thereby generating the first amplified AFMCW input electrical signal 826. The amplitude of the first amplified AFMCW input electrical signal may be determined, for example, in accordance with Equation (6) based on the asymptotic AFMCW reference amplitude signal 1202 and the asymptotic AFMCW input amplitude signal 1204.

As in Scenario 1, the controller component 316 may further proceed to determine the distance 390 to the object 325 using the so amplified AFMCW input electrical signal based on the time difference 1108 in accordance with Equation (2).

According to the first implementation of the LiDAR system 302, in both Scenario 1 and Scenario 2, as the amplitude modulation period 902 is predetermined based on the threshold ranging distance value associated with the LiDAR system 302, it can be said that each one of the linear AFMCW input amplitude signal 1104 and the asymptotic AFMCW input amplitude signal 1204 are respectively amplified by the linear AFMCW reference amplitude signal 1102 and the asymptotic AFMCW reference amplitude signal 1202 as a function of distance from the LiDAR system 302 to one or more objects in the surroundings 250 of the vehicle 220, thereby compensating for the attenuation of the AFMCW input beam 824. In other words, the farther away the object 325 is located from the LiDAR system 302, the greater the amplitude of the first amplified AFMCW input electrical signal 826 would be.

Second Implementation of LiDAR System

Figure 13:
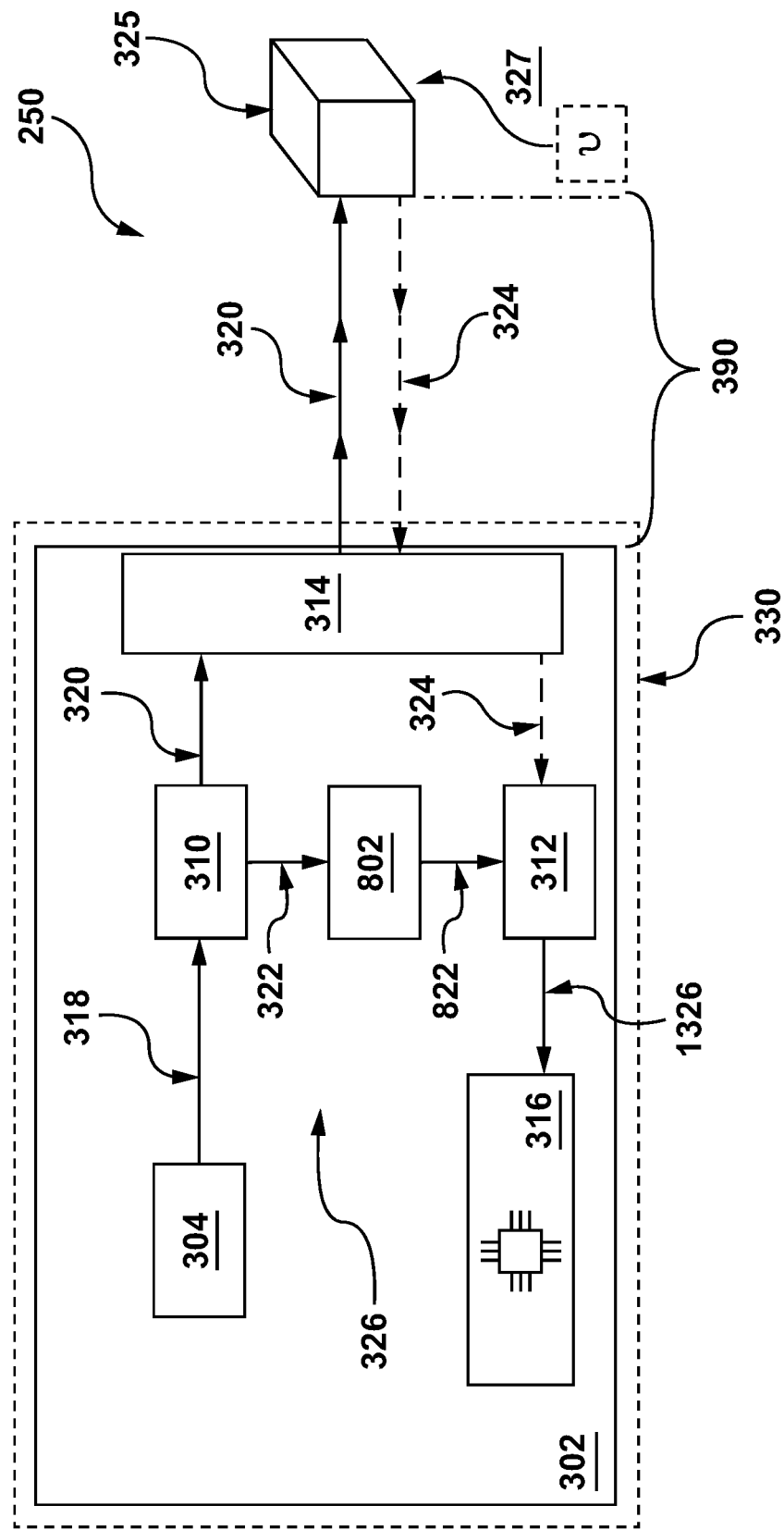
FIG. 13 depicts a second implementation of the LiDAR system of FIG. 3, in accordance with certain non-limiting embodiments of the present technology.

With reference to FIG. 13, there is depicted a schematic diagram of a second implementation of the LiDAR system 302, according to some non-limiting embodiments of the present technology. Specifically, the difference between the first implementation of the LiDAR system 302 and the second implementation of the LiDAR system 302 is that the latter includes the AM component 802 having been installed on a way of the FMCW reference beam 322.

As it can be appreciated from FIG. 13, the FMCW light source component 304 directs the FMCW output beam 318 to the beam splitter component 310, which splits it into the FMCW scanning beam 320 and the FMCW reference beam 322. The FMCW scanning beam 320 is further emitted downrange towards the surroundings 250, and the FMCW reference beam 322 is directed to the AM component 802. Accordingly, the AM component 802 is thus configured to generate the AFMCW reference beam 822, which is further directed to the receiver component 312 along with the FMCW input beam 324 having been generated by the FMCW scanning beam 320 by reflecting off the object 325. By generating a composition of the AFMCW reference electrical signal and the FMCW input electrical signal, the receiver component 312 may be thus configured to generate a second amplified AFMCW input electrical signal 1326, according to the second implementation of the LiDAR system 302.

As it can be further appreciated, in the second implementation of the LiDAR system 302, only the FMCW reference beam 322 is amplitude-modulated by the AM component 802, without amplitude-modulating the FMCW scanning beam 320, which results in different amplitude ramp waveforms associated therewith, which will now be described with reference to FIGS. 14 and 15.

Scenario 1

Figure 14:
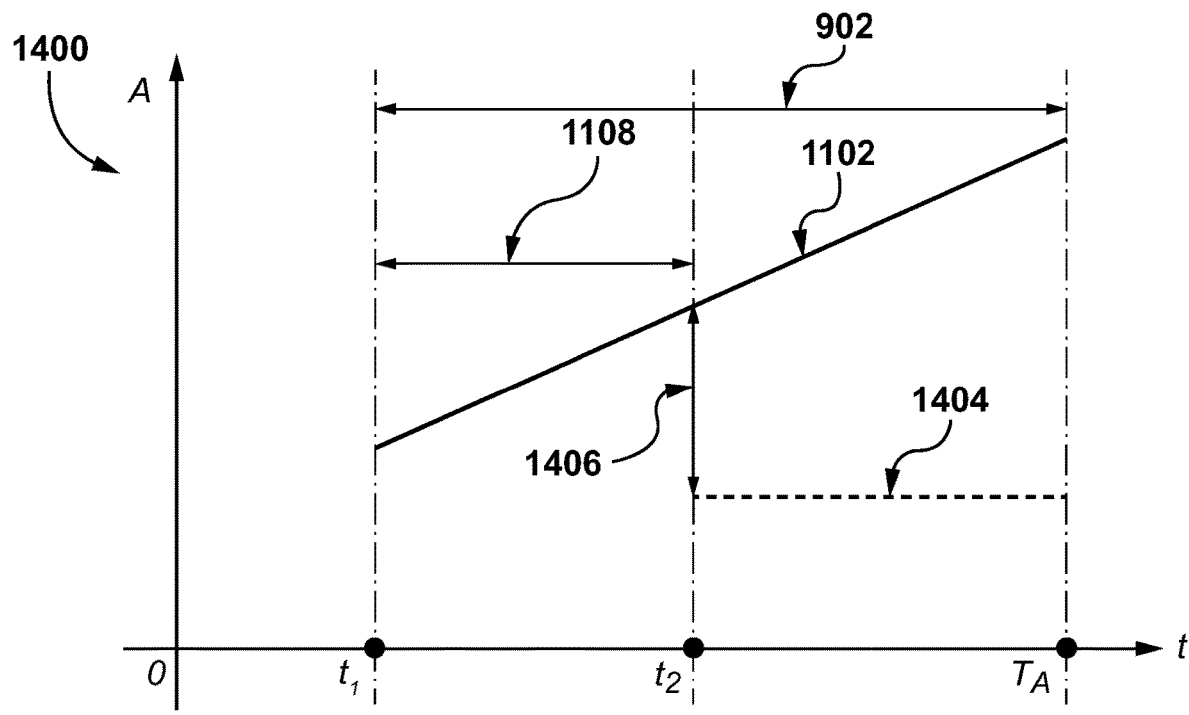
FIG. 14 depicts a schematic diagram of a first example method for amplifying an input CW-based optical signal of the LiDAR system of FIG. 13, in accordance with the non-limiting embodiments of the present technology.

With reference to FIG. 14, there is depicted a third amplitude ramp waveform representation 1400 of the AFMCW reference electrical signal and the FMCW input electrical signal having been generated by the receiver component 312 in response to receiving the AFMCW reference beam 822 and the FMCW input beam 324, respectively, in accordance with the second implementation of the LiDAR system 302. The AFMCW reference electrical signal and the FMCW input electrical signal are respectively represented by the linear AFMCW reference amplitude signal 1102 and an FMCW input amplitude signal 1404.

With continued reference to FIG. 14 and referring back to FIG. 13, first, at the first moment in time $t_1$, the AFMCW reference beam 822 is received by the receiver component 312 while the FMCW scanning beam 320 is directed downrange towards the surroundings 250 of the vehicle 220, which is represented by the linear AFMCW reference amplitude signal 1102. Consequently, having reflected off the object 325, the FMCW scanning beam 320 generates the FMCW input beam 324 that may be received, by the receiver component 312, at the second moment in time $t_2$, as represented by the FMCW input amplitude signal 1404. The linear AFMCW reference amplitude signal 1102 is continuously growing within the amplitude modulation period 902, in accordance with the linear periodic function 900. On the other hand, the FMCW input amplitude signal, as being not amplitude-modulated, has a constant value over a period from the second moment in time $t_2$.

Further, a first variable linear amplitude difference 1406 caused by the attenuation of the FMCW input beam 324 may be corrected by the receiver component 312 generating the composition of the AFMCW reference electrical signal and the FMCW input electrical signal, thereby generating the second amplified AFMCW input electrical signal 1326, similarly to generating the first amplified AFMCW input electrical signal 826.

As previously mentioned, the controller component 316 may further use the second amplified AFMCW input electrical signal 1326 for determining the distance 390 to the object 325 based on the time difference 1108.

Scenario 2

Figure 15:
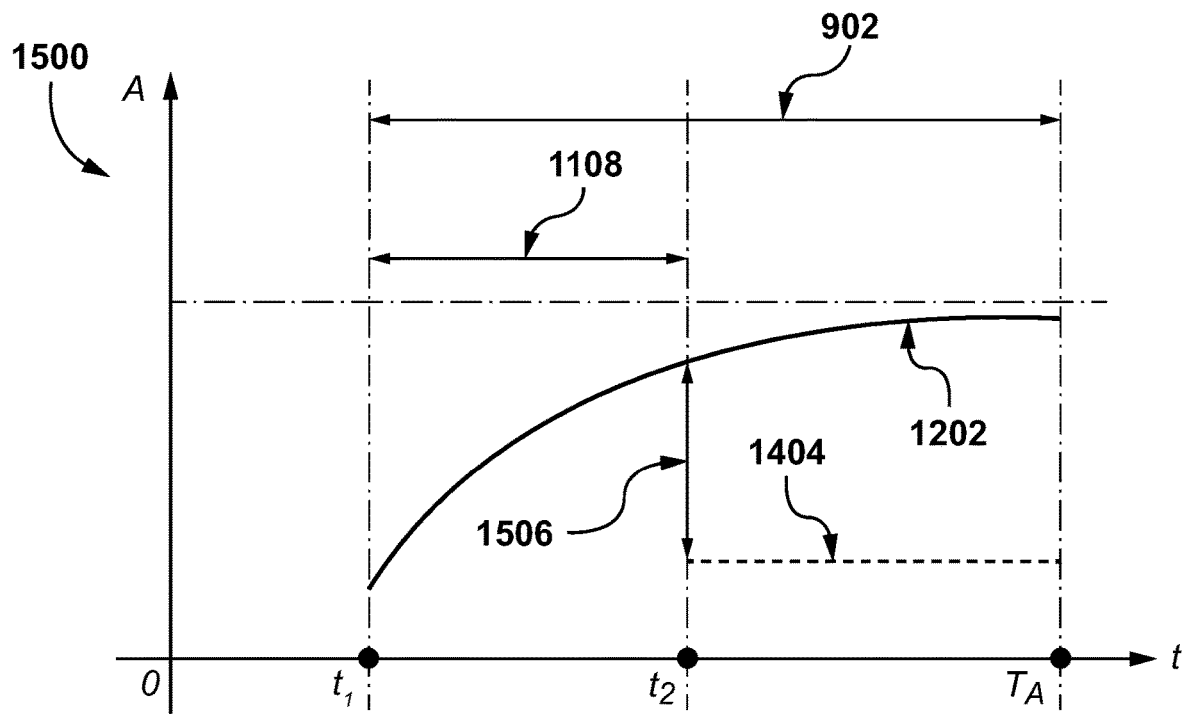
FIG. 15 depicts a schematic diagram of a second example method for amplifying an input CW-based optical signal of the LiDAR system of FIG. 13, in accordance with the non-limiting embodiments of the present technology.

With reference to FIG. 15, there is depicted a fourth amplitude ramp waveform representation 1500 of the AFMCW reference electrical signal and the FMCW input electrical signal having been generated by the receiver component 312 in response to receiving the AFMCW reference beam 822 and the FMCW input beam 324, respectively, in accordance with the second implementation of the LiDAR system 302. The AFMCW reference electrical signal and the FMCW input electrical signal are respectively represented by the asymptotic AFMCW reference amplitude signal 1202 and the FMCW input amplitude signal 1404.

With continued reference to FIG. 15 and referring back to FIG. 13, first, at the first moment in time $t_1$, the AFMCW reference beam 822 is received by the receiver component 312 while the FMCW scanning beam 320 is directed downrange towards the surroundings 250 of the vehicle 220, which is represented by the asymptotic AFMCW reference amplitude signal 1202. Consequently, having reflected off the object 325, the FMCW scanning beam 320 generates the FMCW input beam 324 that may be received, by the receiver component 312, at the second moment in time $t_2$, as represented by the FMCW input amplitude signal 1404. The asymptotic AFMCW reference amplitude signal 1202 is continuously growing within the amplitude modulation period 902, in accordance with the asymptotic periodic function 1000. On the other hand, the FMCW input amplitude signal, as being not amplitude-modulated, has a constant value over the period from the second moment in time $t_2$.

A first variable asymptotic amplitude difference 1506 caused by the attenuation of the FMCW input beam 324 grows with time (and thus with distance 390 to the object 325). Accordingly, the first variable asymptotic amplitude difference 1506 may be corrected by the receiver component 312 generating the composition of the AFMCW reference electrical signal and the FMCW input electrical signal, thereby generating the second amplified AFMCW input electrical signal 1326, similarly to generating the first amplified AFMCW input electrical signal 826.

As previously mentioned, the controller component 316 may further use the second amplified AFMCW input electrical signal 1326 for determining the distance 390 to the object 325 based on the time difference 1108.

According to the second implementation of the LiDAR system 302, in both Scenario 1 and Scenario 2, as the amplitude modulation period 902 is predetermined based on the threshold ranging distance value associated with the LiDAR system 302, it can be said that the FMCW input amplitude signal 1404 associated with the FMCW input beam 324 is amplified using one of the linear AFMCW reference amplitude signal 1102 and the asymptotic AFMCW reference amplitude signal 1202 as a function of distance from the LiDAR system 302 to one or more objects in the surroundings 250 of the vehicle 220. In other words, the farther away the object 325 is located from the LiDAR system 302, the greater the amplitude of the second amplified AFMCW input electrical signal 1326 would be. By doing so, the LiDAR system 302 is configured to compensate for the attenuation of the FMCW input beam 324 using the AM component 802.

Third Implementation of LiDAR System

Figure 16:
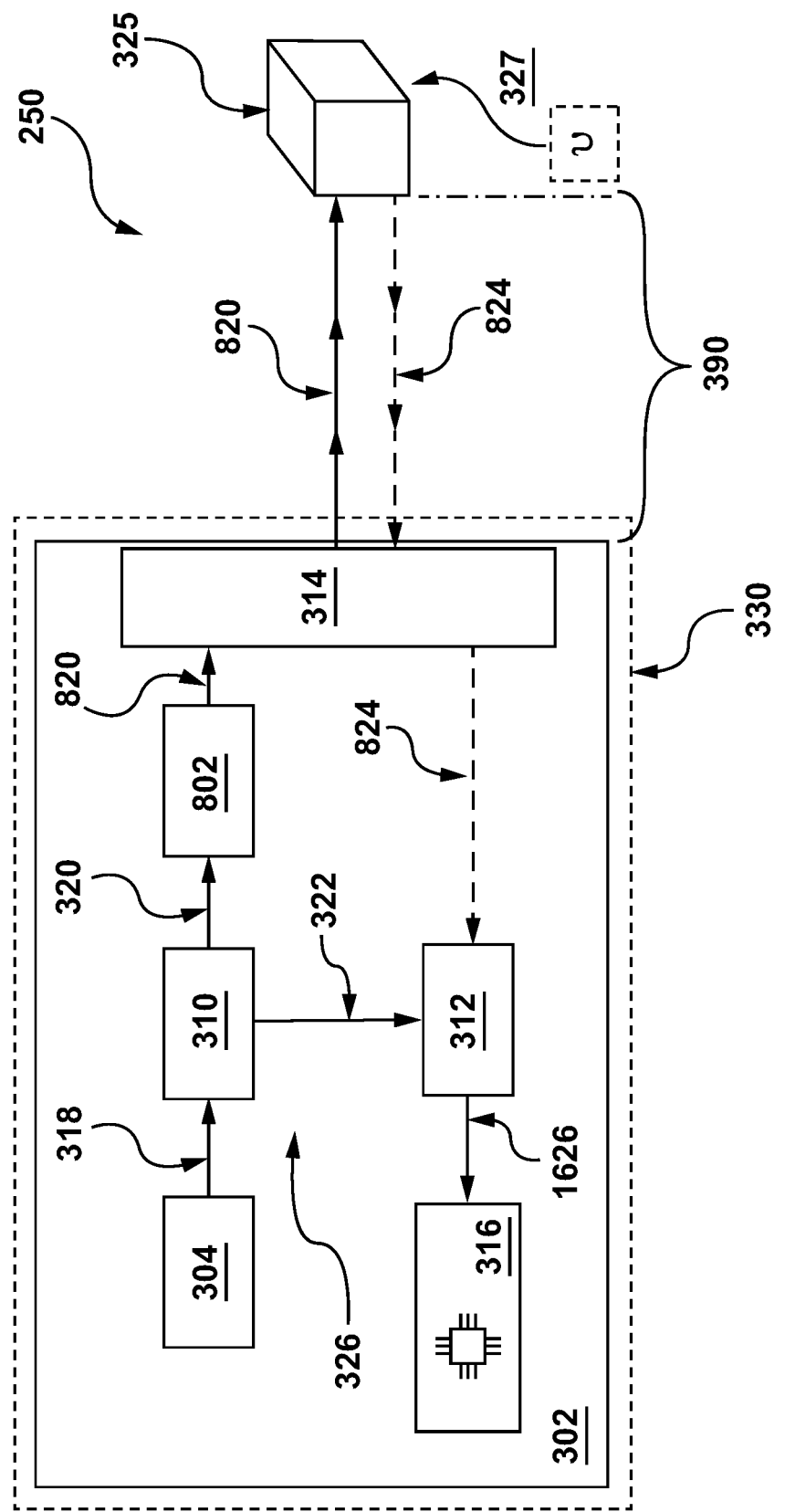
FIG. 16 depicts a third implementation of the LiDAR system of FIG. 3, in accordance with certain non-limiting embodiments of the present technology.

With reference to FIG. 16, there is depicted a schematic diagram of a third implementation of the LiDAR system 302, according to some non-limiting embodiments of the present technology. Specifically, the difference between the third implementation of the LiDAR system 302 and the second implementation of the LiDAR system 302 is that the former includes the AM component 802 having been installed on a way of the FMCW scanning beam 320.

As it can be appreciated from FIG. 16, the FMCW light source component 304 directs the FMCW output beam 318 to the beam splitter component 310, which splits it into the FMCW scanning beam 320 and the FMCW reference beam 322. The FMCW scanning beam 320 is directed to the AM component 802, while the FMCW reference beam 322 is directed to the receiver component 312. Accordingly, the AM component 802 is thus configured to generate the AFMCW scanning beam 820 that is further emitted downrange towards the surroundings 250, which having reflected off the object 325, may be received by the receiver component 312 in the form of the AFMCW input beam 824. In this regard, the receiver component 312 may be further configured to receive the FMCW reference beam 322 and the AFMCW input beam 824, thereby generating the FMCW reference electrical signal and the AFMCW input electrical signal, respectively. The receiver component 312 may further be configured to generate the composition of the FMCW reference electrical signal and the AFMCW input electrical signal, thereby generating a third amplified AFMCW input electrical signal 1626 for sending to the controller component 316 for further analysis thereof.

As it can be further appreciated, in the third implementation of the LiDAR system 302, only the FMCW scanning beam 320 is amplitude-modulated by the AM component 802, without amplitude-modulating the FMCW reference beam 322, which results in different amplitude ramp waveforms associated therewith, which will now be described with reference to FIGS. 17 and 18.

Scenario 1

Figure 17:
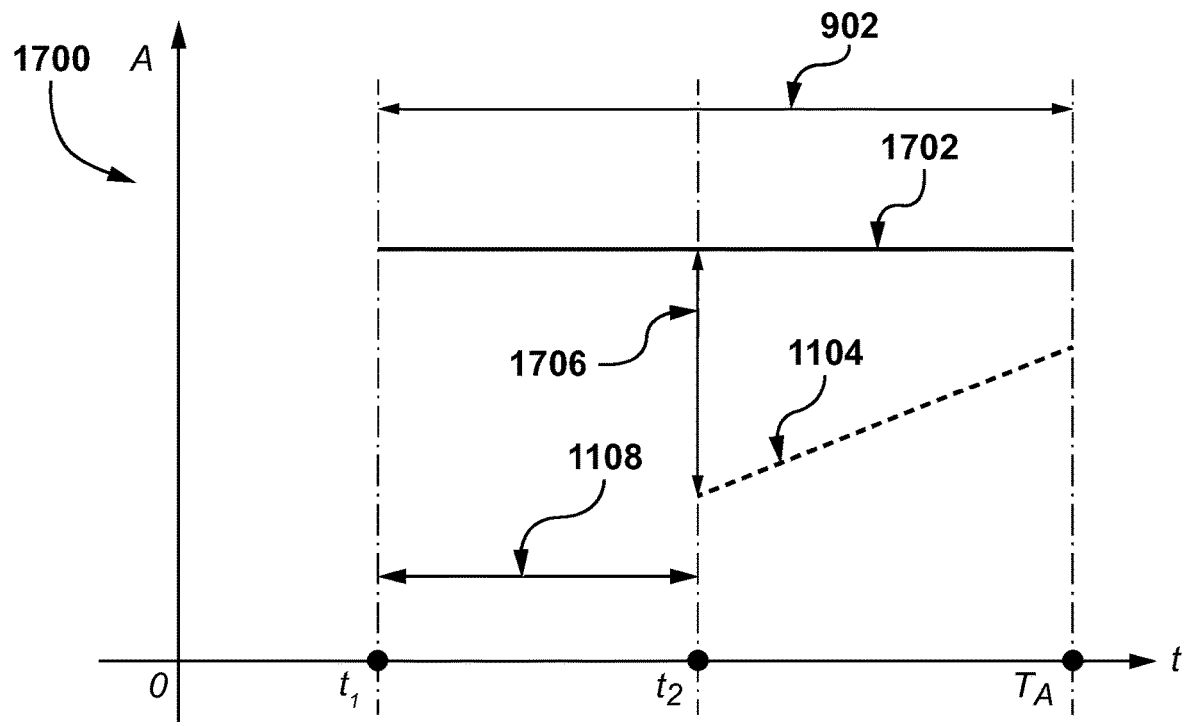
FIG. 17 depicts a schematic diagram of a first example method for amplifying an input CW-based optical signal of the LiDAR system of FIG. 16, in accordance with the non-limiting embodiments of the present technology.

With reference to FIG. 17, there is depicted a fifth amplitude ramp waveform representation 1700 of the FMCW reference electrical signal and the AFMCW input electrical signal having been generated by the receiver component 312 in response to receiving the FMCW reference beam 322 and the AFMCW input beam 824, respectively, in accordance with the third implementation of the LiDAR system 302. The FMCW reference electrical signal and the AFMCW input electrical signal are respectively represented by an FMCW reference amplitude signal 1702 and the linear AFMCW input amplitude signal 1104.

With continued reference to FIG. 17 and referring back to FIG. 16, first, at the first moment in time $t_1$, the FMCW reference beam 322 is received by the receiver component 312 while the AFMCW scanning beam 820 is directed downrange towards the surroundings 250 of the vehicle 220, which is represented by the FMCW reference amplitude signal 1702. Consequently, having reflected off the object 325, the AFMCW scanning beam 820 generates the AFMCW input beam 824 that may be received, by the receiver component 312, at the second moment in time $t_2$, as represented by the linear AFMCW input amplitude signal 1104. The FMCW reference amplitude signal 1702, as being not amplitude-modulated, has a constant value over the amplitude modulation period 902. On the other hand, the linear AFMCW input amplitude signal 1104 is continuously growing over a period from the second moment in time $t_2$, in accordance with the linear periodic function 900.

Further, a second variable linear amplitude difference 1706 caused by the attenuation of the AFMCW input beam 824 decreases with time (and thus with the distance 390 to the object 325) Accordingly, the second variable linear amplitude difference 1706 may be corrected by the receiver component 312 generating the composition of the FMCW reference electrical signal and the AFMCW input electrical signal, thereby generating the third amplified AFMCW input electrical signal 1626, similarly to generating the first amplified AFMCW input electrical signal 826 and the second amplified AFMCW input electrical signal 1326 (based on Equation (6), for example).

As previously mentioned, the controller component 316 may further use the third amplified AFMCW input electrical signal 1626 for determining the distance 390 to the object 325 based on the time difference 1108.

Scenario 2

Figure 18:
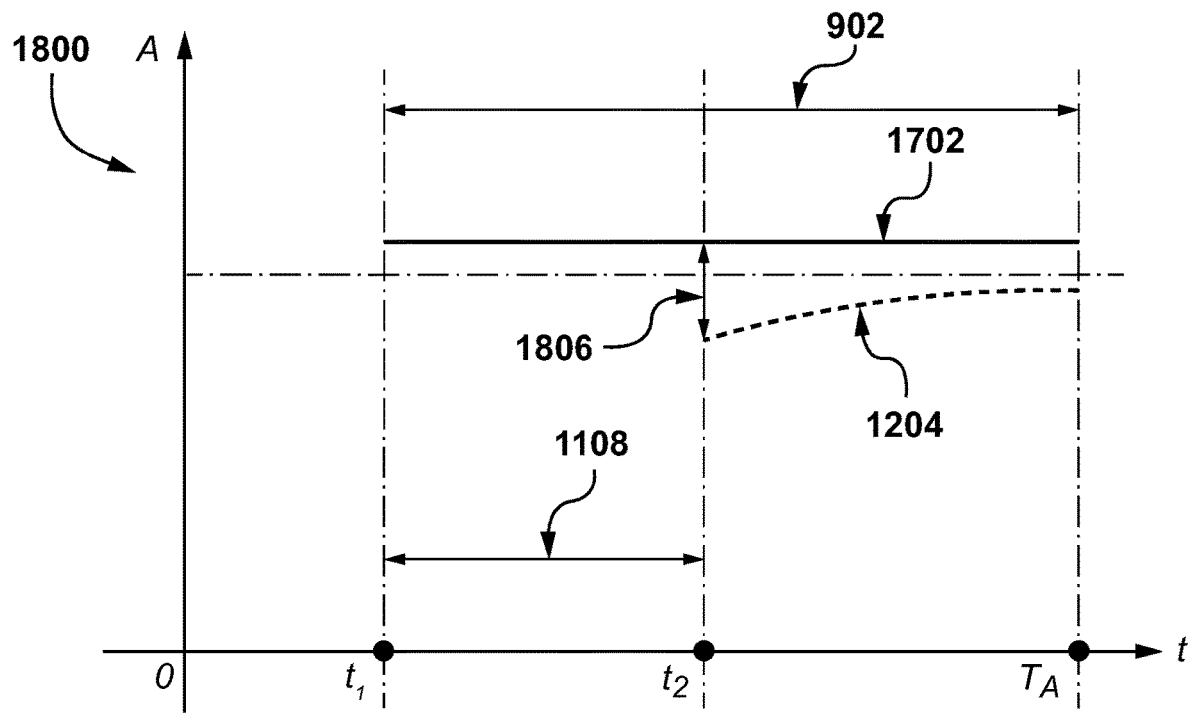
FIG. 18 depicts a schematic diagram of a second example method for amplifying an input CW-based optical signal of the LiDAR system of FIG. 13, in accordance with the non-limiting embodiments of the present technology.

With reference to FIG. 18, there is depicted a sixth amplitude ramp waveform representation 1800 of the FMCW reference electrical signal and the AFMCW input electrical signal having been generated by the receiver component 312 in response to receiving the FMCW reference beam 322 and the AFMCW input beam 824, respectively, in accordance with the third implementation of the LiDAR system 302. The FMCW reference electrical signal and the AFMCW input electrical signal are respectively represented by the FMCW reference amplitude signal 1702 and the asymptotic AFMCW input amplitude signal 1204.

With continued reference to FIG. 18 and referring back to FIG. 16, first, at the first moment in time $t_1$, the FMCW reference beam 322 is received by the receiver component 312 while the AFMCW scanning beam 820 is directed downrange towards the surroundings 250 of the vehicle 220, which is represented by the FMCW reference amplitude signal 1702. Consequently, having reflected off the object 325, the AFMCW scanning beam 820 generates the AFMCW input beam 824 that may be received, by the receiver component 312, at the second moment in time $t_2$, as represented by the asymptotic AFMCW input amplitude signal 1204. The FMCW reference amplitude signal 1702, as being not amplitude-modulated, has a constant value over the amplitude modulation period 902. On the other hand, the asymptotic AFMCW input amplitude signal 1204 is continuously growing over a period from the second moment in time $t_2$, in accordance with the asymptotic periodic function 1000.

Further, a second variable asymptotic amplitude difference 1806 caused by the attenuation of the AFMCW input beam 824 decreases with time (and thus with the distance 390 to the object 325). Accordingly, the second variable asymptotic amplitude difference 1806 may be corrected by the receiver component 312 generating the composition of the FMCW reference electrical signal and the AFMCW input electrical signal, thereby generating the third amplified AFMCW input electrical signal 1626, similarly to generating the first amplified AFMCW input electrical signal 826 and the second amplified AFMCW input electrical signal 1326 (based on Equation (6), for example).

As previously mentioned, the controller component 316 may further use the third amplified AFMCW input electrical signal 1626 for determining the distance 390 to the object 325 based on the time difference 1108.

According to the third implementation of the LiDAR system 302, in both Scenario 1 and Scenario 2, as the amplitude modulation period 902 is predetermined based on the threshold ranging distance value associated with the LiDAR system 302, it can be said that each one of the linear AFMCW input amplitude signal 1104 and the asymptotic AFMCW input amplitude signal 1204 associated with the AFMCW input beam 824 is amplified using the FMCW reference amplitude signal 1702 as a function of distance from the LiDAR system 302 to one or more objects in the surroundings 250 of the vehicle 220. In other words, the farther away the object 325 is located from the LiDAR system 302, the greater the amplitude of the third amplified AFMCW input electrical signal 1626 would be. By so doing, the LiDAR system 302 is configured to compensate for the attenuation of the AFMCW input beam 824 by using the AM component 802.

Fourth Implementation of LiDAR System

Figure 19:
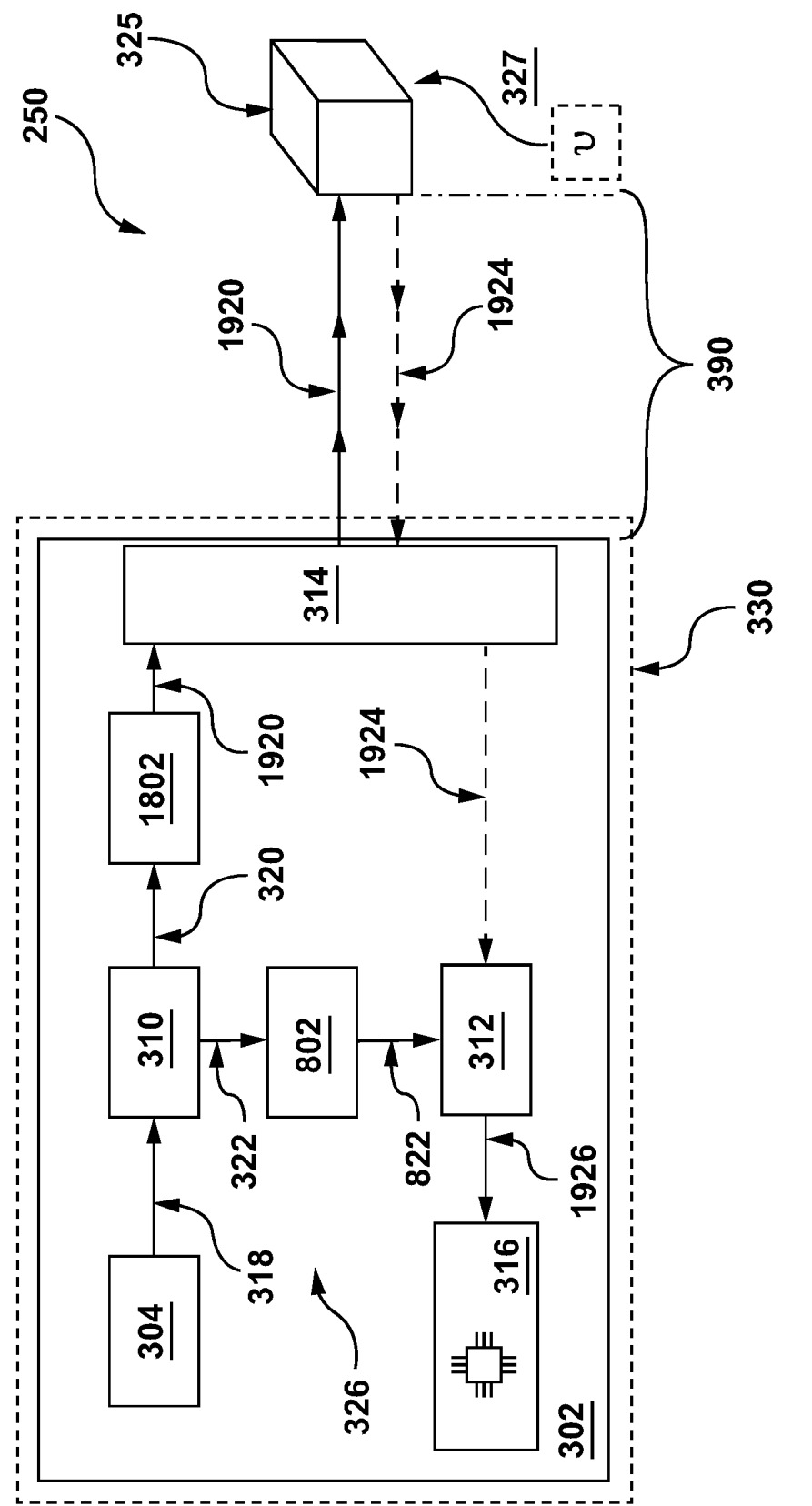
FIG. 19 depicts a fourth implementation of the LiDAR system of FIG. 3, in accordance with certain non-limiting embodiments of the present technology.

With reference to FIG. 19, there is depicted a schematic diagram of a fourth implementation of the LiDAR system 302, according to some non-limiting embodiments of the present technology. Specifically, according to the fourth implementation, the LiDAR system 302 includes the AM component 802 having been installed on the way of the FMCW reference beam 322 and a second AM component 1902 having been installed on the way of the FMCW scanning beam 320.

According to the non-limiting embodiments of the present technology, the second AM component 1902 may be implemented similarly to the AM component 802, as described above with reference to FIGS. 8 to 10.

As it can be appreciated from FIG. 19, the FMCW light source component 304 directs the FMCW output beam 318 to the beam splitter component 310, which splits it into the FMCW scanning beam 320 and the FMCW reference beam 322. The FMCW scanning beam 320 is directed to the second AM component 1902, while the FMCW reference beam 322 is directed to the AM component 802. Accordingly, the second AM component 1902 is configured to generate a second AFMCW scanning beam 1920 that is further emitted downrange towards the surroundings 250, while the AM component 802 is thus configured to generate the AFMCW reference beam 822 that is further directed to the receiver component. The second AFMCW scanning beam 1920, having reflected off the object 325, thus generates a second AFMCW input beam 1924, which further may be received by the receiver component 312.

Consequently, the receiver component 312 may be further configured to receive the AFMCW reference beam 822 and the second AFMCW input beam 1924, thereby generating the AFMCW reference electrical signal and a second AFMCW input electrical signal, respectively. The receiver component 312 may further be configured to generate the composition of the AFMCW reference electrical signal and the second AFMCW input electrical signal, thereby generating a fourth amplified AFMCW input electrical signal 1926 for further sending it to the controller component 316.

In the embodiments of the fourth implementation of the LiDAR system 302 depicted in FIG. 19, both the FMCW scanning beam 320 and the FMCW reference beam 322 are amplitude-modulated by the second AM component 1902 and the AM component 802, respectively. Accordingly, in those non-limiting embodiments of the fourth implementation of the LiDAR system 302 where the AM component 802 and the second AM component 1902 are configured to apply identical amplitude modulation functions (such as one of the linear periodic function 900 and the asymptotic periodic function 1000), the fourth amplified AFMCW input electrical signal 1926 is generated similarly to the first amplified AFMCW input electrical signal 826 as described above with reference to FIGS. 8, 11, and 12.

However, for example, in some non-limiting embodiments of the fourth implementation of the LiDAR system 302, at least one of the AM component 802 and the second AM component 1902 may be configured to apply an amplitude modulation function which is inverse to one of the linear periodic function 900 and the asymptotic periodic function 1000.

Scenario 1

Figure 20:
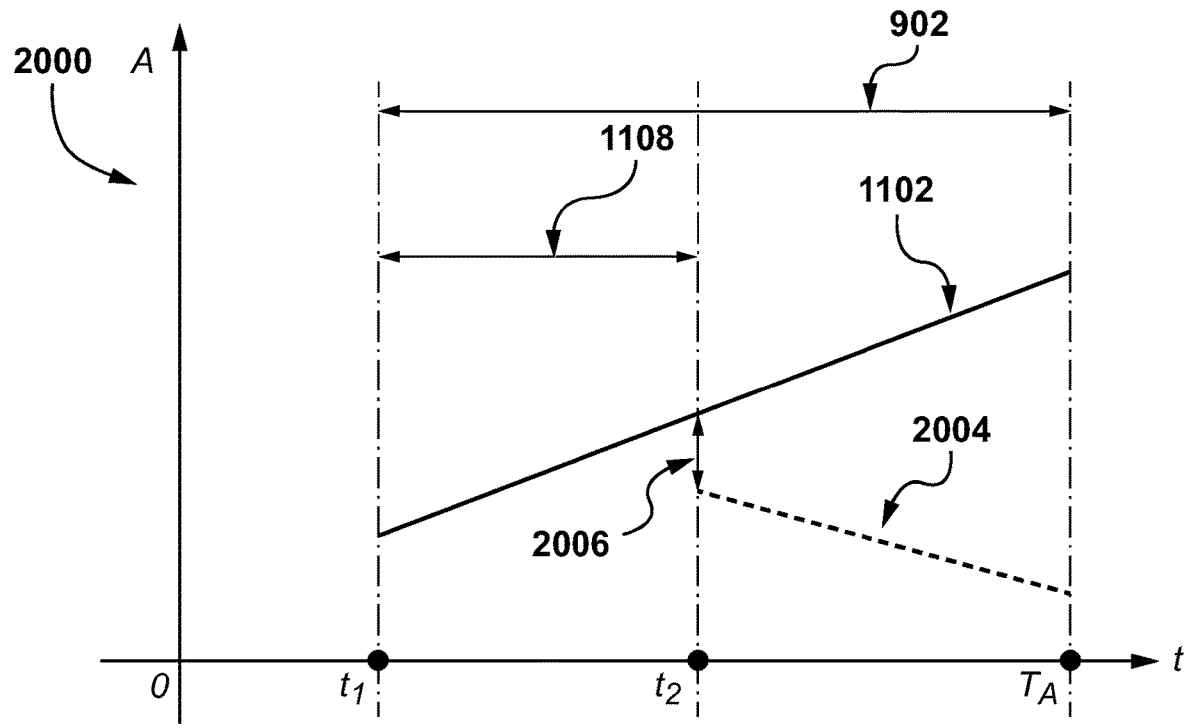
FIG. 20 depicts a schematic diagram of a first example method for amplifying an input CW-based optical signal of the LiDAR system of FIG. 19, in accordance with the non-limiting embodiments of the present technology.

With reference to FIG. 20, there is depicted a seventh amplitude ramp waveform representation 2000 of the AFMCW reference electrical signal and the second AFMCW input electrical signal having been generated by the receiver component 312 in response to receiving the AFMCW reference beam 822 and the second AFMCW input beam 1924, respectively, in accordance with the fourth implementation of the LiDAR system 302. The AFMCW reference electrical signal and the second AFMCW input electrical signal are respectively represented by the linear AFMCW reference amplitude signal 1102 and an inverse linear AFMCW input amplitude signal 2004.

With continued reference to FIG. 20 and referring back to FIG. 19, first, at the first moment in time $t_1$, the AFMCW reference beam 822 is received by the receiver component 312 while the second AFMCW scanning beam 1920 is directed downrange towards the surroundings 250 of the vehicle 220, which is represented by the linear AFMCW reference amplitude signal 1102. Consequently, having reflected off the object 325, the second AFMCW scanning beam 1920 generates the second AFMCW input beam 1924 that may be received, by the receiver component 312, at the second moment in time $t_2$, as represented by the inverse linear AFMCW input amplitude signal 2004. The linear AFMCW reference amplitude signal 1102 is continuously growing over the amplitude modulation period 902 in accordance with the linear periodic function 900. On the other hand, the inverse linear AFMCW input amplitude signal 2004 is continuously decreasing over a period from the second moment in time $t_2$, in accordance with an inverse configuration of the linear periodic function 900.

Further, a third variable linear amplitude difference 2006 caused by the attenuation of the second AFMCW input beam 1924 increases with time (and thus with the distance 390 to the object 325). Accordingly, the third variable linear amplitude difference 2006 may be corrected by the receiver component 312 generating the composition of the AFMCW reference electrical signal and the second AFMCW input electrical signal, thereby generating the fourth amplified AFMCW input electrical signal 1926, similarly to generating the above amplified AFMCW input electrical signal according to first, second, and the third implementations of the LiDAR system 302 (based on Equation (6), for example).

As previously mentioned, the controller component 316 may further use the fourth amplified AFMCW input electrical signal 1926 for determining, for example, the distance 390 to the object 325 based on the time difference 1108.

Scenario 2

Figure 21:
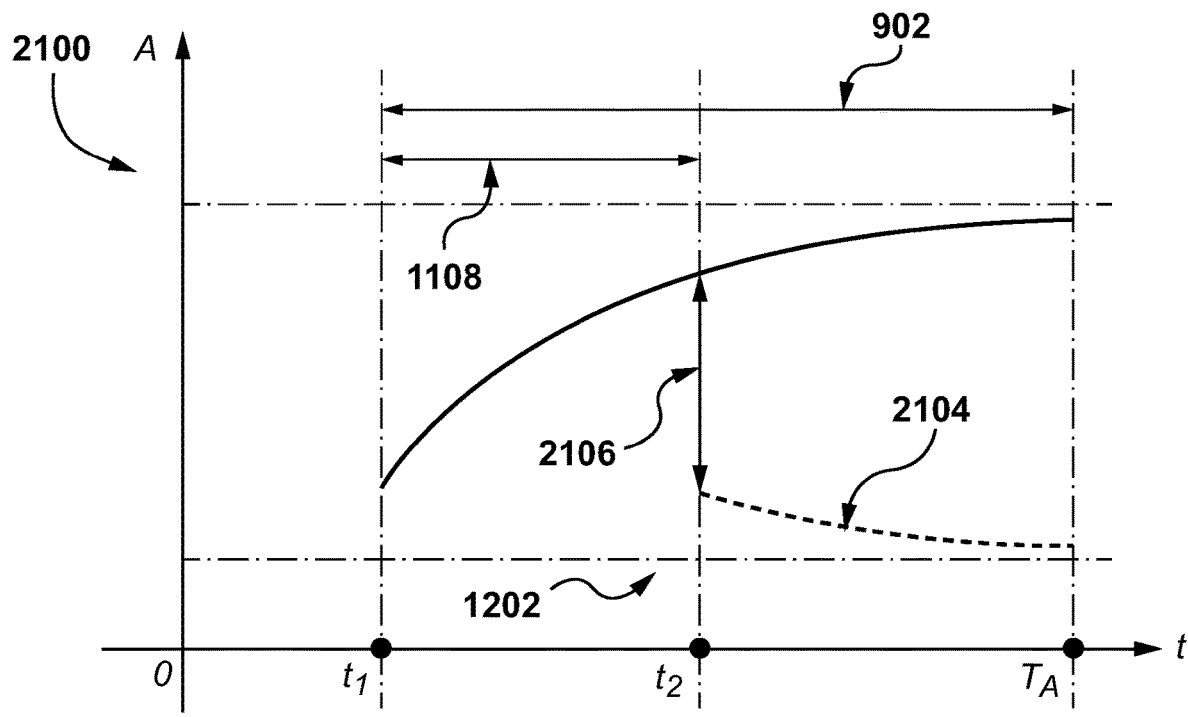
FIG. 21 depicts a schematic diagram of a second example method for amplifying an input CW-based optical signal of the LiDAR system of FIG. 19, in accordance with the non-limiting embodiments of the present technology.

With reference to FIG. 21, there is depicted an eighth amplitude ramp waveform representation 2100 of the AFMCW reference electrical signal and the second AFMCW input electrical signal having been generated by the receiver component 312 in response to receiving the AFMCW reference beam 822 and the second AFMCW input beam 1924, respectively, in accordance with the fourth implementation of the LiDAR system 302. The AFMCW reference electrical signal and the second AFMCW input electrical signal are respectively represented by the asymptotic AFMCW reference amplitude signal 1202 and an inverse asymptotic AFMCW input amplitude signal 2104.

With continued reference to FIG. 21 and referring back to FIG. 19, first, at the first moment in time $t_1$, the AFMCW reference beam 822 is received by the receiver component 312 while the second AFMCW scanning beam 1920 is directed downrange towards the surroundings 250 of the vehicle 220, which is represented by the asymptotic AFMCW reference amplitude signal 1202. Consequently, having reflected off the object 325, the second AFMCW scanning beam 1920 generates the second AFMCW input beam 1924 that may be received, by the receiver component 312, at the second moment in time $t_2$, as represented by the inverse asymptotic AFMCW input amplitude signal 2104. The asymptotic AFMCW reference amplitude signal 1202 is continuously growing over the amplitude modulation period 902 in accordance with the asymptotic periodic function 1000. On the other hand, the inverse asymptotic AFMCW input amplitude signal 2104 is continuously decreasing over a period from the second moment in time $t_2$, in accordance with an inverse configuration of the asymptotic periodic function 1000.

Further, a third variable asymptotic amplitude difference 2106 caused by the attenuation of the second AFMCW input beam 1924 grows with time (and thus with the distance 390 to the object 325). Accordingly, the third variable asymptotic amplitude difference 2106 may be corrected by the receiver component 312 generating the composition of the AFMCW reference electrical signal and the second AFMCW input electrical signal, thereby generating the fourth amplified AFMCW input electrical signal 1926, similarly to generating the above amplified AFMCW input electrical signal according to first, second, and the third implementations of the LiDAR system 302 (based on Equation (6), for example).

As previously mentioned, the controller component 316 may further use the third amplified AFMCW input electrical signal 1626 for determining, for example, the distance 390 to the object 325 based on the time difference 1108.

According to these embodiments of the fourth implementation of the LiDAR system 302, in both Scenario 1 and Scenario 2, as the amplitude modulation period 902 is predetermined based on the threshold ranging distance value associated with the LiDAR system 302, it can be said that each one of the inverse linear AFMCW input amplitude signal 2004 and the inverse asymptotic AFMCW input amplitude signal 2104 associated with the second AFMCW input beam 1924 is amplified using the linear AFMCW reference amplitude signal 1102 and the asymptotic AFMCW reference amplitude signal 1202, respectively, as a function of distance from the LiDAR system 302 to one or more objects in the surroundings 250 of the vehicle 220. In other words, the farther away the object 325 is located from the LiDAR system 302, the greater the amplitude of the fourth amplified AFMCW input electrical signal 1926 would be. By so doping, the LiDAR system 302 is configured to compensate for the attenuation of the second AFMCW input beam 1924 using the AM component 802 and the second AM component 1902.

In other non-limiting embodiments of the fourth implementation of the LiDAR system 302, the AM component 802 and the second AM component 1902 may be configured each to apply different amplitude modulation functions.

Scenario 1

Figure 22:
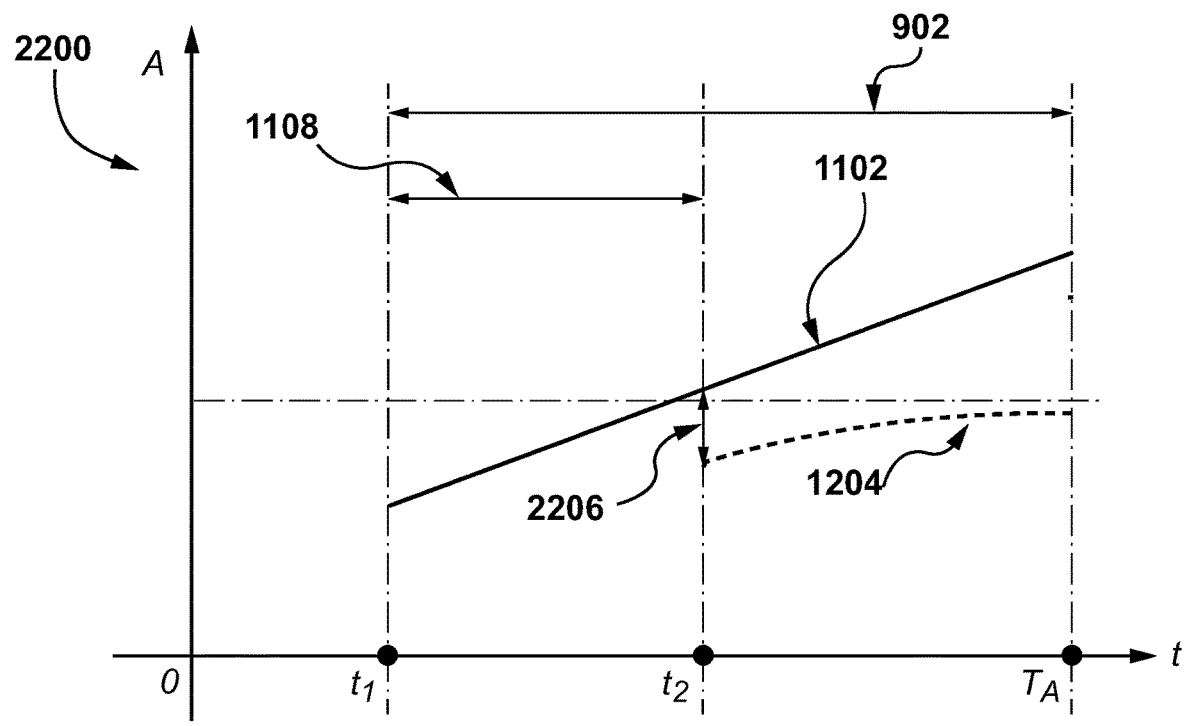
FIG. 22 depicts a schematic diagram of a third example method for amplifying an input CW-based optical signal of the LiDAR system of FIG. 19, in accordance with the non-limiting embodiments of the present technology.

With reference to FIG. 22, there is depicted a ninth amplitude ramp waveform representation 2200 of the AFMCW reference electrical signal and the second AFMCW input electrical signal having been generated by the receiver component 312 in response to receiving the AFMCW reference beam 822 and the second AFMCW input beam 1924, respectively, in accordance with the fourth implementation of the LiDAR system 302. The AFMCW reference electrical signal and the second AFMCW input electrical signal are respectively represented by the linear AFMCW reference amplitude signal 1102 and the asymptotic AFMCW input amplitude signal 1204.

With continued reference to FIG. 22 and referring back to FIG. 19, first, at the first moment in time $t_1$, the AFMCW reference beam 822 is received by the receiver component 312 while the second AFMCW scanning beam 1920 is directed downrange towards the surroundings 250 of the vehicle 220, which is represented by the linear AFMCW reference amplitude signal 1102. Consequently, having reflected off the object 325, the second AFMCW scanning beam 1920 generates the second AFMCW input beam 1924 that may be received, by the receiver component 312, at the second moment in time $t_2$, as represented by the asymptotic AFMCW input amplitude signal 1204. The linear AFMCW reference amplitude signal 1102 is continuously growing over the amplitude modulation period 902 in accordance with the linear periodic function 900. On the other hand, the asymptotic AFMCW input amplitude signal 1204 is continuously growing over a period from the second moment in time $t_2$, in accordance with the asymptotic periodic function 1000.

Further, a fourth variable linear amplitude difference 2206 caused by the attenuation of the second AFMCW input beam 1924 decreases with time (and thus with the distance 390 to the object 325). Accordingly, the fourth variable linear amplitude difference 2206 may be corrected by the receiver component 312 generating the composition of the AFMCW reference electrical signal and the second AFMCW input electrical signal, thereby generating the fourth amplified AFMCW input electrical signal 1926, similarly to generating the above amplified AFMCW input electrical signal according to first, second, and the third implementations of the LiDAR system 302 (based on Equation (6), for example).

As previously mentioned, the controller component 316 may further use the fourth amplified AFMCW input electrical signal 1926 for determining, for example, the distance 390 to the object 325 based on the time difference 1108.

Scenario 2

Figure 23:
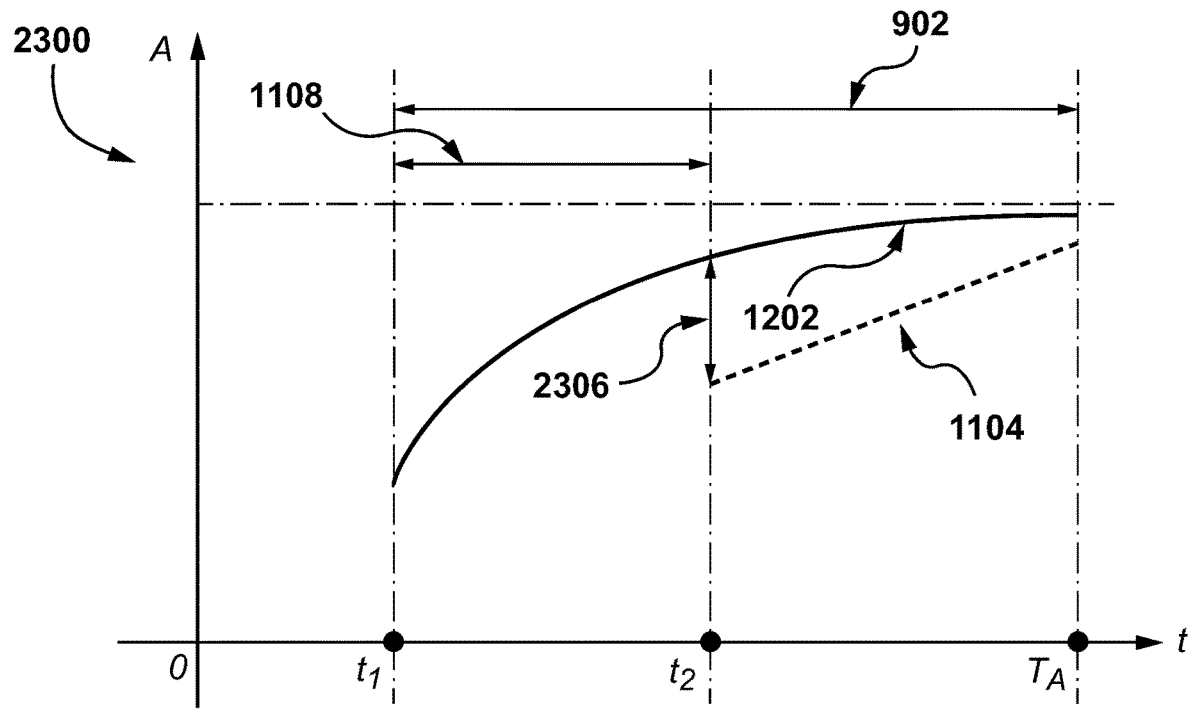
FIG. 23 depicts a schematic diagram of a fourth example method for amplifying an input CW-based optical signal of the LiDAR system of FIG. 19, in accordance with the non-limiting embodiments of the present technology

With reference to FIG. 23, there is depicted an tenth amplitude ramp waveform representation 2300 of the AFMCW reference electrical signal and the second AFMCW input electrical signal having been generated by the receiver component 312 in response to receiving the AFMCW reference beam 822 and the second AFMCW input beam 1924, respectively, in accordance with the fourth implementation of the LiDAR system 302. The AFMCW reference electrical signal and the second AFMCW input electrical signal are respectively represented by the asymptotic AFMCW reference amplitude signal 1202 and the linear AFMCW input amplitude signal 1104.

With continued reference to FIG. 23 and referring back to FIG. 19, first, at the first moment in time $t_1$, the AFMCW reference beam 822 is received by the receiver component 312 while the second AFMCW scanning beam 1920 is directed downrange towards the surroundings 250 of the vehicle 220, which is represented by the asymptotic AFMCW reference amplitude signal 1202. Consequently, having reflected off the object 325, the second AFMCW scanning beam 1920 generates the second AFMCW input beam 1924 that may be received, by the receiver component 312, at the second moment in time $t_2$, as represented by the linear AFMCW input amplitude signal 1104. The asymptotic AFMCW reference amplitude signal 1202 is continuously growing over the amplitude modulation period 902 in accordance with the asymptotic periodic function 1000. On the other hand, the linear AFMCW input amplitude signal 1104 is continuously growing over the period from the second moment in time $t_2$, in accordance with linear periodic function 900.

Further, a fourth variable asymptotic amplitude difference 2306 caused by the attenuation of the second AFMCW input beam 1924 decreases with time (and thus with the distance 390 to the object 325). Accordingly, the fourth variable asymptotic amplitude difference 2306 may be corrected by the receiver component 312 generating the composition of the AFMCW reference electrical signal and the second AFMCW input electrical signal, thereby generating the fourth amplified AFMCW input electrical signal 1926, similarly to generating the above amplified AFMCW input electrical signal according to first, second, and the third implementations of the LiDAR system 302 (based on Equation (6), for example).

As previously mentioned, the controller component 316 may further use the third amplified AFMCW input electrical signal 1626 for determining, for example, the distance 390 to the object 325 based on the time difference 1108.

According to these embodiments of the fourth implementation of the LiDAR system 302, in both Scenario 1 and Scenario 2, as the amplitude modulation period 902 is predetermined based on the threshold ranging distance value associated with the LiDAR system 302, it can be said that each one of the asymptotic AFMCW input amplitude signal 1204 and the linear AFMCW input amplitude signal 1104 associated with the second AFMCW input beam 1924 is amplified using the linear AFMCW reference amplitude signal 1102 and the asymptotic AFMCW reference amplitude signal 1202, respectively, as a function of distance from the LiDAR system 302 to one or more objects in the surroundings 250 of the vehicle 220. In other words, the farther away the object 325 is located from the LiDAR system 302, the greater the amplitude of the fourth amplified AFMCW input electrical signal 1926 would be. By so doping, the LiDAR system 302 is configured to compensate for the attenuation of the second AFMCW input beam 1924 using the AM component 802 and the second AM component 1902.

Figure 24:
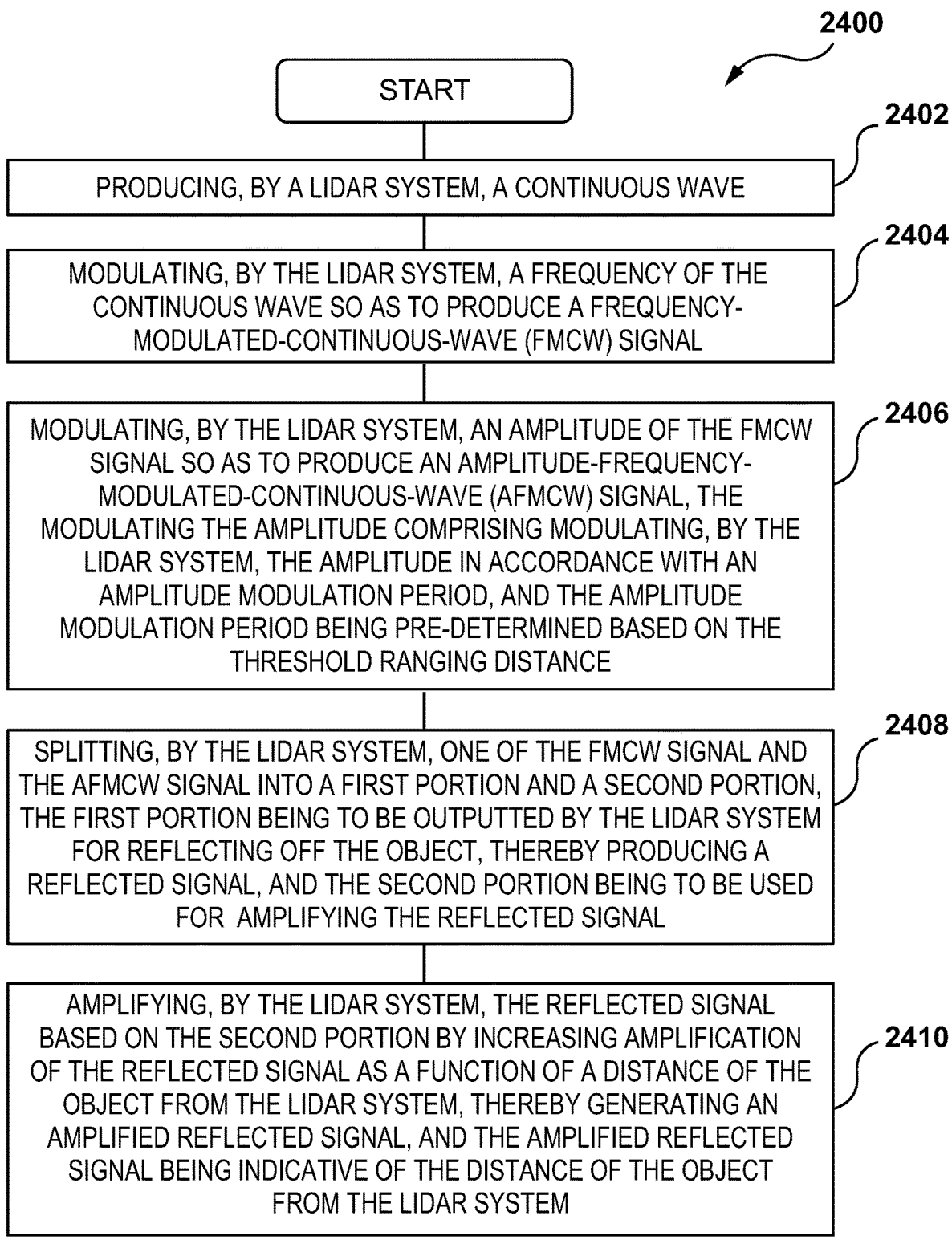
FIG. 24 depicts a flowchart diagram of a method for operating the LiDAR system of FIG. 3, in accordance with certain non-limiting embodiments of the present technology.

Given the architecture and the examples provided hereinabove, it is possible to execute a method for operating a LiDAR system (for example, the LiDAR system 302). With reference now to FIG. 24, there is depicted a flowchart of a method 2400, according to the non-limiting embodiments of the present technology. The method 2400 may be executed by the controller component 316.

According to some non-limiting embodiments of the present technology, as previously mentioned, the LiDAR system 302 may be associated with the threshold ranging distance value indicative of a longest distance, at which the LiDAR system 302 may be configured to physically detect an object in the surroundings 250 (such as the object 325). The threshold ranging distance may depend on specific characteristics of the LiDAR system 302, such as those of the FMCW light source component 304, the beam splitter component 310, and the receiver component 312, for example Step 2402: Producing, by a Lidar System, a Continuous Wave The method 2400 commences at step 2402, where the light source component 306 can be configured, by the controller component 316, to generate a CW beam, for example, the CW output beam 317.

In some non-limiting embodiments of the present technology, formally, the CW output beam 317 may be represented by Equation (1) and characterized by certain parameters, such as the CW amplitude 406 and the CW frequency 404, amongst other parameters, as described above with reference to FIG. 4.

Step 2404: Modulating, by the Lidar System, a Frequency of the Continuous Wave so as to Produce a Frequency-Modulated-Continuous-Wave (FMCW) Signal At step 2404, according to some non-limiting embodiments of the present technology, the controller component 316 may be configured to frequency-modulate the CW output beam 317, thereby generating an FMCW beam, for example, the FMCW output beam 318. To that end, the LiDAR system 302 may further comprise a frequency modulator, such as the FM component 308 described above with reference to FIG. 3.

In some non-limiting embodiments of the present technology, the light source component 306 and the FM component 308 may form an integral component of the LiDAR system 302, which is referred to herein as the FMCW light source component 304.

Further, according to some non-limiting embodiments of the present technology, the FM component 308 may be configured to modulate the CW frequency 404 of the CW output beam 317 according to a predetermined frequency modulation function. In some non-limiting embodiments of the present technology, the frequency modulation function may be a chirp function. In some non-limiting embodiments of the present technology, the frequency modulation function may be the sawtooth function 500 configured to modulate the CW frequency 404 of the CW output beam 317 over the sawtooth frequency modulation period 502, as described above with reference to FIG. 5. In other non-limiting embodiments of the present technology, the frequency modulation function may be the triangle function 600 configured to modulate the CW frequency 404 of the CW output beam 317 over the triangle frequency modulation period 602, as described above with reference to FIG. 6.

Further, in some non-limiting embodiments of the present technology, the FMCW output beam 318 may further be directed to the beam splitter component 310. To that end, the beam splitter component 310 may be configured to split the FMCW output beam 318 into (1) the FMCW scanning beam 320, which is directed downrange towards the surroundings 250 of the vehicle 220; and (2) the FMCW reference beam 322, which is directed to the receiver component 312, as described above with reference to FIG. 3. Consequently, the FMCW scanning beam 320, having reflected off the object 325, may thus produce the FMCW input beam 324.

Finally, the receiver component 312 may be configured, by the controller component 316, to receive the FMCW reference beam 322 and the FMCW input beam 324, and based thereon, generate the FMCW reference electrical signal and the FMCW input electrical signal, respectively. In some non-limiting embodiments of the present technology, the receiver component 312 may further be configured to generate a composition of the so generated FMCW reference electrical signal and the FMCW input electrical signal for transmitting to the controller component 316 for further analysis. In this regard, the controller component 316, based on analyzing the composition of the electrical signals, may be configured to determine the data of the object 325, such as the distance 390 to the object 325 and the instantaneous speed 327 thereof relative to the LiDAR system 302, as described above with reference to FIG. 7.

However, as previously noted, the FMCW input beam 324 may be substantially attenuated over the distance 390, for example, by specifics of an environment of the surroundings 250. Accordingly, in some non-limiting embodiments of the present technology, the controller component 316 may be configured to amplify one of the FMCW output beam 318, the FMCW scanning beam 320, and the FMCW reference beam 322.

The method 2400 hence advances to step 2406.

Step 2406: Modulating, by the Lidar System, an Amplitude of the FMCW Signal so as to Produce an Amplitude-Frequency-Modulated-Continuous-Wave (AFMCW) Signal, the Modulating the Amplitude Comprising Modulating, by the Lidar System, the Amplitude in Accordance with an Amplitude Modulation Period, and the Amplitude Modulation Period being Pre-Determined Based on the Threshold Ranging Distance At step 2406, in certain non-limiting embodiments of the present technology, the controller component 316 may be configured to amplify one of the FMCW output beam 318, the FMCW scanning beam 320, and the FMCW reference beam 322 by applying amplitude-modulation thereto, thereby generating a respective AFMCW beam.

To that end, according to the non-limiting embodiments of the present technology, the LiDAR system 302 may further comprise at least one amplitude modulator, such as the AM component 802, as described above with reference to FIG. 8.

For example, the AM component 802 may be configured to modulate the CW amplitude 406 of the FMCW output beam 318, thereby generating the AFMCW output beam 818. To that end, the AM component 802 may be configured to apply an amplitude modulation function to the CW amplitude 406. In some non-limiting embodiments of the present technology, the amplitude modulation function may be a periodic function, such as the linear periodic function 900 and the asymptotic periodic function 1000, respectively depicted in FIGS. 9 and 10.

According to some non-limiting embodiments of the present technology, each of the linear periodic function 900 and the asymptotic periodic function 1000 is associated with the amplitude modulation period 902, over which the AM component 802 is configured to modulate an amplitude associated with a respective FMCW beam.

In some non-limiting embodiments of the present technology, the amplitude modulation period 902 may be determined based on the threshold ranging distance value associated with the LiDAR system 302. In other words, the amplitude modulation period 902 may be determined to be equal to the round trip time, which it takes, for example, for the FMCW scanning beam 320 to travel to the object 325 when it is located at the threshold ranging distance from the LiDAR system 302; reflected off the object 325; and return back to the LiDAR system 302. Accordingly, such an approach to modulating an output beam of the LiDAR system 302 (such as the FMCW scanning beam 320) may allow for amplifying an input beam of the LiDAR system 302 (such as an AFMCW input beam 824, for example) as a function of the distance 390, such that the farther away the object 325 is located from the LiDAR system 302, the greater the amplitude associated with AFMCW input beam 824 would be.

Further, in some non-limiting embodiments of the present technology, a respective one of the sawtooth frequency modulation period 502 and the triangle frequency modulation period may be predetermined to be equal to the amplitude modulation period 902.

In some non-limiting embodiments of the present technology, various ways of implementing the AM component 802 can be used, including, however, without being limited to:
- a MEMS variable optical modulator;
- an electro-optical modulator;
- a magneto-optical modulator;
- a fiber-optical amplifier;
- a semiconductor optical amplifier; and
- an other light source (such as another AFMCW light source, for example).

Thus, in order to apply the amplitude modulation function, the AM component 802 may be configured to use a variety of associated with respective implementations thereof including, but without being limited to: (1) deep attenuation of the continuous wave-based light beam followed by continuous decreasing a level of the attenuation in accordance with the amplitude modulation function; (2) continuous increasing a level of amplification of the continuous wave-based light beam; or (3) using a combined approach considering the level of attenuation and the level of amplification of the continuous wave-based light beam, as an example.

In some non-limiting embodiments of the present technology, the AM component 802 may be an integral component of the FMCW light source component 304.

As it can be appreciated, depending on how the AM component 802 is installed within the LiDAR system 302, various implementations thereof may be envisioned.

According to some non-limiting embodiments of the present technology, in the first implementation of the LiDAR system 302, the AM component 802 may be installed on the way of the FMCW output beam 318, thereby generating the AFMCW output beam 818, as described above with reference to FIG. 8.

According to other non-limiting embodiments of the present technology, in the second implementation of the LiDAR system 302, the AM component 802 may be installed on the way of the FMCW reference beam 322, thereby generating the AFMCW reference beam 822, as described with reference to FIG. 13.

According to yet other non-limiting embodiments of the present technology, in the third implementation of the LiDAR system 302, the AM component 802 may be installed on the way of the FMCW scanning beam 320, thereby generating the AFMCW scanning beam 820, as described above with reference to FIG. 16.

Finally, according to yet other non-limiting embodiments of the present technology, in the fourth implementation of the LiDAR system 302, the LiDAR system 302 may further comprise another amplitude modulator, such as the second AM component 1802 implemented similarly to the AM component 802. Thus, according to the fourth implementation of the LiDAR system 302, the AM component 802 may be installed on the way of the FMCW reference beam 322, thereby generating the AFMCW reference beam 822; and the second AM component 1802 may be installed on the way of the FMCW scanning beam 320, thereby generating the second AFMCW scanning beam 1920, as above described with reference to FIG. 19.

The method 2400 hence advances to step 2408.

Step 2408: Splitting, by the Lidar System, One of the FMCW Signal and the AFMCW Signal into a First Portion and a Second Portion, the First Portion being to be Outputted by the Lidar System for Reflecting Off the Object, Thereby Producing a Reflected Signal, and the Second Portion being to be Used for Amplifying the Reflected Signal At step 2408, according to the non-limiting embodiments of the present technology, the controller component 316 is configured to generate scanning and reference beams of the LiDAR system 302, by using the beam splitter component 310, so as to detect the object 325 in the surroundings 250 and further determine the data thereof.

As previously described with reference to FIG. 3, according to the non-limiting embodiments of the present technology, the beam splitter component 310 is configured to receive an input light beam and split it in a first portion and a second portion of lesser intensity than that of the input light beam. Further, the first portion is directed downrange towards the surroundings 250 to be reflected off the object 325, thereby generating a reflected beam; and the second portion is directed to the receiver component 312 to be used for amplifying the reflected beam.

Thus, according to the first implementation of the LiDAR system 302 depicted in FIG. 8, the beam splitter component 310 may be configured to receive the AFMCW output beam 818 and generate the AFMCW scanning beam 820 and the AFMCW reference beam 822. Further, having reflected off the object 325, the AFMCW scanning beam 820 produces the AFMCW input beam 824.

According to the second implementation of the LiDAR system 302 depicted in FIG. 13, the beam splitter component 310 may be configured to receive the FMCW output beam 318 and generate the FMCW scanning beam 320 and the FMCW reference beam 322. Further, the beam splitter component 310 may be configured to direct the FMCW reference beam 322 to the AM component 810, thereby generating the AFMCW reference beam 822. Finally, having reflected off the object 325, the FMCW scanning beam 320 produces the FMCW input beam 324.

According to the third implementation of the LiDAR system 302 depicted in FIG. 16, the beam splitter component 310 may be configured to receive the FMCW output beam 318 and generate the FMCW scanning beam 320 and the FMCW reference beam 322. Further, the beam splitter component 310 may be configured to direct the FMCW scanning beam 320 to the AM component 810, thereby generating the AFMCW scanning beam 820. Finally, having reflected off the object 325, the AFMCW scanning beam 820 produces the AFMCW input beam 824.

Finally, according to the fourth implementation of the LiDAR system 302 depicted in FIG. 19, the beam splitter component 310 may be configured to receive the FMCW output beam 318 and generate the FMCW scanning beam 320 and the FMCW reference beam 322. Further, the beam splitter component 310 may be configured to direct the FMCW reference beam 322 to the AM component 810, thereby generating the AFMCW reference beam 822; and direct the FMCW scanning beam 320 to the second AM component 1802, thereby generating the second AFMCW scanning beam 1920. Finally, having reflected off the object 325, the second AFMCW scanning beam 1920 produces the second AFMCW input beam 1924.

The method hence advances to step 2410.

Step 2410: Amplifying, by the Lidar System, the Reflected Signal Based on the Second Portion by Increasing Amplification of the Reflected Signal as a Function of a Distance of the Object from the Lidar System, Thereby Generating an Amplified Reflected Signal, and the Amplified Reflected Signal being Indicative of the Distance of the Object from the Lidar System At step 2410, according to the non-limiting embodiments of the present technology, the controller component 316 is configured to cause the receiver component 312 to receive incoming light beams; and the receiver component 312 may further be configured to generate respective electrical signals.

Thus, according to the first implementation of the LiDAR system 302 depicted in FIG. 8, the receiver component 312 may be configured to (1) receive the AFMCW reference beam 822 and the AFMCW input beam 824; (2) generate the AFMCW reference electrical signal and the AFMCW input electrical signal, respectively; (3) generate a composition thereof, for example, in accordance with Equation (5), thereby amplifying the AFMCW input electrical signal and generating the first amplified AFMCW input electrical signal 826; (4) transmit the first amplified AFMCW input electrical signal 826 to the controller component 316 for further analysis.

Further, according to the second implementation of the LiDAR system 302 depicted in FIG. 13, the receiver component 312 may be configured to (1) receive the AFMCW reference beam 822 and the FMCW input beam 324; (2) generate the AFMCW reference electrical signal and the FMCW input electrical signal, respectively; (3) generate a composition thereof, for example, in accordance with Equation (5), thereby amplifying the FMCW input electrical signal and generating the second amplified AFMCW input electrical signal 1326; (4) transmit the second amplified AFMCW input electrical signal 1326 to the controller component 316 for further analysis.

Further, according to the third implementation of the LiDAR system 302 depicted in FIG. 16, the receiver component 312 may be configured to (1) receive the FMCW reference beam 322 and the AFMCW input beam 824; (2) generate the FMCW reference electrical signal and the AFMCW input electrical signal, respectively; (3) generate a composition thereof, for example, in accordance with Equation (5), thereby amplifying the AFMCW input electrical signal and generating the third amplified AFMCW input electrical signal 1626; (4) transmit the third amplified AFMCW input electrical signal 1626 to the controller component 316 for further analysis.

Finally, according to the fourth implementation of the LiDAR system 302 depicted in FIG. 19, the receiver component 312 may be configured to (1) receive the AFMCW reference beam 822 and the second AFMCW input beam 1924; (2) generate the AFMCW reference electrical signal and the second AFMCW input electrical signal, respectively; (3) generate a composition thereof, for example, in accordance with Equation (5), thereby amplifying the second AFMCW input electrical signal and generating the fourth amplified AFMCW input electrical signal 1926; (4) transmit the fourth amplified AFMCW input electrical signal 1926 to the controller component 316 for further analysis.

Accordingly, in the non-limiting embodiments of the present technology, each of the first amplified AFMCW input electrical signal 826, the second amplified AFMCW input electrical signal 1326, the third amplified AFMCW input electrical signal 1626, and the fourth amplified AFMCW input electrical signal 1926 have been generated to correct a drop in amplitude (attenuation) of the respective input electrical signal by amplifying it as a function of a distance from the LiDAR system 302 to one or more objects in the surroundings 250 of the vehicle 220.

As previously mentioned, according to some non-limiting embodiments of the present technology, the receiver component 312 may be associated with the predetermined threshold amplitude value indicative of a maximum amplitude of a so composed electrical signal (that can be determined in accordance with Equation (6), for example) that can be generated by the receiver component 312 without damaging thereof. In other words, respective maximum amplitude values of the first amplified AFMCW input electrical signal 826, the second amplified AFMCW input electrical signal 1326, the third amplified AFMCW input electrical signal 1626, and the fourth amplified AFMCW input electrical signal 1926 should satisfy the condition expressed by Equation (7). To that end, certain parameters of the AM component 802 and the second AM component 1802 may be adjusted, for example, a used amplitude modulation function (such as the linear periodic function 900 or the asymptotic periodic function 1000), certain parameters of the used amplitude modulation function (such as the second amplitude value 906), a used modulation technique, and the like.

Further, according to the non-limiting embodiments of the present technology, having received a respective one of the first amplified AFMCW input electrical signal 826, the second amplified AFMCW input electrical signal 1326, the third amplified AFMCW input electrical signal 1626, and the fourth amplified AFMCW input electrical signal 1926, the controller component 316 may be configured to analyze it and determine the data of the object 325. For example, based on the time difference 1108, the controller component 316 may be configured to determine the distance 390 to the object 325, as described below with reference to FIGS. 11 and 12, 14 and 15, 17 and 18, and 20 to 23 (respectively associated with the first, second, third, and fourth implementations of the LiDAR system 302). Further, as described herein above with reference to FIG. 7, using a respective amplified AFMCW input electrical signal and an associated reference electrical signal, the controller component 316 may be configured to further determine the instantaneous speed 327 of the object 325 relative to the LiDAR system 302.

Finally, according to the non-limiting embodiments of the present technology, the so determined data of the object 325 may thus be used, by the controller component 316, for operating the vehicle 220. For example, considering the distance 390 and the instantaneous speed 327 of the object 325, the controller component 316 may be configured to determine a future trajectory for the vehicle 220.

Thus, certain non-limiting embodiments of the LiDAR system 302 allow for compensating for attenuation of the CW-based input light beam (such as the FMCW input beam 324, the AFMCW input beam 824, and the like) caused by a long travelling distance. The attenuation is compensated for by amplifying the CW-based input light beam using a reference light beam having been generated based thereon and further having been amplitude-modulated based on the threshold ranging distance associated with the LiDAR system 302. Therefore, such an approach enables to amplify the CW-based input light beam as a function of distance to the objects located in the surroundings 250 of the vehicle 220, which may be aimed at a more optimal power consumption by the LiDAR system 302 and can be further associated with increased eye-safety standards. Further, this approach may allow for adjustment of parameters of amplification (such as those of the AM component 802, for example) independently for a safer operation of the LiDAR system 302 in terms of maximum input power of its components (such as that of the receiver component 312).

Accordingly, these non-limiting embodiments of the LiDAR system 302 allow for registering more reliable data of one or more objects in the surroundings 250 located at longer distances from the LiDAR system 302, thereby providing, for example, for (1) generating a more accurate multi-dimensional map of the objects; and (2) more effective controlling operation (such as trajectory-planning) for the vehicle 220 in terms of avoiding collisions with the objects in the surroundings 250, for example.

The method 2400 hence terminates.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

The invention claimed is:

1. A LiDAR system having a threshold ranging distance, the threshold ranging distance being indicative of a longest distance at which the LiDAR system is configured to detect an object, the LiDAR system comprising:
   a light source configured to produce a continuous wave;
   a frequency modulator configured to modulate a frequency of the continuous wave,
      thereby producing a Frequency-Modulated-Continuous-Wave (FMCW) signal; and
   an amplitude modulator configured to modulate an amplitude of the FMCW signal in accordance with a periodic function associated with an amplitude modulation period, the periodic function comprising an asymptotic periodic function,
      thereby producing an Amplitude-Frequency-Modulated-Continuous-Wave (AFMCW) signal having an asymptotically increasing amplitude,
      the amplitude modulation period being pre-determined based on the threshold ranging distance;
   a splitter configured to split the AFMCW signal into a first portion and a second portion,
      the first portion being to be outputted by the LiDAR system for reflecting off the object, thereby producing a reflected signal, and
      the second portion being to be used for amplifying the reflected signal; and
   a detector configured to amplify the reflected signal based on the second portion by increasing amplification of the reflected signal as a function of a distance of the object from the LiDAR system,
      thereby generating an amplified reflected signal, and
      the amplified reflected signal being indicative of the distance of the object from the LiDAR system.

2. The LiDAR system of claim 1, wherein the detector has a threshold amplitude, and wherein the amplified reflected signal has an amplitude that is below the threshold amplitude.

3. The LiDAR system of claim 2, wherein the periodic function has been pre-determined such that the amplitude of the amplified reflected signal is below the threshold amplitude of the detector.

4. The LiDAR system of claim 3, wherein the detector is further configured to receive the reflected signal.

5. The LiDAR system of claim 3, wherein:
   the splitter is configured to split the AFMCW signal; and
   the detector is further configured to receive the second portion of the AFMCW signal for amplifying the reflected signal.

6. The LiDAR system of claim 3, wherein:
   the splitter is configured to split the FMCW signal;
   the amplitude modulator is further configured to receive the second portion of the FMCW signal;
   the amplitude modulator being configured to modulate the amplitude of the FMCW signal comprises the amplitude modulator being configured to modulate the amplitude of the second portion of the FMCW signal; and
   the detector is further configured to receive the AFMCW signal from the amplitude modulator for amplifying the reflected signal.

7. The LiDAR system of claim 3, wherein the amplitude modulator being configured to modulate the amplitude of the FMCW signal comprises the amplitude modulator being configured to:
produce the AFMCW signal having a continuously increasing amplitude within the amplitude modulation period.

8. The LiDAR system of claim 3, wherein the amplitude modulator being configured to modulate the amplitude of the FMCW signal comprises the amplitude modulator being configured to:
produce the AFMCW signal having a linearly increasing amplitude within the amplitude modulation period.

9. The LiDAR system of claim 3, wherein:
the frequency of the continuous wave is modulated in accordance with a frequency modulation period; and
the frequency modulation period is equal to the amplitude modulation period.

10. The LiDAR system of claim 3, wherein the amplitude modulation period is pre-determined as a time value corresponding to an amount of time between:
(i) a first moment in time when the second portion is outputted from the LiDAR system; and
(ii) a second moment in time when the reflected signal would be received by the detector if the object is at the threshold ranging distance from the LiDAR system.

11. The LiDAR system of claim 3, wherein the frequency modulator is integral with the light source.

12. The LiDAR system of claim 3, wherein the amplitude modulator is integral with the light source.

13. The LiDAR system of claim 3, wherein the amplitude modulator is at least one of:
a MEMS variable optical modulator;
an electro-optical modulator;
a magneto-optical modulator;
a fiber-optical amplifier;
a semiconductor optical amplifier; and
an other light source.

14. The LiDAR system of claim 3, wherein the LiDAR system is equipped to a Self Driving Car (SDC).

15. The LiDAR system of claim 3, wherein the amplified reflected signal is further indicative of a velocity of the object relative to the LiDAR system.

16. The LiDAR system of claim 15, wherein the distance of the object is used for controlling operation of the SDC.

17. A LiDAR system having a threshold ranging distance, the threshold ranging distance being indicative of a longest distance at which the LiDAR system is configured to detect an object, the LiDAR system comprising:
a light source configured to produce a continuous wave;
a frequency modulator configured to modulate a frequency of the continuous wave,
thereby producing a Frequency-Modulated-Continuous-Wave (FMCW) signal; and
a splitter configured to split the FMCW signal into a first portion and a second portion,
the first portion being to be outputted by the LiDAR system for reflecting off the object, thereby producing a reflected signal, and the second portion being to be used for amplifying the reflected signal;
an amplitude modulator configured to modulate an amplitude of the second portion of the FMCW signal in accordance with a periodic function associated with an amplitude modulation period, the periodic function comprising an asymptotic periodic function,
thereby producing an Amplitude-Frequency-Modulated-Continuous-Wave (AFMCW) signal having an asymptotically increasing amplitude,
the amplitude modulation period being pre-determined based on the threshold ranging distance; and
a detector configured to amplify the reflected signal based on the AFMCW signal by increasing amplification of the reflected signal as a function of a distance of the object from the LiDAR system,
thereby generating an amplified reflected signal, and the amplified reflected signal being indicative of the distance of the object from the LiDAR system.

18. A LiDAR system having a threshold ranging distance, the threshold ranging distance being indicative of a longest distance at which the LiDAR system is configured to detect an object, the LiDAR system comprising:
a light source configured to produce a continuous wave;
a frequency modulator configured to modulate a frequency of the continuous wave,
thereby producing a Frequency-Modulated-Continuous-Wave (FMCW) signal; and
a splitter configured to split the FMCW signal into a first portion and a second portion,
the second portion being to be used for amplifying the reflected signal;
an amplitude modulator configured to modulate an amplitude of the first portion of the FMCW signal in accordance with a periodic function associated with an amplitude modulation period, the periodic function comprising an asymptotic periodic function,
thereby producing an Amplitude-Frequency-Modulated-Continuous-Wave (AFMCW) signal having an asymptotically increasing amplitude,
the amplitude modulation period being pre-determined based on the threshold ranging distance,
AFMCW signal being to be outputted by the LiDAR system for reflecting off the object, thereby producing a reflected signal; and
a detector configured to amplify the reflected signal based on the second portion by increasing amplification of the reflected signal as a function of a distance of the object from the LiDAR system,
thereby generating an amplified reflected signal, and the amplified reflected signal being indicative of the distance of the object from the LiDAR system.

19. A LiDAR system having a threshold ranging distance, the threshold ranging distance being indicative of a longest distance at which the LiDAR system is configured to detect an object, the LiDAR system comprising:
a light source configured to produce a continuous wave;
a frequency modulator configured to modulate a frequency of the continuous wave,
thereby producing a Frequency-Modulated-Continuous-Wave (FMCW) signal; and
a splitter configured to split the FMCW signal into a first portion and a second portion,
a first amplitude modulator configured to modulate an amplitude of the first portion of the FMCW signal in accordance with a periodic function associated with an amplitude modulation period, the periodic function comprising an asymptotic periodic function,
thereby producing a first Amplitude-Frequency-Modulated-Continuous-Wave (AFMCW) signal having an asymptotically increasing amplitude,
the amplitude modulation period being pre-determined based on the threshold ranging distance, the first AFMCW signal to be outputted by the LiDAR system for reflecting off the object, thereby producing a reflected signal; and a second amplitude modulator configured to modulate an amplitude of the second portion of the FMCW signal in accordance with the asymptotic periodic function associated with the amplitude modulation period, thereby producing a second AFMCW signal having an other asymptotically increasing amplitude, the amplitude modulation period being pre-determined based on the threshold ranging distance, the second AFMCW signal being to be used for amplifying the reflected signal;

a detector configured to amplify the reflected signal based on the second AFMCW signal by increasing amplification of the reflected signal as a function of a distance of the object from the LiDAR system, thereby generating an amplified reflected signal, and the amplified reflected signal being indicative of the distance of the object from the LiDAR system.

20. A LiDAR system having a threshold ranging distance, the threshold ranging distance being indicative of a longest distance at which the LiDAR system is configured to detect an object, the LiDAR system comprising:

a light source configured to produce a continuous wave;

a frequency modulator configured to modulate a frequency of the continuous wave, thereby producing a Frequency-Modulated-Continuous-Wave (FMCW) signal; and an amplitude modulator configured to modulate an amplitude of the FMCW signal in accordance with a periodic function associated with an amplitude modulation period, the periodic function comprising an asymptotic periodic function, thereby producing an Amplitude-Frequency-Modulated-Continuous-Wave (AFMCW) signal having an asymptotically increasing amplitude, the amplitude modulation period being pre-determined based on the threshold ranging distance;

a splitter configured to split one of the FMCW signal and the AFMCW signal into a first portion and a second portion, the first portion being to be outputted by the LiDAR system for reflecting off the object, thereby producing a reflected signal, and the second portion being to be used for amplifying the reflected signal; and a detector configured to amplify the reflected signal based on the second portion by increasing amplification of the reflected signal proportionally to a distance to the object from the LiDAR system, thereby generating an amplified reflected signal, and the amplified reflected signal being indicative of the distance of the object from the LiDAR system.

21. A LiDAR system having a threshold ranging distance, the threshold ranging distance being indicative of a longest distance at which the LiDAR system is configured to detect an object, the LiDAR system comprising:

a light source configured to produce a continuous wave;

a frequency modulator configured to modulate a frequency of the continuous wave, thereby producing a Frequency-Modulated-Continuous-Wave (FMCW) signal; and an amplitude modulator configured to modulate an amplitude of at least a portion of the FMCW signal in accordance with a periodic function associated with an amplitude modulation period, the periodic function comprising an asymptotic periodic function, thereby producing an Amplitude-Frequency-Modulated-Continuous-Wave (AFMCW) signal having an asymptotically increasing amplitude, the amplitude modulation period being pre-determined based on the threshold ranging distance;

a splitter configured to split one of the FMCW signal and the AFMCW signal into a first portion and a second portion, the first portion being for producing an output signal by the LiDAR system for reflecting off the object, thereby producing a reflected signal, and the second portion being for producing a reference signal for amplifying the reflected signal; and a detector configured to amplify the reflected signal based on the reference signal by increasing amplification of the reflected signal as a function of a distance of the object from the LiDAR system, thereby generating an amplified reflected signal, and the amplified reflected signal being indicative of the distance of the object from the LiDAR system.

* * * * *